United States Patent
Goldberg et al.

(10) Patent No.: US 11,080,297 B2
(45) Date of Patent: Aug. 3, 2021

(54) INCREMENTAL CLIENT SYNCHRONIZATION

(71) Applicant: Dropbox, Inc., San Francisco, CA (US)

(72) Inventors: Isaac Goldberg, San Francisco, CA (US); John Lai, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 696 days.

(21) Appl. No.: 15/867,505

(22) Filed: Jan. 10, 2018

(65) Prior Publication Data

US 2019/0205425 A1  Jul. 4, 2019

Related U.S. Application Data

(60) Provisional application No. 62/611,473, filed on Dec. 28, 2017.

(51) Int. Cl.
*G06F 16/11* (2019.01)
*G06F 16/13* (2019.01)
(Continued)

(52) U.S. Cl.
CPC .............. *G06F 16/27* (2019.01); *G06F 1/04* (2013.01); *G06F 3/065* (2013.01); *G06F 3/067* (2013.01); *G06F 3/0619* (2013.01); *G06F 3/0623* (2013.01); *G06F 3/0629* (2013.01); *G06F 3/0652* (2013.01); *G06F 9/547* (2013.01); *G06F 11/1469* (2013.01); *G06F 12/1466* (2013.01); *G06F 16/11* (2019.01); *G06F 16/113* (2019.01);
(Continued)

(58) Field of Classification Search
CPC .... G06F 16/178; G06F 16/1787; G06F 16/27; G06F 16/2358
See application file for complete search history.

(56) References Cited

U.S. PATENT DOCUMENTS 5,220,665 A   6/1993 Coyle, Jr. et al.
5,335,346 A   8/1994 Fabbio
(Continued)

FOREIGN PATENT DOCUMENTS

AU    2008202290 B2   5/2010
CN       1255748 C    5/2006
(Continued)

OTHER PUBLICATIONS

Non-Final Office Action from U.S. Appl. No. 15/870,179, dated Oct. 7, 2019, 6 pages.
(Continued)

*Primary Examiner* — James E Richardson
(74) *Attorney, Agent, or Firm* — Polsinelli PC

(57) ABSTRACT

The disclosed technology relates to a system configured to identify a set of modifications based on a set of tree data structures including a sync tree, a remote tree, and a local tree. The sync tree represents a known synced state between a server state and a file system state, the remote tree represents the server state, and the local tree represents the file system state. The system is further configured to select a set of unblocked modifications from the set of modifications based on whether each modification has a dependency and execute, based on the set of unblocked modifications, a set of tasks configured to converge the server state and the file system state.

17 Claims, 19 Drawing Sheets

(51) Int. Cl.

| | | |
|---|---|---|
| *G06F 16/14* | (2019.01) | |
| *G06F 16/16* | (2019.01) | |
| *G06F 16/22* | (2019.01) | |
| *G06F 16/27* | (2019.01) | |
| *G06F 16/18* | (2019.01) | |
| *G06F 16/178* | (2019.01) | |
| *G06F 16/176* | (2019.01) | |
| *G06F 3/06* | (2006.01) | |
| *G06F 21/60* | (2013.01) | |
| *G06F 21/62* | (2013.01) | |
| *H04L 29/06* | (2006.01) | |
| *H04L 29/08* | (2006.01) | |
| *G06F 16/958* | (2019.01) | |
| *G06F 16/2455* | (2019.01) | |
| *G06F 16/951* | (2019.01) | |
| *G06F 16/172* | (2019.01) | |
| *G06F 1/04* | (2006.01) | |
| *G06F 9/54* | (2006.01) | |
| *G06F 11/14* | (2006.01) | |
| *G06F 12/14* | (2006.01) | |
| *G06F 21/10* | (2013.01) | |
| *H04L 9/32* | (2006.01) | |
| *G06F 16/23* | (2019.01) | |
| *G06F 16/182* | (2019.01) | |
| *G06F 16/185* | (2019.01) | |
| *G06F 16/174* | (2019.01) | |
| *G06F 16/907* | (2019.01) | |
| *G06F 16/17* | (2019.01) | |
| *G06F 16/901* | (2019.01) | |
| *G06F 16/955* | (2019.01) | |

(52) U.S. Cl.
CPC .......... *G06F 16/116* (2019.01); *G06F 16/119* (2019.01); *G06F 16/122* (2019.01); *G06F 16/125* (2019.01); *G06F 16/128* (2019.01); *G06F 16/13* (2019.01); *G06F 16/137* (2019.01); *G06F 16/148* (2019.01); *G06F 16/152* (2019.01); *G06F 16/156* (2019.01); *G06F 16/16* (2019.01); *G06F 16/162* (2019.01); *G06F 16/168* (2019.01); *G06F 16/172* (2019.01); *G06F 16/176* (2019.01); *G06F 16/178* (2019.01); *G06F 16/1734* (2019.01); *G06F 16/1744* (2019.01); *G06F 16/1767* (2019.01); *G06F 16/1787* (2019.01); *G06F 16/18* (2019.01); *G06F 16/182* (2019.01); *G06F 16/183* (2019.01); *G06F 16/184* (2019.01); *G06F 16/185* (2019.01); *G06F 16/1827* (2019.01); *G06F 16/1844* (2019.01); *G06F 16/2246* (2019.01); *G06F 16/2255* (2019.01); *G06F 16/2322* (2019.01); *G06F 16/2358* (2019.01); *G06F 16/2365* (2019.01); *G06F 16/2379* (2019.01); *G06F 16/24552* (2019.01); *G06F 16/275* (2019.01); *G06F 16/907* (2019.01); *G06F 16/9027* (2019.01); *G06F 16/951* (2019.01); *G06F 16/955* (2019.01); *G06F 16/958* (2019.01); *G06F 21/10* (2013.01); *G06F 21/604* (2013.01); *G06F 21/6218* (2013.01); *H04L 9/3213* (2013.01); *H04L 9/3247* (2013.01); *H04L 63/08* (2013.01); *H04L 63/0853* (2013.01); *H04L 63/10* (2013.01); *H04L 63/101* (2013.01); *H04L 63/102* (2013.01); *H04L 67/06* (2013.01); *H04L 67/1095* (2013.01); *H04L 67/1097* (2013.01); *G06F 2201/84* (2013.01); *G06F 2212/1052* (2013.01); *G06F 2221/2141* (2013.01); *H04L 67/306* (2013.01); *H04L 67/42* (2013.01)

(56) References Cited

U.S. PATENT DOCUMENTS

| | | |
|---|---|---|
| 5,574,901 A | 11/1996 | Takahashi |
| 5,665,863 A | 9/1997 | Yeh |
| 5,745,750 A | 4/1998 | Porcaro |
| 5,778,389 A | 7/1998 | Pruett et al. |
| 5,802,253 A | 9/1998 | Gross et al. |
| 5,802,508 A | 9/1998 | Morgenstern |
| 5,956,715 A | 9/1999 | Glasser et al. |
| 6,269,371 B1 | 7/2001 | Ohnishi |
| 6,408,298 B1 | 6/2002 | Van et al. |
| 6,421,684 B1 | 7/2002 | Cabrera et al. |
| 6,427,123 B1 | 7/2002 | Sedlar |
| 6,560,655 B1 | 5/2003 | Grambihler et al. |
| 6,574,665 B1 | 6/2003 | Khotimsky |
| 6,618,735 B1 | 9/2003 | Krishnaswami et al. |
| 6,665,863 B1 | 12/2003 | Lord et al. |
| 6,944,623 B2 | 9/2005 | Kim |
| 6,978,271 B1 | 12/2005 | Hoffman et al. |
| 7,024,392 B2 | 4/2006 | Stefik et al. |
| 7,051,039 B1 | 5/2006 | Murthy et al. |
| 7,080,041 B2 | 7/2006 | Nagel |
| 7,263,718 B2 | 8/2007 | O'Brien et al. |
| 7,275,177 B2 | 9/2007 | Armangau et al. |
| 7,313,598 B1 | 12/2007 | Sheth |
| 7,487,228 B1 | 2/2009 | Preslan et al. |
| 7,526,575 B2 | 4/2009 | Rabbers et al. |
| 7,529,931 B2 | 5/2009 | Vasishth et al. |
| 7,567,991 B2 | 7/2009 | Armangau et al. |
| 7,606,876 B2 | 10/2009 | Graves et al. |
| 7,631,298 B2 | 12/2009 | Kaler et al. |
| 7,634,482 B2 | 12/2009 | Mukherjee et al. |
| 7,634,514 B2 | 12/2009 | Langan et al. |
| 7,657,769 B2 | 2/2010 | Marcy et al. |
| 7,660,809 B2 | 2/2010 | Cortright et al. |
| 7,685,206 B1 | 3/2010 | Mathew et al. |
| 7,734,690 B2 | 6/2010 | Moromisato et al. |
| 7,761,497 B1 | 7/2010 | O'Connell, Jr. et al. |
| 7,805,469 B1 | 9/2010 | Nagaralu et al. |
| 7,809,828 B2 | 10/2010 | Burnett et al. |
| 7,886,016 B1 | 2/2011 | Tormasov |
| 7,895,158 B2 | 2/2011 | Bosloy et al. |
| 7,917,494 B2 | 3/2011 | Muller |
| 7,925,631 B1 | 4/2011 | Thillai et al. |
| 7,962,950 B2 | 6/2011 | Choo et al. |
| 8,015,204 B2 | 9/2011 | Kaler et al. |
| 8,069,226 B2 | 11/2011 | Momchilov et al. |
| 8,099,452 B2 | 1/2012 | Chkodrov et al. |
| 8,117,151 B2 | 2/2012 | Nakatani et al. |
| 8,156,151 B2 | 4/2012 | Sidman |
| 8,180,747 B2 | 5/2012 | Marinkovic et al. |
| 8,180,983 B1 | 5/2012 | Jernigan et al. |
| 8,190,741 B2 | 5/2012 | Wong et al. |
| 8,249,885 B2 | 8/2012 | Berkowitz et al. |
| 8,250,397 B2 | 8/2012 | Marcy et al. |
| 8,260,742 B2 | 9/2012 | Cognigni et al. |
| 8,301,994 B1 | 10/2012 | Shah et al. |
| 8,312,242 B2 | 11/2012 | Casper et al. |
| 8,326,874 B2 | 12/2012 | Wright et al. |
| 8,359,467 B2 | 1/2013 | Subramanian et al. |
| 8,417,676 B2 | 4/2013 | Petri |
| 8,516,149 B1 | 8/2013 | Edmett |
| 8,548,992 B2 | 10/2013 | Abramoff et al. |
| 8,554,800 B2 | 10/2013 | Goldentouch |
| 8,589,349 B2 | 11/2013 | Grant et al. |
| 8,661,070 B2 | 2/2014 | Goldsmith et al. |
| 8,661,539 B2 | 2/2014 | Hodges |
| 8,667,034 B1 | 3/2014 | Simon et al. |
| 8,688,734 B1 | 4/2014 | Tidd |
| 8,694,564 B2 | 4/2014 | Guarraci |
| 8,700,670 B2 | 4/2014 | Marathe et al. |
| 8,706,701 B1 | 4/2014 | Stefanov et al. |
| 8,818,951 B1 | 8/2014 | Muntz et al. |
| 8,862,644 B2 | 10/2014 | Lyle et al. |

(56) References Cited

U.S. PATENT DOCUMENTS

| | | |
|---|---|---|
| 8,880,474 B2 | 11/2014 | Mason et al. |
| 8,904,503 B2 | 12/2014 | Agbabian |
| 8,949,179 B2 | 2/2015 | Besen et al. |
| 8,990,924 B2 | 3/2015 | Chow |
| 8,996,884 B2 | 3/2015 | Hartley |
| 9,002,805 B1 | 4/2015 | Barber et al. |
| 9,087,215 B2 | 7/2015 | LaFever et al. |
| 9,129,088 B1 | 9/2015 | Baschy |
| 9,152,466 B2 | 10/2015 | Dictos et al. |
| 9,183,303 B1 | 11/2015 | Goel et al. |
| 9,210,116 B2 | 12/2015 | Jeng et al. |
| 9,218,429 B2 | 12/2015 | Levy |
| 9,231,988 B2 | 1/2016 | Holt et al. |
| 9,239,841 B2 | 1/2016 | Arnaudov et al. |
| 9,251,235 B1 | 2/2016 | Hurst et al. |
| 9,294,485 B2 | 3/2016 | Allain et al. |
| 9,298,384 B2 | 3/2016 | Kang et al. |
| 9,300,609 B1 | 3/2016 | Beausoleil et al. |
| 9,310,981 B2 | 4/2016 | Lynch et al. |
| 9,311,324 B2 | 4/2016 | Irizarry, Jr. |
| 9,325,571 B2 | 4/2016 | Chen |
| 9,330,106 B2 | 5/2016 | Piasecki et al. |
| 9,336,219 B2 | 5/2016 | Makkar et al. |
| 9,336,227 B2 | 5/2016 | Eberlein et al. |
| 9,361,473 B2 | 6/2016 | Chou Fritz et al. |
| 9,413,708 B1 | 8/2016 | Michael et al. |
| 9,424,437 B1 | 8/2016 | Ancin et al. |
| 9,426,216 B2 | 8/2016 | Subramani et al. |
| 9,430,669 B2 | 8/2016 | Staley et al. |
| 9,432,457 B2 | 8/2016 | Marano et al. |
| 9,444,869 B2 | 9/2016 | Jellison, Jr. et al. |
| 9,448,893 B1 | 9/2016 | Whitehead et al. |
| 9,449,082 B2 | 9/2016 | Leonard |
| 9,449,182 B1 | 9/2016 | Dang et al. |
| 9,454,534 B2 | 9/2016 | Thomas et al. |
| 9,471,807 B1 | 10/2016 | Chakraborty et al. |
| 9,477,673 B2 | 10/2016 | Dwan et al. |
| 9,479,567 B1 | 10/2016 | Koorapati et al. |
| 9,479,578 B1 | 10/2016 | Swanson |
| 9,483,491 B2 | 11/2016 | Wijayaratne et al. |
| 9,495,478 B2 | 11/2016 | Hendrickson et al. |
| 9,501,490 B2 | 11/2016 | Evans et al. |
| 9,507,795 B2 | 11/2016 | Dorman et al. |
| 9,529,804 B1 | 12/2016 | Muddu et al. |
| 9,529,818 B2 | 12/2016 | Catmull et al. |
| 9,542,404 B2 | 1/2017 | Moore et al. |
| 9,547,559 B2 | 1/2017 | Whitehead et al. |
| 9,552,363 B2 | 1/2017 | Novak et al. |
| 9,558,202 B2 | 1/2017 | Lockhart et al. |
| 9,563,638 B2 | 2/2017 | Newhouse |
| 9,565,227 B1 | 2/2017 | Helter et al. |
| 9,589,131 B2 | 3/2017 | Austin |
| 9,596,246 B2 | 3/2017 | Peddada |
| 9,614,826 B1 | 4/2017 | McCorkendale |
| 9,632,528 B2 | 4/2017 | Miyashita et al. |
| 9,633,037 B2 | 4/2017 | Smith et al. |
| 9,648,088 B1 | 5/2017 | Pande et al. |
| 9,652,490 B2 | 5/2017 | Belanger et al. |
| 9,652,741 B2 | 5/2017 | Goldberg et al. |
| 9,672,261 B2 | 6/2017 | Holmes-Higgin et al. |
| 9,703,800 B1 | 7/2017 | Korshunov et al. |
| 9,703,801 B2 | 7/2017 | Melahn et al. |
| 9,710,535 B2 | 7/2017 | Aizman et al. |
| 9,716,753 B2 | 7/2017 | Piyush et al. |
| 9,720,926 B2 | 8/2017 | Aron et al. |
| 9,720,947 B2 | 8/2017 | Aron et al. |
| 9,727,394 B2 | 8/2017 | Xun et al. |
| 9,747,164 B1 | 8/2017 | Auchmoody et al. |
| 9,747,297 B2 | 8/2017 | Penangwala et al. |
| 9,754,119 B1 | 9/2017 | Kilday |
| 9,767,106 B1 | 9/2017 | Duggal et al. |
| 9,773,051 B2 | 9/2017 | Smith |
| 9,805,050 B2 | 10/2017 | Smith et al. |
| 9,805,054 B2 | 10/2017 | Davis et al. |
| 9,805,106 B2 | 10/2017 | McErlean et al. |
| 9,817,987 B2 | 11/2017 | Mityagin |
| 9,824,090 B2 | 11/2017 | Hayrapetian et al. |
| 9,830,345 B1 | 11/2017 | Baars |
| 9,838,424 B2 | 12/2017 | Brady et al. |
| 9,852,147 B2 | 12/2017 | Von Muhlen et al. |
| 9,922,201 B2 | 3/2018 | Von Muhlen et al. |
| 9,936,020 B2 | 4/2018 | Leggette et al. |
| 9,953,036 B2 | 4/2018 | Mackenzie et al. |
| 9,971,822 B1 | 5/2018 | Deardeuff et al. |
| 1,003,733 A1 | 7/2018 | Kleinpeter et al. |
| 10,013,440 B1 | 7/2018 | Gupta et al. |
| 10,095,879 B1 | 10/2018 | Kleinpeter et al. |
| 10,198,182 B2 | 2/2019 | Adler et al. |
| 10,235,378 B1 | 3/2019 | Mamidi et al. |
| 10,324,903 B1 | 6/2019 | Goldberg et al. |
| 10,380,076 B2 | 8/2019 | Wijayaratne et al. |
| 10,425,477 B2 | 9/2019 | Trandafir et al. |
| 10,558,375 B2 | 2/2020 | Muhlestein et al. |
| 10,671,638 B2 | 6/2020 | Goldberg et al. |
| 2003/0145020 A1 | 7/2003 | Ngo et al. |
| 2003/0159136 A1 | 8/2003 | Huang et al. |
| 2003/0196119 A1 | 10/2003 | Raley et al. |
| 2003/0212657 A1 | 11/2003 | Kaluskar et al. |
| 2004/0002990 A1 | 1/2004 | Sander et al. |
| 2004/0080549 A1 | 4/2004 | Lord et al. |
| 2004/0098418 A1 | 5/2004 | Hein |
| 2004/0255048 A1 | 12/2004 | Lev et al. |
| 2005/0125411 A1 | 6/2005 | Kilian et al. |
| 2005/0144308 A1 | 6/2005 | Harashima et al. |
| 2005/0149450 A1 | 7/2005 | Stefik et al. |
| 2005/0151738 A1 | 7/2005 | Lord et al. |
| 2005/0198385 A1 | 9/2005 | Aust et al. |
| 2005/0222996 A1 | 10/2005 | Yalamanchi |
| 2005/0256861 A1 | 11/2005 | Wong et al. |
| 2005/0289446 A1 | 12/2005 | Moncsko et al. |
| 2006/0070114 A1 | 3/2006 | Wood et al. |
| 2006/0136513 A1 | 6/2006 | Ngo et al. |
| 2006/0155776 A1 | 7/2006 | Aust |
| 2006/0184720 A1 | 8/2006 | Sinclair et al. |
| 2006/0253501 A1 | 11/2006 | Langan et al. |
| 2006/0271602 A1 | 11/2006 | Davis et al. |
| 2007/0016650 A1 | 1/2007 | Gilbert et al. |
| 2007/0016771 A1 | 1/2007 | Allison et al. |
| 2007/0022091 A1 | 1/2007 | Styles et al. |
| 2007/0067349 A1 | 3/2007 | Jhaveri et al. |
| 2007/0088744 A1 | 4/2007 | Webber et al. |
| 2007/0088764 A1 | 4/2007 | Yoon et al. |
| 2007/0136391 A1 | 6/2007 | Anzai et al. |
| 2007/0156670 A1 | 7/2007 | Lim |
| 2007/0185852 A1 | 8/2007 | Erofeev |
| 2007/0198540 A1 | 8/2007 | Kohl et al. |
| 2007/0208715 A1 | 9/2007 | Muehlbauer |
| 2007/0208763 A1 | 9/2007 | Muehlbauer |
| 2007/0208948 A1 | 9/2007 | Costa-Requena et al. |
| 2007/0234398 A1 | 10/2007 | Muehlbauer |
| 2007/0250552 A1 | 10/2007 | Lango et al. |
| 2007/0282914 A1 | 12/2007 | Sivapragasam et al. |
| 2007/0283050 A1 | 12/2007 | Savage |
| 2007/0283403 A1 | 12/2007 | Eklund et al. |
| 2007/0288714 A1 | 12/2007 | Nakamura |
| 2008/0059474 A1 | 3/2008 | Lim |
| 2008/0104277 A1 | 5/2008 | Tian |
| 2008/0120129 A1 | 5/2008 | Seubert et al. |
| 2008/0168183 A1* | 7/2008 | Marcy .............. G06F 16/1837 709/248 |
| 2008/0307255 A1 | 12/2008 | Chen et al. |
| 2009/0055921 A1 | 2/2009 | Field et al. |
| 2009/0150569 A1 | 6/2009 | Kumar et al. |
| 2009/0182778 A1 | 7/2009 | Tormasov |
| 2009/0183117 A1 | 7/2009 | Chang |
| 2009/0198719 A1 | 8/2009 | Dewitt |
| 2009/0228511 A1 | 9/2009 | Atkin et al. |
| 2009/0271412 A1 | 10/2009 | Lacapra et al. |
| 2009/0292640 A1 | 11/2009 | Heatherly |
| 2010/0058462 A1 | 3/2010 | Chow |
| 2010/0106687 A1 | 4/2010 | Marcy et al. |
| 2010/0235649 A1 | 9/2010 | Jeffries et al. |
| 2010/0242037 A1 | 9/2010 | Xie et al. |
| 2011/0014985 A1 | 1/2011 | Park et al. |

(56) References Cited

U.S. PATENT DOCUMENTS

| | | |
|---|---|---|
| 2011/0040793 A1 | 2/2011 | Davidson et al. |
| 2011/0066668 A1 | 3/2011 | Guarraci |
| 2011/0072143 A1 | 3/2011 | Kuo et al. |
| 2011/0082879 A1 | 4/2011 | Hazlewood et al. |
| 2011/0126296 A1 | 5/2011 | Moore |
| 2011/0197196 A1 | 8/2011 | Felton et al. |
| 2011/0218964 A1 | 9/2011 | Hagan et al. |
| 2011/0248821 A1 | 10/2011 | Merten |
| 2011/0271084 A1 | 11/2011 | Moue et al. |
| 2011/0283185 A1 | 11/2011 | Obasanjo et al. |
| 2012/0011098 A1 | 1/2012 | Yamada |
| 2012/0079606 A1 | 3/2012 | Evans et al. |
| 2012/0102539 A1 | 4/2012 | Robb et al. |
| 2012/0254123 A1 | 10/2012 | Ferguson et al. |
| 2012/0254505 A1 | 10/2012 | Chishtie et al. |
| 2012/0278334 A1 | 11/2012 | Abjanic |
| 2013/0013560 A1 | 1/2013 | Goldberg et al. |
| 2013/0014023 A1 | 1/2013 | Lee et al. |
| 2013/0067542 A1 | 3/2013 | Gonsalves et al. |
| 2013/0080785 A1 | 3/2013 | Ruhlen et al. |
| 2013/0086640 A1 | 4/2013 | Hashimoto et al. |
| 2013/0124690 A1 | 5/2013 | Liebman |
| 2013/0133051 A1 | 5/2013 | Riemers |
| 2013/0138608 A1 | 5/2013 | Smith |
| 2013/0144834 A1 | 6/2013 | Lloyd et al. |
| 2013/0179480 A1 | 7/2013 | Agarwal et al. |
| 2013/0191339 A1 | 7/2013 | Haden et al. |
| 2013/0191631 A1 | 7/2013 | Ylonen et al. |
| 2013/0246527 A1 | 9/2013 | Viera |
| 2013/0254777 A1 | 9/2013 | Branson et al. |
| 2013/0258842 A1 | 10/2013 | Mizutani |
| 2013/0262862 A1* | 10/2013 | Hartley ............ G06F 16/178 713/165 |
| 2013/0268480 A1 | 10/2013 | Dorman |
| 2013/0268559 A1 | 10/2013 | Reeves |
| 2013/0282657 A1* | 10/2013 | Besen ............ G06F 16/1844 707/625 |
| 2013/0282658 A1 | 10/2013 | Besen et al. |
| 2013/0282785 A1 | 10/2013 | Besen et al. |
| 2013/0290323 A1 | 10/2013 | Saib |
| 2013/0304694 A1 | 11/2013 | Barreto et al. |
| 2013/0304765 A1 | 11/2013 | Failelson et al. |
| 2013/0318160 A1 | 11/2013 | Beraka et al. |
| 2013/0321306 A1 | 12/2013 | Bauermeister et al. |
| 2013/0346557 A1 | 12/2013 | Chang et al. |
| 2014/0033324 A1 | 1/2014 | Kiang et al. |
| 2014/0047261 A1 | 2/2014 | Patiejunas et al. |
| 2014/0059002 A1 | 2/2014 | Lockhart et al. |
| 2014/0075501 A1 | 3/2014 | Srinivasan et al. |
| 2014/0082145 A1 | 3/2014 | Lacapra |
| 2014/0136635 A1 | 5/2014 | Jeng et al. |
| 2014/0143543 A1 | 5/2014 | Aikas et al. |
| 2014/0173694 A1 | 6/2014 | Kranz |
| 2014/0181021 A1 | 6/2014 | Montulli et al. |
| 2014/0181033 A1 | 6/2014 | Pawar et al. |
| 2014/0181053 A1 | 6/2014 | Belanger et al. |
| 2014/0181579 A1 | 6/2014 | Whitehead et al. |
| 2014/0188798 A1 | 7/2014 | MacKenzie et al. |
| 2014/0189051 A1 | 7/2014 | Hunter |
| 2014/0189118 A1 | 7/2014 | Hunter |
| 2014/0189355 A1 | 7/2014 | Hunter |
| 2014/0195485 A1 | 7/2014 | Dorman |
| 2014/0195638 A1 | 7/2014 | Houston |
| 2014/0201138 A1 | 7/2014 | Dorman et al. |
| 2014/0201145 A1 | 7/2014 | Dorman et al. |
| 2014/0215551 A1 | 7/2014 | Allain et al. |
| 2014/0250066 A1 | 9/2014 | Calkowski et al. |
| 2014/0258350 A1 | 9/2014 | Duval et al. |
| 2014/0258418 A1 | 9/2014 | Subramani et al. |
| 2014/0259005 A1 | 9/2014 | Jeffrey et al. |
| 2014/0282313 A1 | 9/2014 | Alfieri |
| 2014/0282851 A1 | 9/2014 | Miller et al. |
| 2014/0289195 A1 | 9/2014 | Chan et al. |
| 2014/0297734 A1 | 10/2014 | Lacapra |
| 2014/0297759 A1 | 10/2014 | Mody |
| 2014/0310175 A1 | 10/2014 | Coronel |
| 2014/0317128 A1 | 10/2014 | Simeonov et al. |
| 2014/0359085 A1 | 12/2014 | Chen |
| 2014/0372376 A1 | 12/2014 | Smith et al. |
| 2014/0379647 A1 | 12/2014 | Smith et al. |
| 2015/0012616 A1 | 1/2015 | Pearl et al. |
| 2015/0026222 A1 | 1/2015 | Litzenberger |
| 2015/0026597 A1 | 1/2015 | Gadamsetty et al. |
| 2015/0026604 A1 | 1/2015 | Mulukuri et al. |
| 2015/0026751 A1 | 1/2015 | Yokoi |
| 2015/0058932 A1 | 2/2015 | Faitelson et al. |
| 2015/0088817 A1 | 3/2015 | Dwan et al. |
| 2015/0089019 A1 | 3/2015 | Chou |
| 2015/0100546 A1 | 4/2015 | Eberlein et al. |
| 2015/0100547 A1 | 4/2015 | Holmes-Higgin et al. |
| 2015/0100705 A1 | 4/2015 | Abe et al. |
| 2015/0101021 A1 | 4/2015 | McErlean et al. |
| 2015/0120763 A1 | 4/2015 | Grue et al. |
| 2015/0134600 A1 | 5/2015 | Eisner et al. |
| 2015/0154418 A1 | 6/2015 | Redberg |
| 2015/0163206 A1 | 6/2015 | McCarthy et al. |
| 2015/0172283 A1 | 6/2015 | Omnes et al. |
| 2015/0172412 A1 | 6/2015 | Escriva et al. |
| 2015/0178516 A1 | 6/2015 | Mityagin |
| 2015/0186668 A1 | 7/2015 | Whaley et al. |
| 2015/0193347 A1 | 7/2015 | Kluesing et al. |
| 2015/0205977 A1 | 7/2015 | Rundle et al. |
| 2015/0207844 A1 | 7/2015 | Tataroiu et al. |
| 2015/0220917 A1 | 8/2015 | Aabye et al. |
| 2015/0222431 A1 | 8/2015 | Guido Van Rossum |
| 2015/0222580 A1 | 8/2015 | Grue |
| 2015/0222615 A1 | 8/2015 | Allain et al. |
| 2015/0242521 A1 | 8/2015 | Hunter |
| 2015/0244692 A1 | 8/2015 | Liu et al. |
| 2015/0244795 A1 | 8/2015 | Cantwell et al. |
| 2015/0248384 A1 | 9/2015 | Luo et al. |
| 2015/0249647 A1 | 9/2015 | Mityagin et al. |
| 2015/0277802 A1 | 10/2015 | Oikarinen et al. |
| 2015/0277969 A1 | 10/2015 | Strauss et al. |
| 2015/0278024 A1 | 10/2015 | Barman et al. |
| 2015/0278397 A1 | 10/2015 | Hendrickson et al. |
| 2015/0280959 A1 | 10/2015 | Vincent |
| 2015/0281360 A1 | 10/2015 | Lacapra |
| 2015/0286833 A1 | 10/2015 | Resch et al. |
| 2015/0288680 A1 | 10/2015 | Leggette |
| 2015/0296012 A1 | 10/2015 | Piyush et al. |
| 2015/0310035 A1 | 10/2015 | Godman et al. |
| 2015/0318941 A1 | 11/2015 | Zheng et al. |
| 2015/0356111 A1 | 12/2015 | Kalsi et al. |
| 2015/0358408 A1 | 12/2015 | Fukatani et al. |
| 2015/0370483 A1 | 12/2015 | Schoebel-Theuer |
| 2015/0370825 A1 | 12/2015 | Outcalt et al. |
| 2016/0028796 A1 | 1/2016 | Garcia et al. |
| 2016/0034508 A1 | 2/2016 | Aron et al. |
| 2016/0036822 A1 | 2/2016 | Kim et al. |
| 2016/0042087 A1 | 2/2016 | Yang |
| 2016/0050177 A1 | 2/2016 | Cue et al. |
| 2016/0055021 A1 | 2/2016 | Beveridge et al. |
| 2016/0062839 A1 | 3/2016 | Kapoor |
| 2016/0065672 A1 | 3/2016 | Savage et al. |
| 2016/0085769 A1 | 3/2016 | Penangwala et al. |
| 2016/0092312 A1 | 3/2016 | Dornquast et al. |
| 2016/0103750 A1 | 4/2016 | Cooper et al. |
| 2016/0110374 A1 | 4/2016 | Wetherall et al. |
| 2016/0112508 A1 | 4/2016 | Sher |
| 2016/0140197 A1 | 5/2016 | Gast et al. |
| 2016/0140201 A1 | 5/2016 | Cowling et al. |
| 2016/0182494 A1* | 6/2016 | Lissounov .......... H04L 67/1095 726/10 |
| 2016/0188465 A1 | 6/2016 | Almasi et al. |
| 2016/0188628 A1 | 6/2016 | Hartman et al. |
| 2016/0205100 A1 | 7/2016 | Brannon |
| 2016/0210238 A1 | 7/2016 | Frank et al. |
| 2016/0224989 A1 | 8/2016 | Lissounov et al. |
| 2016/0285890 A1 | 9/2016 | Beausoleil et al. |
| 2016/0291856 A1 | 10/2016 | von Muhlen et al. |
| 2016/0292179 A1 | 10/2016 | Von Muhlen et al. |
| 2016/0292443 A1 | 10/2016 | von Muhlen et al. |
| 2016/0294916 A1 | 10/2016 | Daher et al. |

(56) References Cited

U.S. PATENT DOCUMENTS

| | | |
|---|---|---|
| 2016/0299917 A1 | 10/2016 | Koos et al. |
| 2016/0301619 A1 | 10/2016 | Bashir et al. |
| 2016/0308950 A1 | 10/2016 | Bouvrette et al. |
| 2016/0315941 A1 | 10/2016 | Dang et al. |
| 2016/0321275 A1 | 11/2016 | Yap et al. |
| 2016/0321287 A1 | 11/2016 | Luthra et al. |
| 2016/0321293 A1 | 11/2016 | Auer |
| 2016/0323358 A1 | 11/2016 | Malhotra et al. |
| 2016/0334967 A1 | 11/2016 | Rottler et al. |
| 2016/0335278 A1 | 11/2016 | Tabaaloute et al. |
| 2016/0337356 A1 | 11/2016 | Simon et al. |
| 2016/0342479 A1 | 11/2016 | Chen et al. |
| 2016/0349999 A1 | 12/2016 | Adler et al. |
| 2016/0352752 A1 | 12/2016 | Bush et al. |
| 2016/0353447 A1 | 12/2016 | White et al. |
| 2016/0357720 A1 | 12/2016 | Thimbleby |
| 2016/0366118 A1 | 12/2016 | Wang |
| 2016/0371296 A1 | 12/2016 | Passey et al. |
| 2016/0371358 A1 | 12/2016 | Lee et al. |
| 2017/0005974 A1 | 1/2017 | Wheeler et al. |
| 2017/0006097 A1 | 1/2017 | Johnson |
| 2017/0026379 A1 | 1/2017 | Lu et al. |
| 2017/0039216 A1 | 2/2017 | Fan et al. |
| 2017/0052717 A1 | 2/2017 | Rawat et al. |
| 2017/0075920 A1 | 3/2017 | McKay |
| 2017/0075921 A1 | 3/2017 | Benton et al. |
| 2017/0078383 A1 | 3/2017 | Murstein et al. |
| 2017/0078384 A1 | 3/2017 | Trandatir et al. |
| 2017/0109370 A1 | 4/2017 | Newhouse |
| 2017/0109385 A1 | 4/2017 | Aronovich et al. |
| 2017/0123931 A1 | 5/2017 | Aizman et al. |
| 2017/0124111 A1 | 5/2017 | Sharma et al. |
| 2017/0131934 A1 | 5/2017 | Kaczmarczyk et al. |
| 2017/0149885 A1 | 5/2017 | Kaplan et al. |
| 2017/0177613 A1 | 6/2017 | Sharma et al. |
| 2017/0185687 A1 | 6/2017 | Pai et al. |
| 2017/0192656 A1 | 7/2017 | Pedrick et al. |
| 2017/0192856 A1 | 7/2017 | Chin et al. |
| 2017/0192998 A1 | 7/2017 | Sergeev et al. |
| 2017/0193002 A1 | 7/2017 | Shvachko et al. |
| 2017/0193040 A1 | 7/2017 | Agrawal et al. |
| 2017/0193448 A1 | 7/2017 | Piyush et al. |
| 2017/0195457 A1 | 7/2017 | Smith, II et al. |
| 2017/0220596 A1 | 8/2017 | Smith et al. |
| 2017/0230702 A1 | 8/2017 | Sarosi et al. |
| 2017/0235759 A1 | 8/2017 | Altaparmakov et al. |
| 2017/0270136 A1 | 9/2017 | Chen et al. |
| 2017/0270306 A1 | 9/2017 | Dorwin |
| 2017/0289210 A1 | 10/2017 | Pai et al. |
| 2017/0300505 A1 | 10/2017 | Belmanu Sadananda et al. |
| 2017/0302737 A1 | 10/2017 | Piyush et al. |
| 2017/0308443 A1 | 10/2017 | Lai et al. |
| 2017/0308565 A1 | 10/2017 | Broil et al. |
| 2017/0308598 A1 | 10/2017 | Goldberg et al. |
| 2017/0308599 A1 | 10/2017 | Newhouse |
| 2017/0308602 A1 | 10/2017 | Raghunathan et al. |
| 2017/0308681 A1 | 10/2017 | Gould et al. |
| 2017/0314898 A1 | 11/2017 | Syverson et al. |
| 2017/0316032 A1 | 11/2017 | Kamalaksha et al. |
| 2017/0316222 A1 | 11/2017 | Muhlestein et al. |
| 2017/0331893 A1 | 11/2017 | Crofton et al. |
| 2017/0351701 A1 | 12/2017 | Aron et al. |
| 2017/0357663 A1 | 12/2017 | Giampaolo |
| 2018/0004442 A1 | 1/2018 | Hnanicek et al. |
| 2018/0039788 A1 | 2/2018 | Leggette |
| 2018/0084045 A1 | 3/2018 | Nichols et al. |
| 2018/0089349 A1 | 3/2018 | Rezgui |
| 2018/0121370 A1 | 5/2018 | Mukkamala et al. |
| 2018/0144263 A1 | 5/2018 | Saxena et al. |
| 2018/0150477 A1 | 5/2018 | Jewell et al. |
| 2018/0157825 A1 | 6/2018 | Eksten et al. |
| 2018/0176082 A1 | 6/2018 | Katz et al. |
| 2018/0176093 A1 | 6/2018 | Katz et al. |
| 2018/0176120 A1 | 6/2018 | Katz et al. |
| 2018/0181549 A1 | 6/2018 | Hileman et al. |
| 2018/0196643 A1 | 7/2018 | Dolby et al. |
| 2018/0246946 A1 | 8/2018 | Sadhwani |
| 2018/0260125 A1 | 9/2018 | Botes et al. |
| 2018/0260411 A1 | 9/2018 | Deardeuff et al. |
| 2018/0270534 A1 | 9/2018 | Badawiyeh |
| 2018/0329969 A1* | 11/2018 | Abrams ............... G06F 16/951 |
| 2018/0364950 A1 | 12/2018 | Spillane et al. |
| 2018/0365236 A1 | 12/2018 | Wang et al. |
| 2019/0005139 A1 | 1/2019 | Ford et al. |
| 2019/0034507 A1 | 1/2019 | Duttagupta et al. |
| 2019/0050833 A1 | 2/2019 | Hu et al. |
| 2019/0102370 A1 | 4/2019 | Nelson et al. |
| 2019/0114427 A1 | 4/2019 | Suryanarayana et al. |
| 2019/0179714 A1 | 6/2019 | Karthikeyan et al. |
| 2019/0205423 A1 | 7/2019 | Haven et al. |
| 2019/0205424 A1 | 7/2019 | Jubb, IV |
| 2019/0207940 A1 | 7/2019 | Kleinpeter et al. |
| 2019/0208013 A1 | 7/2019 | Lai |
| 2019/0208014 A1 | 7/2019 | Goldberg et al. |
| 2019/0266342 A1 | 8/2019 | Kleinpeter et al. |
| 2019/0332231 A1 | 10/2019 | Rogers et al. |
| 2019/0332688 A1 | 10/2019 | Valentine et al. |
| 2019/0361793 A1 | 11/2019 | Goldberg |
| 2020/0249877 A1 | 8/2020 | McIlroy et al. |

FOREIGN PATENT DOCUMENTS

| | | |
|---|---|---|
| CN | 106897352 A | 6/2017 |
| CN | 106941504 A | 7/2017 |
| EP | 2757491 A1 | 7/2014 |
| EP | 2911068 A1 | 8/2015 |
| GB | 2399663 A | 9/2004 |
| GB | 2494047 A | 2/2013 |
| WO | 2009126941 A1 | 10/2009 |
| WO | 2014080547 A1 | 5/2014 |
| WO | 2015055035 A1 | 4/2015 |

OTHER PUBLICATIONS

Requirement for Restriction/Election from U.S. Appl. No. 15/858,207, dated Sep. 26, 2019, 6 pages.

Requirement for Restriction/Election from U.S. Appl. No. 15/858,410, dated Sep. 19, 2019, 7 pages.

Advisory Action from U.S. Appl. No. 15/863,748, dated Apr. 15, 2020, 3 pages.

Final Office Action from U.S. Appl. No. 15/867,496, dated Apr. 10, 2020, 14 pages.

Final Office Action from U.S. Appl. No. 15/870,179, dated Apr. 16, 2020, 6 pages.

Non-Final Office Action from U.S. Appl. No. 15/868,505, dated Apr. 13, 2020, 12 pages.

Final Office Action from U.S. Appl. No. 15/863,751, dated Mar. 24, 2020, 16 pages.

Non-Final Office Action from U.S. Appl. No. 15/858,146, dated Apr. 1, 2020, 23 pages.

Non-Final Office Action from U.S. Appl. No. 15/867,486, dated Apr. 3, 2020, 36 pages.

Non-Final Office Action from U.S. Appl. No. 15/867,612, dated Apr. 3, 2020, 14 pages.

Notice of Allowance from U.S. Appl. No. 15/863,819, dated Apr. 7, 2020, 8 pages.

International Search Report and Written Opinion for PCT Application PCT/US2018/064659 dated Mar. 19, 2019, 13 pages.

International Search Report and Written Opinion for PCT Application PCT/US2018/064670 dated Mar. 14, 2019, 13 pages.

International Search Report and Written Opinion for PCT Application PCT/US2018/064675 dated Mar. 13, 2019, 12 pages.

International Search Report and Written Opinion for PCT Application PCT/US2018/065091 dated Mar. 21, 2019, 16 pages.

International Search Report and Written Opinion for PCT Application PCT/US2018/065100 dated Mar. 19, 2019, 11 pages.

International Search Report and Written Opinion for PCT Application PCT/US2018/065352 dated Mar. 19, 2019, 13 pages.

International Search Report and Written Opinion for PCT Application PCT/US2018/065940 dated Mar. 14, 2019, 14 pages.

(56) References Cited

OTHER PUBLICATIONS

International Search Report and Written Opinion for PCT Application PCT/US2018/066193 dated Mar. 14, 2019, 12 pages.
Cobena G., et al., "Detecting Changes in XML Documents," Proceedings of the 18th International Conference on Data Engineering, Jan. 1, 2002, pp. 41-52.
International Search Report and Written Opinion for PCT Application PCT/US2018/065097 dated Mar. 19, 2019, 14 pages.
International Search Report and Written Opinion for PCT Application PCT/US2018/065347 dated Apr. 2, 2019, 16 pages.
Lindholm T., et al., "A Hybrid Approach to Optimistic File System Directory Tree Synchronization," MobiDE 2005, Proceedings of 4th ACM International Workshop on Data Engineering for Wireless and Mobile Access, Jun. 12, 2005, pp. 49-56.
Lindholm T., "XML Three-way Merge as a Reconciliation Engine for Mobile Data," Proceedings of the 3rd ACM International Workshop on Data Engineering for Wireless and Mobile Access, MobiDE'03, Sep. 19, 2003, pp. 93-97.
Phan R.C.W., et al., "Security Considerations for Incremental Hash Functions Based on Pair Block Chaining," Computers & Security, vol. 25 (2), Jan. 30, 2006, pp. 131-136.
Wang Y., et al., "X-Diff: An Effective Change Detection Algorithm for XML Documents," 2003 IEEE, Proceedings of the 19th International Conference on Data Engineering (ICDE'03), Mar. 5-8, 2003, pp. 519-530.
Uppoor S., et al., "Cloud-based Synchronization of Distributed File System Hierarchies," 2010 IEEE International Conference on Cluster Computing Workshops and Posters (Cluster Workshops), Sep. 20, 2010, pp. 1-4.
Non-Final Office Action from U.S. Appl. No. 15/858,125, dated Dec. 31, 2019, 12 pages.
Non-Final Office Action from U.S. Appl. No. 15/858,207, dated Jan. 22, 2020, 15 pages.
Non-Final Office Action from U.S. Appl. No. 15/858,357, dated Jan. 7, 2020, 15 pages.
Notice of Allowance from U.S. Appl. No. 15/868,489, dated Jan. 24, 2020, 2 pages.
Notice of Allowance from U.S. Appl. No. 15/870,221, dated Jan. 17, 2020, 22 pages.
Notice of Allowance from U.S. Appl. No. 15/873,693, dated Jan. 30, 2020, 5 pages.
Non-Final Office Action for U.S. Appl. No. 15/868,511 dated Feb. 5, 2020, 11 pages.
Non-Final Office Action from U.S. Appl. No. 15/858,110, dated Feb. 24, 2020, 13 pages.
Non-Final Office Action from U.S. Appl. No. 15/863,815, dated Mar. 18, 2020, 17 pages.
Non-Final Office Action from U.S. Appl. No. 15/867,571, dated Feb. 26, 2020, 28 pages.
Notice of Allowance from U.S. Appl. No. 15/863,819, dated Mar. 6, 2020, 10 pages.
Notice of Allowance from U.S. Appl. No. 15/868,489, dated Feb. 20, 2020, 2 pages.
Notice of Allowance from U.S. Appl. No. 15/870,221, dated Feb. 25, 2020, 19 pages.
Final Office Action from U.S. Appl. No. 15/863,748, dated Dec. 20, 2019, 19 pages.
Non-Final Office Action from U.S. Appl. No. 15/858,410, dated Nov. 29, 2019, 14 pages.
Non-Final Office Action from U.S. Appl. No. 15/858,430, dated Nov. 26, 2019, 10 pages.
Non-Final Office Action from U.S. Appl. No. 15/863,751, dated Nov. 6, 2019, 17 pages.
Non-Final Office Action from U.S. Appl. No. 15/867,496, dated Nov. 13, 2019, 12 pages.
Non-Final Office Action from U.S. Appl. No. 15/868,505, dated Nov. 14, 2019, 7 pages.
Notice of Allowance from U.S. Appl. No. 15/868,489, dated Dec. 27, 2019, 2 pages.
Notice of Allowance from U.S. Appl. No. 15/873,693, dated Dec. 26, 2019, 9 pages.
Notice of Allowance from U.S. Appl. No. 15/873,693, dated Oct. 29, 2019, 10 pages.
Cristal T. Pollack and Scott Brandt, "Efficient Access Control for Distributed Hierarchical File Systems." Source: Proceedings—Twenty-second IEEE/Thirteenth NASA Goddard Conference on Mass Storage Systems and Technologies, IEEE/NASA MSST2005, Apr. 11, 2005-Apr. 14, 2005, pp. 253-260.
"CentreStack", Gladinet, Inc., Boca Raton, FL, May 30, 2015 (Available online at https://webcache.googleusercontent.com/search?q=cache: R3ogLpu7xJYJ:https://www.gladinet.com/library/admin/index.htm+&cd=1&hl=en&ct=clnk&gl=us, last visited Feb. 8, 2018).
Salman Niazi et al., "HopsFS: Scaling Hierarchical File System Metadata Using NewSQL Databases," The 15th USENIX Conference on File and Storage Technologies (FAST 17) (2017), pp. 89-104, Submitted on Jun. 6, 2016 (v1), last revised Feb. 22, 2017 (this version, v2)).
Chang Liu, Xin Ye and En Ye, "Source Code Revision History Visualization Tools: Do They Work and What Would it Take to Put Them to Work?", IEEE Access, vol. 2, 2014, published May 6, 2014, pp. 404-426.
V. Swathy et al., "Providing Advanced Security Mechanism for Scalable Data Sharing in Cloud Storage," 2016 International Conference on Inventive Computation Technologies (ICICT), 2016, vol. 3, pp. 1-6.
Final Office Action from U.S. Appl. No. 15/858,125, dated Jun. 26, 2020, 15 pages.
Final Office Action from U.S. Appl. No. 15/858,207, dated Jul. 2, 2020, 16 pages.
Kappes G., et al., "Virtualization-aware Access Control for Multitenant Filesystems," MSST 2014, Jun. 2-6, 2014, pp. 1-6.
Mell P M., et al., "Linear Time Algorithms to Restrict Insider Access using Multi-Policy Access Control Systems," Apr. 2013, retrieved from https://www.nist.gov/publications/linear-time-algorithms-restrict-insider-access-using-multi-policy-access-control, on Dec. 31, 2019, 2 Pages.
Non-Final Office Action from U.S. Appl. No. 15/857,713, dated Jan. 7, 2020, 16 pages.
Non-Final Office Action from U.S. Appl. No. 15/863,751, dated Jul. 7, 2020, 16 pages.
Wolff D, "A Web-Based Tool for Managing the Submission of Student Work," Journal of Computing Sciences in Colleges, Dec. 2004, vol. 20 (2), pp. 144-153.
Examination Report for Australian Application No. 2018395933 dated Sep. 30, 2020, 4 pages.
Final Office Action from U.S. Appl. No. 15/857,713, dated Jul. 16, 2020, 22 pages.
Final Office Action from U.S. Appl. No. 15/867,571, dated Sep. 3, 2020, 34 pages.
Final Office Action from U.S. Appl. No. 15/867,612, dated Sep. 28, 2020, 16 pages.
Final Office Action from U.S. Appl. No. 15/868,511, dated Jul. 14, 2020, 10 pages.
Non-Final Office Action from U.S. Appl. No. 15/858,207, dated Sep. 30, 2020, 20 pages.
Non-Final Office Action from U.S. Appl. No. 15/858,430, dated Oct. 6, 2020, 11 pages.
Non-Final Office Action from U.S. Appl. No. 15/863,748, dated Aug. 18, 2020, 25 pages.
Notice of Allowance from U.S. Appl. No. 15/858,110, dated Sep. 3, 2020, 11 pages.
Notice of Allowance from U.S. Appl. No. 15/858,125, dated Sep. 9, 2020, 17 pages.
Notice of Allowance from U.S. Appl. No. 15/858,146, dated Sep. 10, 2020, 9 pages.
Notice of Allowance from U.S. Appl. No. 15/858,357, dated Aug. 18, 2020, 12 pages.
Notice of Allowance from U.S. Appl. No. 15/858,410, dated Jul. 14, 2020, 12 pages.
Notice of Allowance from U.S. Appl. No. 15/863,815, dated Sep. 30, 2020, 13 pages.

(56) References Cited

OTHER PUBLICATIONS

Notice of Allowance from U.S. Appl. No. 15/868,505, dated Jul. 15, 2020, 8 pages.
Notice of Allowance from U.S. Appl. No. 15/868,511, dated Sep. 16, 2020, 9 pages.
Notice of Allowance from U.S. Appl. No. 15/870,179, dated Aug. 12, 2020, 7 pages.
Uppoor et al., "Cloud Based Synchronization of Distributed File System Hierarchies," Cluster Computing Workshops and Posters, Sep. 20, 2010, 4 pages.
Chiang J.K., et al., "Authentication, Authorization and File Synchronization on Hybrid Cloud—On Case of Google Docs, Hadoop, and Linux Local Hosts", IEEE, Jul. 2-5, 2013, pp. 116-123.
Communication under Rule 94(3) EPC for European Application No. 18839962.0 dated Oct. 26, 2020, 9 pages.
Communication Pursuant to Article 94(3) EPC for European Application No. 18830580.9 dated Jan. 14, 2021, 9 pages.
Communication Pursuant to Article 94(3) EPC for European Application No. 18836962.3 dated Jan. 14, 2020, 5 pages.
Examination Report No. 1, for Australian Application No. 2018393933, dated Mar. 9, 2021, 4 pages.
Examination Report No. 1, for Australian Application No. 2018395856, dated Dec. 14, 2020, 4 pages.
Examination Report No. 1, for Australian Application No. 2018395857, dated Mar. 9, 2021, 5 pages.
Examination Report No. 1, for Australian Application No. 2018395858, dated Feb. 5, 2021, 4 pages.
Examination Report No. 1, for Australian Application No. 2018397571, dated Mar. 4, 2021, 4 pages.
Examination Report No. 1 for Australian Application No. 2018397572 dated Feb. 8, 2021, 5 pages.
Examination Report No. 2, for Australian Application No. 2018395856, dated Mar. 18, 2021, 4 pages.
Examination Report No. 1, for Australian Application No. 2018395919, dated Dec. 22, 2020, 5 pages.
Examination Report No. 1 for Australian Application No. 2018395920 dated Oct. 16, 2020, 4 pages.
Examination Report No. 1, for Australian Application No. 2018397604, dated Dec. 22, 2020, 3 pages.
Final Office Action from U.S. Appl. No. 15/863,748, dated Feb. 5, 2021, 24 pages.
Final Office Action from U.S. Appl. No. 15/863,751, dated Dec. 16, 2020, 19 pages.
Final Office Action from U.S. Appl. No. 15/867,486, dated Nov. 3, 2020, 38 pages.
Kher V., et al., "Securing Distributed Storage: Challenges, Techniques, and Systems," ACM, Nov. 2005, pp. 9-25.
Marshall C.C., et al., "Supporting Research Collaboration through Bi-Level File Synchronization," ACM, Oct. 2012, pp. 165-174.
Non-Final Office Action from U.S. Appl. No. 15/857,713, dated Nov. 25, 2020, 28 pages.
Non-Final Office Action from U.S. Appl. No. 15/867,486, dated Feb. 5, 2021, 37 pages.
Non-Final Office Action from U.S. Appl. No. 15/867,612, dated Dec. 8, 2020, 17 pages.
Notice of Allowance from U.S. Appl. No. 15/858,110, dated Dec. 11, 2020, 10 pages.
Notice of Allowance from U.S. Appl. No. 15/858,110, dated Jan. 6, 2021, 2 pages.
Notice of Allowance from U.S. Appl. No. 15/858,125, dated Nov. 3, 2020, 17 pages.
Notice of Allowance from U.S. Appl. No. 15/858,146, dated Nov. 17, 2020, 10 pages.
Notice of Allowance from U.S. Appl. No. 15/858,192, dated Jan. 27, 2021, 9 pages.
Notice of Allowance from U.S. Appl. No. 15/858,207, dated Mar. 24, 2021, 17 pages.
Notice of Allowance from U.S. Appl. No. 15/863,751, dated Mar. 24, 2021, 8 pages.
Notice of Allowance from U.S. Appl. No. 15/863,815, dated Jan. 21, 2021, 12 pages.
Notice of Allowance from U.S. Appl. No. 15/867,571, dated Dec. 10, 2020, 16 pages.
Notice of Allowance from U.S. Appl. No. 15/867,571, dated Jan. 19, 2021, 1 pages.
Notice of Allowance from U.S. Appl. No. 15/867,612, dated Mar. 11, 2021, 5 pages.
Notice of Allowance from U.S. Appl. No. 15/868,511, dated Jan. 25, 2021, 7 pages.
Wang H., et al., "On the Impact of Virtualization on Dropbox-like Cloud File Storage/Synchronization Services," IEEE, Jun. 4-5, 2012, pp. 1-9.
Notice of Allowance from U.S. Appl. No. 15/870,221, dated Apr. 10, 2020, 19 pages.
Notice of Allowance from U.S. Appl. No. 15/858,357, dated May 26, 2020, 22 pages.
Notice of Allowance from U.S. Appl. No. 15/858,410, dated May 22, 2020, 18 pages.
Notice of Allowance from U.S. Appl. No. 15/867,496, dated May 28, 2020, 10 pages.
Final Office Action from U.S. Appl. No. 15/858,430, dated Jun. 12, 2020, 11 pages.
Non-Final Office Action from U.S. Appl. No. 15/858,192, dated Jun. 12, 2020, 13 pages.
Notice of Allowance from U.S. Appl. No. 15/870,179, dated Jun. 11, 2020, 7 pages.
"Active Directory Architecture", retrieved from https://technet.microsoft.com/en-us/library/bb727030.aspx, 2017, pp. 1-39.
Advisory Action from U.S. Appl. No. 15/857,772, dated Feb. 9, 2021, 4 pages.
Advisory Action from U.S. Appl. No. 15/857,772, dated Jun. 12, 2020, 3 pages.
Biztalkserver, "Optimizing Business Rule Engine (BRE) Performance," Jun. 7, 2017, retrieved from https://docs.microsoft.com/en-us/biztalk/technical-guides/optimizing-business-rule-engine-bre-performance, on Oct. 22, 2019, 5 Pages.
Capra R., et al., "File Synchronization and Sharing: User Practices and Challenges", 77th ASIS&T Annual Meeting, Seattle, WA, Oct. 31-Nov. 5, 2014, 10 pages.
Chris G.,"Dropbox for Business 3.0", retrieved from www.chrismgrant.com/product-design/dropbox-for-business, 2018, pp. 1-98.
Clercq J D., "How to Use the Bypass Traverse Checking User Right," Aug. 27, 2008, ITProToday, https://www.tprotoday.com/print/20355, 2 pages.
Communication Pursuant to Article 94(3) EPC for European Application No. 18834121.8 dated Apr. 28, 2021, 10 pages.
Examination Report No. 2, for Australian Application No. 2018397571, dated Mar. 30, 2021, 4 pages.
Examination Report No. 2, for Australian Application No. 2018395919, dated May 3, 2021, 3 pages.
Final Office Action from U.S. Appl. No. 15/857,588, dated Aug. 3, 2020, 16 pages.
Final Office Action from U.S. Appl. No. 15/857,713, dated Apr. 7, 2021, 22 pages.
Final Office Action from U.S. Appl. No. 15/857,725, dated Oct. 26, 2020, 14 pages.
Final Office Action from U.S. Appl. No. 15/857,729, dated Dec. 7, 2020, 15 pages.
Final Office Action from U.S. Appl. No. 15/857,729, dated Mar. 11, 2020, 16 pages.
Final Office Action from U.S. Appl. No. 15/857,732, dated Feb. 26, 2021, 35 pages.
Final Office Action from U.S. Appl. No. 15/857,732, dated May 1, 2020, 26 pages.
Final Office Action from U.S. Appl. No. 15/857,772, dated Mar. 26, 2020, 12 pages.
Final Office Action from U.S. Appl. No. 15/857,772, dated Nov. 12, 2020, 18 pages.
Final Office Action from U.S. Appl. No. 15/857,779, dated Jun. 17, 2020, 25 pages.
Final Office Action from U.S. Appl. No. 15/857,779, dated Mar. 2, 2021, 26 pages.

(56) References Cited

OTHER PUBLICATIONS

Final Office Action from U.S. Appl. No. 15/857,784, dated Apr. 3, 2020, 18 pages.
Final Office Action from U.S. Appl. No. 15/857,784, dated Oct. 30, 2020, 20 pages.
Final Office Action from U.S. Appl. No. 15/857,789, dated Feb. 24, 2021, 21 pages.
Final Office Action from U.S. Appl. No. 15/857,789, dated Jun. 5, 2020, 15 pages.
Final Office Action from U.S. Appl. No. 15/858,430, dated Apr. 15, 2021, 12 pages.
"Give Access to a Subdirectory Without Giving Access to Parent Directories," Dec. 17, 2012, Superuser, https://superuser.com/questions/520537/give-access-to-a-subdirectory-without-giving-access-to-parent-directories, 5 pages.
Grunbacher., et al., "POSIX Access Control Lists on Linux," Usenix, https://www.usenix.org/legacy/publications/library/proceedings/usenix03/tech/freenix03/full_papers/gruenbacher/gruenbacher_html/main.html, Apr. 4, 2003, pp. 1-23.
"How to Create Home Folders for User Accounts", retrieved from https://www.manageengine.com/products/ad-manager/admanager-kb/create-home-folders-for-user-accounts_html 2015, pp. 1-5.
Karjoth G., et al., "Implementing ACL-based Policies in XACML," 2008, Annual Computer Security Applications Conference, 10 pages.
King E., "Linux Namespaces," https://medium.com/@teddyking/linux-namespaces-850489d3ccf, Dec. 10, 2016, 3 pages.
Klein H., "Puzzle: Delete Directory Content Without Deleting the Directory Itself (on the Command Line)", retrieved from https://helgeklein.com/blog/author/helge/, on Aug. 5, 2009, pp. 1-11.
Kuo Y H., et al., "A Hybrid Cloud Storage Architecture for Service Operational High Availability", COMPSACW, Jul. 2013, pp. 487-492.
Linux.Org., "Mount a File System," retrieved from https://www.linux.org/docs/man8/mount.html, Jan. 2012, pp. 1-17.
Microsoft Outlook, "Cannot Copy this Folder because it may Contain Private Items," Feb. 23, 2015, retrieved from http://techy-wire.blogspot.com/2015/02/cannot-copy-this-folder-because-it-may.html, 3 pages.
Non-Final Office Action from U.S. Appl. No. 15/857,588, dated Apr. 2, 2020, 14 pages.
Non-Final Office Action from U.S. Appl. No. 15/857,715, dated Feb. 20, 2020, 8 pages.
Non-Final Office Action from U.S. Appl. No. 15/857,725, dated Feb. 25, 2021, 14 pages.
Non-Final Office Action from U.S. Appl. No. 15/857,725, dated Jan. 2, 2020, 10 pages.
Non-Final Office Action from U.S. Appl. No. 15/857,725, dated Jun. 18, 2020, 13 pages.
Non-Final Office Action from U.S. Appl. No. 15/857,729, dated Jul. 21, 2020, 15 pages.
Non-Final Office Action from U.S. Appl. No. 15/857,729, dated Nov. 20, 2019, 12 pages.
Non-Final Office Action from U.S. Appl. No. 15/857,732, dated Dec. 27, 2019, 29 pages.
Non-Final Office Action from U.S. Appl. No. 15/857,732, dated Sep. 17, 2020, 29 pages.
Non-Final Office Action from U.S. Appl. No. 15/857,766, dated Oct. 31, 2019, 27 pages.
Non-Final Office Action from U.S. Appl. No. 15/857,772, dated Jul. 23, 2020, 16 pages.
Non-Final Office Action from U.S. Appl. No. 15/857,772, dated Nov. 25, 2019, 11 pages.
Non-Final Office Action from U.S. Appl. No. 15/857,779, dated Jan. 17, 2020, 17 pages.
Non-Final Office Action from U.S. Appl. No. 15/857,779, dated Oct. 15, 2020, 23 pages.
Non-Final Office Action from U.S. Appl. No. 15/857,784, dated Dec. 19, 2019, 18 pages.
Non-Final Office Action from U.S. Appl. No. 15/857,784, mailed Jul. 24, 2020, 19 pp.
Non-Final Office Action from U.S. Appl. No. 15/857,789, dated Jan. 22, 2020, 15 pages.
Non-Final Office Action from U.S. Appl. No. 15/857,789, dated Sep. 29, 2020, 19 pages.
Non-Final Office Action from U.S. Appl. No. 16/026,531, dated Jul. 27, 2020, 22 pages.
Non-Final Office Action from U.S. Appl. No. 16/118,514, dated Nov. 27, 2019, 13 pages.
Notice of Allowance from U.S. Appl. No. 15/857,715, dated Aug. 7, 2020, 5 pages.
Notice of Acceptance for Australian Application No. 2018395920 dated Apr. 27, 2021, 3 pages.
Notice of Allowance from U.S. Appl. No. 15/857,588, dated Oct. 7, 2020, 10 pages.
Notice of Allowance from U.S. Appl. No. 15/857,766, dated Apr. 7, 2020, 19 pages.
Notice of Allowance from U.S. Appl. No. 15/857,766, dated Mar. 10, 2020, 20 pages.
Notice of Allowance from U.S. Appl. No. 15/857,784, dated Dec. 30, 2020, 15 pages.
Notice of Allowance from U.S. Appl. No. 15/858,192, dated Apr. 8, 2021, 10 pages.
Notice of Allowance from U.S. Appl. No. 15/858,207, dated May 25, 2021, 2 pages.
Notice of Allowance from U.S. Appl. No. 15/863,751, dated Apr. 15, 2021, 2 pages.
Notice of Allowance from U.S. Appl. No. 16/026,531, dated Jan. 29, 2021, 9 pages.
Notice of Allowance from U.S. Appl. No. 16/118,514, dated Apr. 8, 2020, 17 pages.
Notice of Allowance from U.S. Appl. No. 16/118,514, dated May 20, 2020, 11 pages.
NTFS, "File and Folder Basic NTFS Permissions," Dec. 7, 2016, retrieved from http://www.ntfs.com/ntfs-permissions-file-folderhtm, on Jan. 14, 2020, 9 Pages.
Prusty N., et al., "Unix File System Permissions Tutorial," retrieved from URL: http://qnimate.com/understanding-unix-filesystem-permissions/, 2014-2015, 8 pages.
Requirement for Restriction/Election from U.S. Appl. No. 15/857,588, dated Jan. 29, 2020, 6 pages.
Rubyrailesguide, "Active Record Callbacks," Nov. 18, 2016, retrieved from https://web.archive.org/web/20161118225731/http://guidessubyonrails.org/active_record_callbacks_html, on Dec. 13, 2019, 11 Pages.
Search Query Report from IP.com (performed Feb. 25, 2020).
Search Query Report from Ip.com (performed Mar. 27, 2020).
Shields I., et al., "Learn Linux, 101: Manage File Permissions and Ownership," https://developer.ibm.com/technologies/linux/tutorials/I-Ipic1-104-5/, Jan. 27, 2016, 21 pages.
Tridgell A,., et al., "rsync," edited on Nov. 24, 2017, retrieved from https://en.wikipedia.org/wikipedia.org/w/index.php?title=Rsync&oldid=811846440#cite_note-pool-25, on Apr. 20, 2021, 7 pages.
Tridgell A, "rsync(1)," XP055032454, retrieved from http://sunsite.ualberta.ca/Documentation/Misc/rsync-2.6.6/rsync.1.html, Jul. 28, 2005, 33 pages.
Ucar, "Setting file and directory permissions," Sep. 2017, retrieved from https://web.archive.org/web/20170920093821/https://www2.cisl.ucar.edu/user-support/setting-file-and-directory-permissions, on Dec. 8, 2019, 5 Pages.
Unix & Linux Stack Exchange, "Execute vs Read Bit. How do Directory Permissions in Linux Work?", Dec. 15, 2016, retrieved from https://unix.stackexchange.com/questions/21251/execute-vs-read-bit-how-do-directory-permissions-in-linux-work, on Mar. 20, 2020, 3 pages.

* cited by examiner

INCREMENTAL CLIENT SYNCHRONIZATION

CROSS-REFERENCE TO RELATED APPLICATIONS

This application claims the benefit of U.S. provisional application No. 62/611,473, filed on Dec. 28, 2017, which is expressly incorporated by reference herein in its entirety.

BACKGROUND

Content management systems allow users to access and manage content items across multiple devices using a network. Some content management systems may allow users to share content items and provide additional features that aid users in collaborating using the content items. Content management systems generally store content items on servers and allow users access to the content items over a network. Some content management systems also allow for local copies to be stored on a client device in order to provide users with faster access to content items in a more natural interface (e.g., a native application or within the file system of the client device). Additionally, this allows the user to have access to the content items when the user is offline. Content management systems attempt to synchronize copies of a content item across a number of client devices and the servers so that each copy is identical. However, synchronization of content items is difficult and is associated with numerous technical obstacles.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
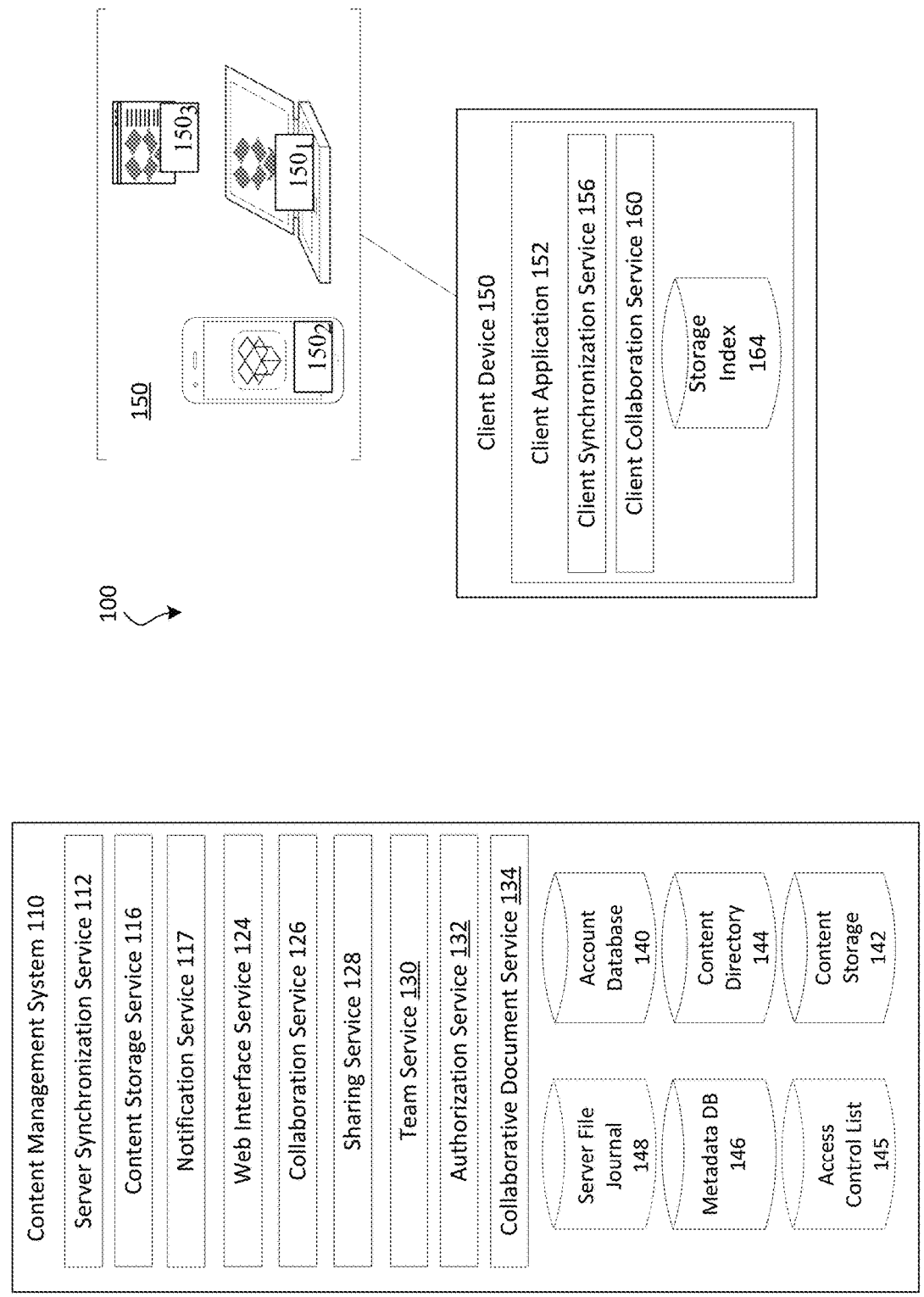
FIG. 1 shows an example of a content management system and client devices, in accordance with some embodiments.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

Various advances in computing and networking technologies have enabled content management systems to provide users with access to content items across multiple devices. The content items may include, but are not limited to, files, documents, messages (e.g., email messages or text messages), media files (e.g., photos, videos, and audio files), folders containing other content items, or any other unit of content. Content items may be shared with multiple users, edited, deleted, added, renamed, or moved. However, synchronizing these content items across several computing devices (e.g., servers and client devices) and across several user accounts has remained flawed and rife with technological obstacles.

To illustrate some of the technical obstacles, a first machine (e.g., a client device or server) may send communications to a second machine that provides information about how a user has modified content items managed by the content management system. These communications may be used by the second machine to synchronize the content items on the second machine such that actions performed on content items on the first machine are reflected in content items on the second machine and the content items on the first machine are substantially identical to the content items on the second machine.

However, there may be several communications sent and the communications may be received out of order as a result of various network routing protocols used by the one or more networks used to transmit the communications, the technical operations of the first or second machine, or some other reason. Furthermore, a user may be performing a large number of modifications to a large number of content items, undo previous modifications in a short amount of time, or quickly perform additional modifications to a previously modified content item or set of content items. This increases the likelihood that these communications are received out of order, certain communications are out of date, or that the second machine will perform operations on content items that are not up to date. As a result, many of the operations may not be compatible with the current state of the content items. In fact, it may be difficult to even detect whether some operations are in conflict with other operations or with the current state of the content items.

Additionally, there is an inherent latency with respect to synchronization actions. For example, actions taken on the first machine are first detected by the first machine, and a communication is generated and then transmitted through a network. The communication is received by the second machine, which may still be processing previous communications and taking actions detailed in the communications. In this illustrative scenario, there are several points where latency is introduced by limited computing resources (e.g., bandwidth, memory, processing time, processing cycles, etc.) of the first machine, the second machine, and/or the network. As latency increases the likelihood that communications, for some reason, conflict with the current state of the content items are increased. Furthermore, processing these conflicted communications and resolving the conflicts also expends needless computing resources such as processing time, memory, energy, or bandwidth and further increases latency.

To further complicate matters, the same or different user on the second machine and/or additional machines with access to the content items may also be performing modification to the content items. As a result, the issues above may be multiplied and additional technical issues arise as to whether local actions conflict with remote actions and/or whether local actions are operating on up to date content items.

The disclosed technology addresses the need in the art for a client synchronization service for a content management system that provides a technical solution to the technical problems above as well as others. The client synchronization service may be configured to operate on a client device and identify synchronization mismatches between content items on a server of the content management system and corresponding content items on the client device. For each synchronization mismatch, the client synchronization service may identify operations needed to synchronize the content items and initiate those operations.

The client synchronization service may track the status of content items on the server, the status of content items on the client device, and their synchronization state using a set of tree data structures ("trees"). According to some embodiments, a set of 3 trees may be used. The three trees may include a remote tree that represents a server state, a local tree that represents the file system state on the client device, and a sync tree that represents a merge base for the local tree and the remote tree. The merge base may be thought of as a common ancestor of the local tree and the remote tree or a last known synced state between the local tree and the remote tree. Accordingly, the client synchronization service may determine that the server state and the client device state are synchronized when all 3 trees (e.g., the remote tree, the sync tree, and the local tree) are identical.

When a modification to the server state of the content items or the client device file system state ("file system state") of the content items is detected, the client synchronization service updates the appropriate tree and determines whether the server state and the file system state are synchronized based on the triumvirate of trees. Based on the update to one of the trees, the server state and the file system state may become synchronized, become unsynchronized, or become further unsynchronized. If the server state and the file system state are not synchronized, the client synchronization service may identify at least an initial set of operations needed to converge the server state and the file system state and get the server state and the file system state closer to a synchronized state.

By relying on the set of tree data structures to monitor the server state and the file system state provides alternatives and/or solutions rooted in computing technology to various technical problems. For example, the client synchronization service is able to track the server state as well as the file state and store a representation of a merge base of the two states. As a result, the various embodiments of the subject technology avoid the technical problems associated with receiving a number of communications specifying how users are modifying content items remotely and determining which order these modifications should be implemented locally, whether the modifications conflict with other modifications or are out of date, and whether remote modifications conflict with local modifications performed locally by users. Many of these issues arise from other solutions not being able to track the state of the various actors involved (e.g., the server and the client device) and not being able to quickly determine whether the states are in sync. Instead, these other solutions rely on receiving instructions on how to modify content items locally, without the context of whether the server state and file system state are in sync.

Furthermore, since the server state and the file system state are continuously monitored, determining whether they are synced is much more efficient in terms of procedural complexity as well as computing time and resources. As is described in further detail below, the client synchronization service enables the incremental and methodical synchronization of the server state and the file system state in a more deterministic manner. As a result, the scaling and testing of content management system features is also more efficient.

Content Management System

In some embodiments, the disclosed technology is deployed in the context of a content management system having content item synchronization capabilities and collaboration features, among others. An example system configuration 100 is shown in FIG. 1A, which depicts content management system 110 interacting with client device 150.

Accounts

Content management system 110 can store content items in association with accounts, as well as perform a variety of content item management tasks, such as retrieve, modify, browse, and/or share the content item(s). Furthermore, content management system 110 can enable an account to access content item(s) from multiple client devices.

Content management system 110 supports a plurality of accounts. An entity (user, group of users, team, company, etc.) can create an account with content management system, and account details can be stored in account database 140. Account database 140 can store profile information for registered entities. In some cases, profile information for registered entities includes a username and/or email address. Account database 140 can include account management information, such as account type (e.g. various tiers of free or paid accounts), storage space allocated, storage space used, client devices 150 having a registered content management client application 152 resident thereon, security settings, personal configuration settings, etc.

Account database 140 can store groups of accounts associated with an entity. Groups can have permissions based on group policies and/or access control lists, and members of the groups can inherit the permissions. For example, a marketing group can have access to one set of content items while an engineering group can have access to another set of content items. An administrator group can modify groups, modify user accounts, etc.

Content Item Storage

A feature of content management system 110 is the storage of content items, which can be stored in content storage 142. Content items can be any digital data such as documents, collaboration content items, text files, audio files, image files, video files, webpages, executable files, binary files, etc. A content item can also include collections or other mechanisms for grouping content items together with different behaviors, such as folders, zip files, playlists, albums, etc. A collection can refer to a folder, or a plurality of content items that are related or grouped by a common attribute. In some embodiments, content storage 142 is combined with other types of storage or databases to handle specific functions. Content storage 142 can store content items, while metadata regarding the content items can be stored in metadata database 146. Likewise, data regarding where a content item is stored in content storage 142 can be stored in content directory 144. Additionally, data regarding changes, access, etc. can be stored in server file journal 148. Each of the various storages/databases such as content storage 142, content directory 144, server file journal 148, and metadata database 146 can be comprised of more than one such storage or database and can be distributed over many devices and locations. Other configurations are also possible. For example, data from content storage 142, content directory 144, server file journal 148, and/or metadata database 146 may be combined into one or more content storages or databases or further segmented into additional content storages or databases. Thus, content management system 110 may include more or less storages and/or databases than shown in FIG. 1.

In some embodiments, content storage 142 is associated with at least one content storage service 116, which includes software or other processor executable instructions for managing the storage of content items including, but not limited to, receiving content items for storage, preparing content items for storage, selecting a storage location for the content item, retrieving content items from storage, etc. In some embodiments, content storage service 116 can divide a content item into smaller chunks for storage at content storage 142. The location of each chunk making up a content item can be recorded in content directory 144. Content directory 144 can include a content entry for each content item stored in content storage 142. The content entry can be associated with a unique ID, which identifies a content item.

In some embodiments, the unique ID, which identifies a content item in content directory 144, can be derived from a deterministic hash function. This method of deriving a unique ID for a content item can ensure that content item duplicates are recognized as such since the deterministic hash function will output the same identifier for every copy of the same content item, but will output a different identifier for a different content item. Using this methodology, content storage service 116 can output a unique ID for each content item.

Content storage service 116 can also designate or record a content path for a content item in metadata database 146. The content path can include the name of the content item and/or folder hierarchy associated with the content item. For example, the content path can include a folder or path of folders in which the content item is stored in a local file system on a client device. While content items are stored in content storage 142 in blocks and may not be stored under a tree like directory structure, such directory structure is a comfortable navigation structure for users. Content storage service 116 can define or record a content path for a content item wherein the "root" node of a directory structure can be a namespace for each account. Within the namespace can be a directory structure defined by a user of an account and/or content storage service 116. Metadata database 146 can store the content path for each content item as part of a content entry.

In some embodiments the namespace can include additional namespaces nested in the directory structure as if they are stored within the root node. This can occur when an account has access to a shared collection. Shared collections can be assigned their own namespace within content management system 110. While some shared collections are actually a root node for the shared collection, they are located subordinate to the account namespace in the directory structure, and can appear as a folder within a folder for the account. As addressed above, the directory structure is merely a comfortable navigation structure for users, but does not correlate to storage locations of content items in content storage 142.

While the directory structure in which an account views content items does not correlate to storage locations at content management system 110, the directory structure can correlate to storage locations on client device 150 depending on the file system used by client device 150.

As addressed above, a content entry in content directory 144 can also include the location of each chunk making up a content item. More specifically, the content entry can include content pointers that identify the location in content storage 142 of the chunks that make up the content item.

In addition to a content path and content pointer, a content entry in content directory 144 can also include a user account identifier that identifies the user account that has access to the content item and/or a group identifier that identifies a group with access to the content item and/or a namespace to which the content entry belongs.

Content storage service 116 can decrease the amount of storage space required by identifying duplicate content items or duplicate blocks that make up a content item or versions of a content item. Instead of storing multiple copies, content storage 142 can store a single copy of the content item or block of the content item and content directory 144 can include a pointer or other mechanism to link the duplicates to the single copy.

Content storage service 116 can also store metadata describing content items, content item types, folders, file path, and/or the relationship of content items to various accounts, collections, or groups in metadata database 146, in association with the unique ID of the content item.

Content storage service 116 can also store a log of data regarding changes, access, etc. in server file journal 148. Server file journal 148 can include the unique ID of the content item and a description of the change or access action along with a time stamp or version number and any other relevant data. Server file journal 148 can also include pointers to blocks affected by the change or content item access. Content storage service can provide the ability to undo operations, by using a content item version control that tracks changes to content items, different versions of content items (including diverging version trees), and a change history that can be acquired from the server file journal 148.

Content Item Synchronization

Another feature of content management system 110 is synchronization of content items with at least one client device 150. Client device(s) can take different forms and have different capabilities. For example, client device $150_1$ is a computing device having a local file system accessible by multiple applications resident thereon. Client device $150_2$ is a computing device wherein content items are only accessible to a specific application or by permission given by the specific application, and the content items are typically stored either in an application specific space or in the cloud. Client device $150_3$ is any client device accessing content management system 110 via a web browser and accessing content items via a web interface. While example client devices $150_1$, $150_2$, and $150_3$ are depicted in form factors such as a laptop, mobile device, or web browser, it should be understood that the descriptions thereof are not limited to devices of these example form factors. For example a mobile device such as client $150_2$ might have a local file system accessible by multiple applications resident thereon, or client $150_2$ might access content management system 110 via a web browser. As such, the form factor should not be considered limiting when considering client 150's capabilities. One or more functions described herein with respect to client device 150 may or may not be available on every client device depending on the specific capabilities of the device—the file access model being one such capability.

In many embodiments, client devices are associated with an account of content management system 110, but in some embodiments client devices can access content using shared links and do not require an account.

As noted above, some client devices can access content management system 110 using a web browser. However, client devices can also access content management system 110 using client application 152 stored and running on client device 150. Client application 152 can include a client synchronization service 156.

Client synchronization service 156 can be in communication with server synchronization service 112 to synchronize changes to content items between client device 150 and content management system 110.

Client device 150 can synchronize content with content management system 110 via client synchronization service 156. The synchronization can be platform agnostic. That is, content can be synchronized across multiple client devices of varying type, capabilities, operating systems, etc. Client synchronization service 156 can synchronize any changes (new, deleted, modified, copied, or moved content items) to content items in a designated location of a file system of client device 150.

Content items can be synchronized from client device 150 to content management system 110, and vice versa. In embodiments wherein synchronization is from client device 150 to content management system 110, a user can manipulate content items directly from the file system of client device 150, while client synchronization service 156 can monitor directory on client device 150 for changes to files within the monitored folders.

When client synchronization service 156 detects a write, move, copy, or delete of content in a directory that it monitors, client synchronization service 156 can synchronize the changes to content management system service 116. In some embodiments, client synchronization service 156 can perform some functions of content management system service 116 including functions addressed above such as dividing the content item into blocks, hashing the content item to generate a unique identifier, etc. Client synchronization service 156 can index content within client storage index 164 and save the result in storage index 164. Indexing can include storing paths plus a unique server identifier, and a unique client identifier for each content item. In some embodiments, client synchronization service 156 learns the unique server identifier from server synchronization service 112, and learns the unique client identifier from the operating system of client device 150.

Client synchronization service 156 can use storage index 164 to facilitate the synchronization of at least a portion of the content within client storage with content associated with a user account on content management system 110. For example, client synchronization service 156 can compare storage index 164 with content management system 110 and detect differences between content on client storage and content associated with a user account on content management system 110. Client synchronization service 156 can then attempt to reconcile differences by uploading, downloading, modifying, and deleting content on client storage as appropriate. Content storage service 116 can store the changed or new block for the content item and update server file journal 148, metadata database 146, content directory 144, content storage 142, account database 140, etc., as appropriate.

When synchronizing from content management system 110 to client device 150, a mount, modification, addition, deletion, move of a content item recorded in server file journal 148 can trigger a notification to be sent to client device 150 using notification service 117. When client device 150 is informed of the change a request changes listed in server file journal 148 since the last synchronization point known to the client device. When client device 150 determines that it is out of synchronization with content management system 110, client synchronization service 156 requests content item blocks including the changes, and updates its local copy of the changed content items.

In some embodiments, storage index 164 stores tree data structures wherein one tree reflects the latest representation of a directory according to server synchronization service 112, while another tree reflects the latest representation of the directory according to client synchronization service 156. Client synchronization service can work to ensure that the tree structures match by requesting data from server synchronization service 112 or committing changes on client device 150 to content management system 110.

Sometimes client device 150 might not have a network connection available. In this scenario, client synchronization service 156 can monitor the linked collection for content item changes and queue those changes for later synchronization to content management system 110 when a network connection is available. Similarly, a user can manually start, stop, pause, or resume synchronization with content management system 110.

Client synchronization service 156 can synchronize all content associated with a particular user account on content management system 110. Alternatively, client synchronization service 156 can selectively synchronize a portion of the content of the total content associated with the particular user account on content management system 110. Selectively synchronizing only a portion of the content can preserve space on client device 150 and save bandwidth.

In some embodiments, client synchronization service 156 selectively stores a portion of the content associated with the particular user account and stores placeholder content items in client storage for the remainder portion of the content. For example, client synchronization service 156 can store a placeholder content item that has the same filename, path, extension, metadata, of its respective complete content item on content management system 110, but lacking the data of the complete content item. The placeholder content item can be a few bytes or less in size while the respective complete content item might be significantly larger. After client device 150 attempts to access the content item, client synchronization service 156 can retrieve the data of the content item from content management system 110 and provide the complete content item to accessing client device 150. This approach can provide significant space and bandwidth savings while still providing full access to a user's content on content management system 110.

Collaboration Features

Another feature of content management system 110 is to facilitate collaboration between users. Collaboration features include content item sharing, commenting on content items, co-working on content items, instant messaging, providing presence and seen state information regarding content items, etc.

Sharing

Content management system 110 can manage sharing content via sharing service 128. Sharing content by providing a link to the content can include making the content item accessible from any computing device in network communication with content management system 110. However, in some embodiments a link can be associated with access restrictions enforced by content management system 110 and access control list 145. Sharing content can also include linking content using sharing service 128 to share content within content management system 110 with at least one additional user account (in addition to the original user account associated with the content item) so that each user account has access to the content item. The additional user account can gain access to the content by accepting the content, which will then be accessible through either web interface service 124 or directly from within the directory structure associated with their account on client device 150. The sharing can be performed in a platform agnostic manner. That is, the content can be shared across multiple client devices 150 of varying type, capabilities, operating systems, etc. The content can also be shared across varying types of user accounts.

To share a content item within content management system 110 sharing service 128 can add a user account identifier or multiple user account identifiers to a content entry in access control list database 145 associated with the content item, thus granting the added user account access to the content item. Sharing service 128 can also remove user account identifiers from a content entry to restrict a user account's access to the content item. Sharing service 128 can record content item identifiers, user account identifiers given access to a content item, and access levels in access control list database 145. For example, in some embodiments, user account identifiers associated with a single content entry can specify different permissions for respective user account identifiers with respect to the associated content item.

To share content items outside of content management system 110, sharing service 128 can generate a custom network address, such as a uniform resource locator (URL), which allows any web browser to access the content item or collection in content management system 110 without any authentication. To accomplish this, sharing service 128 can include content identification data in the generated URL, which can later be used to properly identify and return the requested content item. For example, sharing service 128 can include the account identifier and the content path or a content item identifying code in the generated URL. Upon selection of the URL, the content identification data included in the URL can be transmitted to content management system 110, which can use the received content identification data to identify the appropriate content item and return the content item.

In addition to generating the URL, sharing service 128 can also be configured to record in access control list database 145 that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing service 128 can change the value of the flag to 1 or true after generating a URL to the content item.

In some embodiments, sharing service 128 can associate a set of permissions to a URL for a content item. For example, if a user attempts to access the content item via the URL, sharing service 128 can provide a limited set of permissions for the content item. Examples of limited permissions include restrictions that the user cannot download the content item, save the content item, copy the content item, modify the content item, etc. In some embodiments, limited permissions include restrictions that only permit a content item to be accessed from with a specified domain, i.e., from within a corporate network domain, or by accounts associated with a specified domain, e.g., accounts associated with a company account (e.g., @acme.com).

In some embodiments, sharing service 128 can also be configured to deactivate a generated URL. For example, each content entry can also include a URL active flag indicating whether the content should be returned in response to a request from the generated URL. For example, sharing service 128 can only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing service 128 can reactivate the URL by again changing the value of the URL active flag to 1 or true. A user can thus easily restore access to the content item without the need to generate a new URL.

In some embodiments, content management system 110 can designate a URL for uploading a content item. For example, a first user with a user account can request such a URL, provide the URL to a contributing user and the contributing user can upload a content item to the first user's user account using the URL.

Team Service

In some embodiments content management system 110 includes team service 130. Team service 130 can provide functionality for creating and managing defined teams of user accounts. Teams can be created for a company, with sub-teams (e.g., business units, or project teams, etc.), and user accounts assigned to teams and sub-teams, or teams can be created for any defined group of user accounts. Team's service 130 can provide a common shared space for the team, private user account folders, and access limited shared folders. Team's service can also provide a management interface for an administrator to manage collections and content items within team, and can manage user accounts that are associated with the team.

Authorization Service

In some embodiments, content management system 110 includes authorization service 132. Authorization service 132 ensures that a user account attempting to access a namespace has appropriate rights to access the namespace. Authorization service 132 can receive a token from client application 152 that follows a request to access a namespace and can return the capabilities permitted to the user account. For user accounts with multiple levels of access (e.g. a user account with user rights and administrator rights) authorization service 132 can also require explicit privilege escalation to avoid unintentional actions by administrators.

Presence and Seen State

In some embodiments, content management system can provide information about how users with which a content item is shared are interacting or have interacted with the content item. In some embodiments, content management system 110 can report that a user with which a content item is shared is currently viewing the content item. For example, client collaboration service 160 can notify notifications service 117 when client device 150 is accessing the content item. Notifications service 117 can then notify all client devices of other users having access to the same content item of the presence of the user of client device 150 with respect to the content item.

In some embodiments, content management system 110 can report a history of user interaction with a shared content item. Collaboration service 126 can query data sources such as metadata database 146 and server file journal 148 to determine that a user has saved the content item, that a user has yet to view the content item, etc., and disseminate this status information using notification service 117 to other users so that they can know who currently is or has viewed or modified the content item.

Collaboration service 126 can facilitate comments associated with content, even if a content item does not natively support commenting functionality. Such comments can be stored in metadata database 146.

Collaboration service 126 can originate and transmit notifications for users. For example, a user can mention another user in a comment and collaboration service 126 can send a notification to that user that he has been mentioned in the comment. Various other content item events can trigger notifications, including deleting a content item, sharing a content item, etc.

Collaboration service 126 can provide a messaging platform whereby users can send and receive instant messages, voice calls, emails, etc.

Collaboration Content Items

In some embodiments content management service can also include Collaborative document service 134 which can provide an interactive content item collaboration platform whereby users can simultaneously create collaboration content items, comment in the collaboration content items, and manage tasks within the collaboration content items. Collaboration content items can be files that users can create and edit using a collaboration content item editor, and can contain collaboration content item elements. Collaboration content item elements may include a collaboration content item identifier, one or more author identifiers, collaboration content item text, collaboration content item attributes, interaction information, comments, sharing users, etc. Collaboration content item elements can be stored as database entities, which allows for searching and retrieving the collaboration content items. Multiple users may access, view, edit, and collaborate on collaboration content items at the same time or at different times. In some embodiments this can be managed by requiring two users access a content item through a web interface and there they can work on the same copy of the content item at the same time.

Collaboration Companion Interface

In some embodiments client collaboration service 160 can provide a native application companion interface for the purpose of displaying information relevant to a content item being presented on client device 150. In embodiments wherein a content item is accessed by a native application stored and executed on client device 150, where the content item is in a designated location of the file system of client device 150 such that the content item is managed by content application 152, the native application may not provide any native way to display the above addressed collaboration data. In such embodiments, client collaboration service 160 can detect that a user has opened a content item, and can provide an overlay with additional information for the content item, such as collaboration data. For example, the additional information can include comments for the content item, status of the content item, activity of other users previously or currently viewing the content item. Such an overlay can warn a user that changes might be lost because another user is currently editing the content item.

In some embodiments, one or more of the services or storages/databases discussed above can be accessed using public or private application programming interfaces.

Certain software applications can access content storage 142 via an API on behalf of a user. For example, a software package such as an application running on client device 150, can programmatically make API calls directly to content management system 110 when a user provides authentication credentials, to read, write, create, delete, share, or otherwise manipulate content.

A user can view or manipulate content stored in a user account via a web interface generated and served by web interface service 124. For example, the user can navigate in a web browser to a web address provided by content management system 110. Changes or updates to content in the content storage 142 made through the web interface, such as uploading a new version of a content item, can be propagated back to other client devices associated with the user's account. For example, multiple client devices, each with their own client software, can be associated with a single account and content items in the account can be synchronized between each of the multiple client devices.

Client device 150 can connect to content management system 110 on behalf of a user. A user can directly interact with client device 150, for example when client device 150 is a desktop or laptop computer, phone, television, internet-of-things device, etc. Alternatively or additionally, client device 150 can act on behalf of the user without the user having physical access to client device 150, for example when client device 150 is a server.

Some features of client device 150 are enabled by an application installed on client device 150. In some embodiments, the application can include a content management system specific component. For example, the content management system specific component can be a stand-alone application 152, one or more application plug-ins, and/or a browser extension. However, the user can also interact with content management system 110 via a third-party application, such as a web browser, that resides on client device 150 and is configured to communicate with content management system 110. In various implementations, the client-side application 152 can present a user interface (UI) for a user to interact with content management system 110. For example, the user can interact with the content management system 110 via a file system explorer integrated with the file system or via a webpage displayed using a web browser application.

In some embodiments, client application 152 can be configured to manage and synchronize content for more than one account of content management system 110. In such embodiments client application 152 can remain logged into multiple accounts and provide normal services for the multiple accounts. In some embodiments, each account can appear as folder in a file system, and all content items within that folder can be synchronized with content management system 110. In some embodiments, client application 152 can include a selector to choose one of the multiple accounts to be the primary account or default account.

While content management system 110 is presented with specific components, it should be understood by one skilled in the art, that the architectural configuration of system 100 is simply one possible configuration and that other configurations with more or fewer components are possible. Further, a service can have more or less functionality, even including functionality described as being with another service. Moreover, features described herein with respect to an embodiment can be combined with features described with respect to another embodiment.

While system 100 is presented with specific components, it should be understood by one skilled in the art, that the architectural configuration of system 100 is simply one possible configuration and that other configurations with more or fewer components are possible.

Client Synchronization Service

Figure 2:
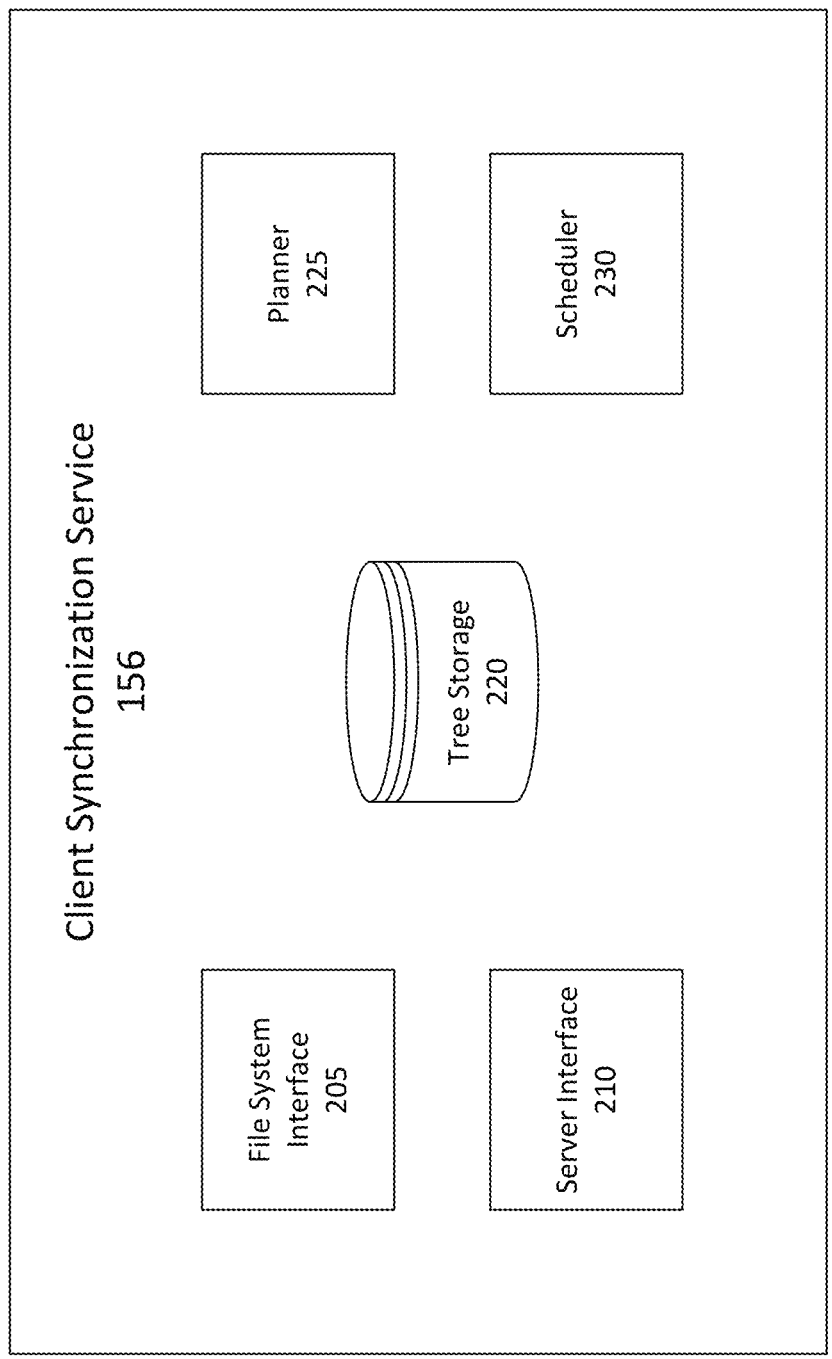
FIG. 2 shows an example of a client synchronization service, in accordance with some embodiments.

FIG. 2 shows an example of a client synchronization service 156, in accordance with some embodiments. According to some embodiments, client synchronization service 156 may be implemented in the client device of FIG. 1. However, in other embodiments, client synchronization service 156 may be implemented on another computing device. Client synchronization service 156 is configured to synchronize changes to content items between a content management system and the client device on which client synchronization service 156 runs.

Client synchronization service 156 may include file system interface 205, server interface 210, tree storage 220, planner 225, and scheduler 230. Additional or alternative components may also be included. High level descriptions of client synchronization service 156 and its components are discussed below with respect to FIG. 2. However, further details and embodiments of client synchronization service 156 and its components are discussed throughout.

File system interface 205 is configured to process changes to content items on the local filesystem of the client device and update the local tree. For example, file system interface 205 can be in communication with client synchronization service 156 of FIG. 1 to detect changes to content items on the local filesystem of the client device. Changes may also be made and detected via client application 152 of FIG. 1. File system interface 205 may make updates to the local tree. The updates to the local tree may be made based on the changes (new, deleted, modified, copied, renamed, or moved content items) to content items on the client device.

Server interface 210 is configured to aid in the processing of remote changes to content items at a remote storage of the content management system and updating of the remote tree. For example, server interface 210 can be in communication with server synchronization service 112 of FIG. 1 to synchronize changes to content items between client device 150 and content management system 110. Changes (new, deleted, modified, copied, renamed, or moved content items) to content items at content management system 110 may be detected and updates may be made to the remote tree to reflect the changes at content management system 110.

Tree storage 220 is configured to store and maintain the tree data structures used by client synchronization service 156. For example, tree storage 220 may store the local tree, the sync tree, and the remote tree. According to some embodiments, tree storage 220 may store the tree data structures in persistent memory (e.g., a hard disk or other secondary storage device) as well as in main memory (e.g., RAM or other primary storage device) in order to reduce latency and response time. For example, on start-up of the client device or client synchronization service 156, the tree data structures may be retrieved from persistent memory and loaded into main memory. Tree storage 220 may access and update the tree data structures on main memory and, before the client device or client synchronization service 156 is shut down, tree storage 220 may store the updated tree data structures on persistent memory. Because main memory is expensive in cost and often limited in size on most client devices, additional technological improvements are implemented to decrease the footprint of the tree data structures on main memory. These technological solutions are described further below.

Planner 225 is configured to detect differences between the server state associated with the content management system and the file system state associated with the client device based on the state of the tree data structures. For example, planner 225 may determine if there is a difference between the remote tree and the sync tree. A difference between the remote tree and the sync tree indicates that an action performed remotely on one or more content items stored at the content management system has caused the server state and the file system state to become out of sync. Similarly, planner 225 may also determine if there is a difference between the local tree and the sync tree. A difference between the local tree and the sync tree indicates that an action performed locally on one or more content items stored on the client device has caused the server state and the file system state to become out of sync. If a difference is detected, planner 225 generates a set of operations that synchronize the tree data structures.

In some scenarios, a set of operations generated based on a difference between the remote tree and the sync tree and a set of operations generated based on a difference between the local tree and the sync tree may conflict. Planner 225 may also be configured to merge the two sets of operations into a single merged plan of operations.

Scheduler 230 is configured to take the generated plan of operations and manage the execution of those operations. According to some embodiments, scheduler 230 converts each operation in the plan of operations into a series of one or more tasks that need to be executed in order to perform the operation. In some scenarios, some tasks may become out dated or no longer relevant. Scheduler 230 is configured to identify those tasks and cancel them.

Tree Data Structures

Figure 3:
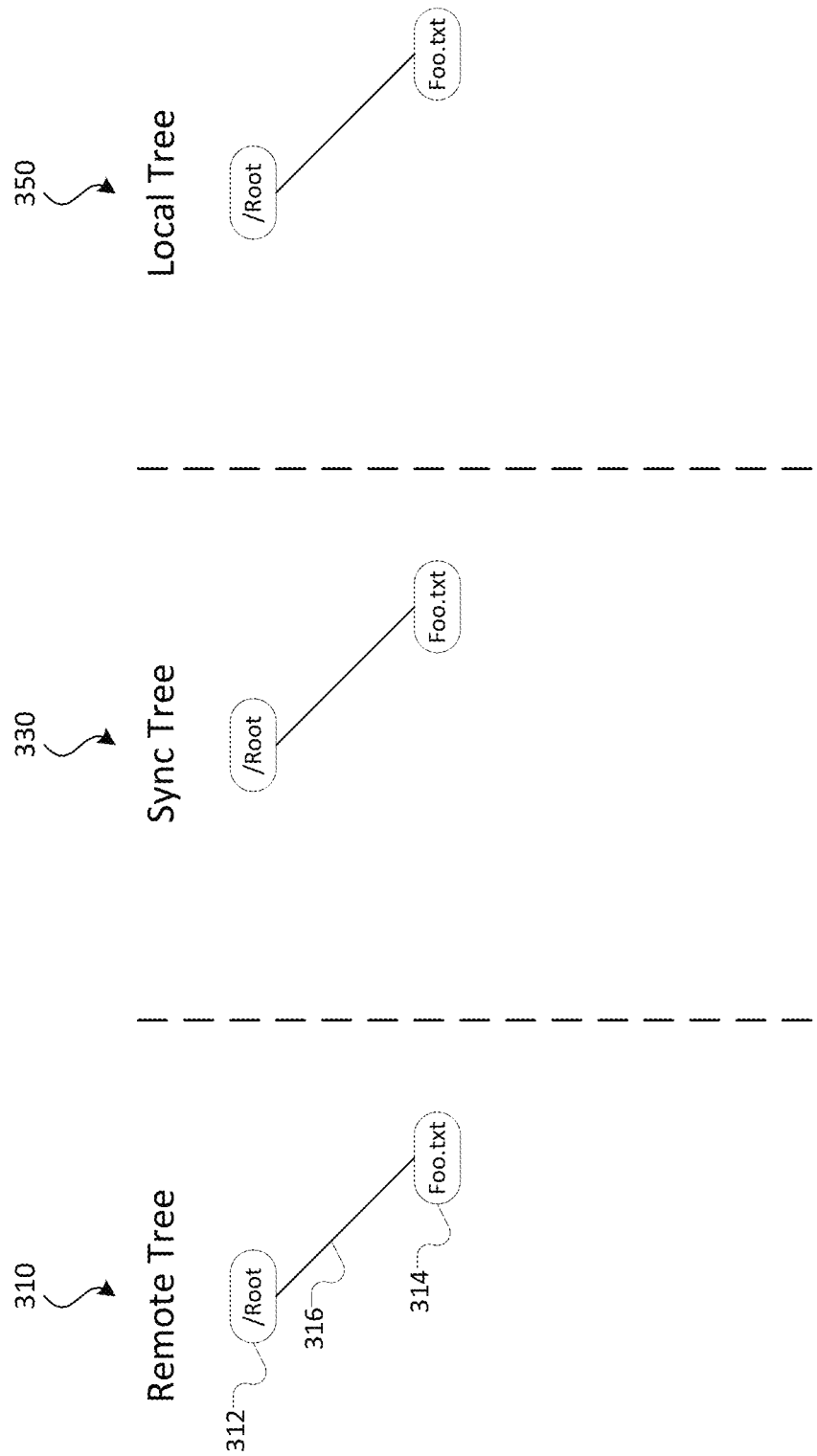
FIG. 3 shows an example of tree data structures, in accordance with various embodiments.

FIG. 3 shows an example of tree data structures, in accordance with various embodiments. The tree data structures may be stored at the client device and managed by a client synchronization service such as client synchronization service 156 in FIG. 2. In FIG. 3, the tree data structures are shown including remote tree 310, sync tree 330, and local tree 350.

Remote tree 310 represents a server state or the state of content items stored remotely from the client device (e.g., on a server of the content management system). Local tree 350 represents a file system state or the state of the corresponding content items stored locally on the client device. Sync tree 330 represents a merge base for the local tree and the remote tree. The merge base may be thought of as a common ancestor of the local tree and the remote tree or a last known synced state between the local tree and the remote tree.

Each tree data structure (e.g., remote tree 310, sync tree 330, or local tree 350) may include one or more nodes. Each node may have one or more child nodes and the parent-child relationship is represented by an edge. For example, remote tree 310 includes nodes 312 and 314. Node 312 is a parent of node 314 and node 314 is a child of node 312. This parent-child relationship is represented by edge 316. A root node, such as root node 312, does not have a parent node. A leaf node, such as node 314, does not have a child node.

Each node in a tree data structure may represent a content item (e.g., a file, document, folder, etc.). For example, root node 312 may represent the root folder associated with the content management system and node 314 may represent a file (e.g., a text file named "Foo.txt") located in that root folder. Each node in a tree data structure may contain data such as, for example, a directory file identifier ("DirFileID") specifying the file identifier of a parent node of the content item, a file name for the content item, a file identifier for the content item, and metadata for the content item.

As described above, a client synchronization service may determine that the server state and the file system state of the client device are synchronized when all 3 trees (e.g., remote tree 310, sync tree 330, and local tree 350) are identical. In other words, the trees are synchronized when their tree structures and the relationships that they express are identical and the data contained in their nodes are identical as well. Conversely, the trees are not synchronized if the 3 trees are not identical. In the example scenario illustrated in FIG. 3, remote tree 310, sync tree 330, and local tree 350 are shown as being identical and synchronized and, as a result, the server state and the file system state are synchronized.

Tracking Changes Using Tree Data Structures

Figure 4:
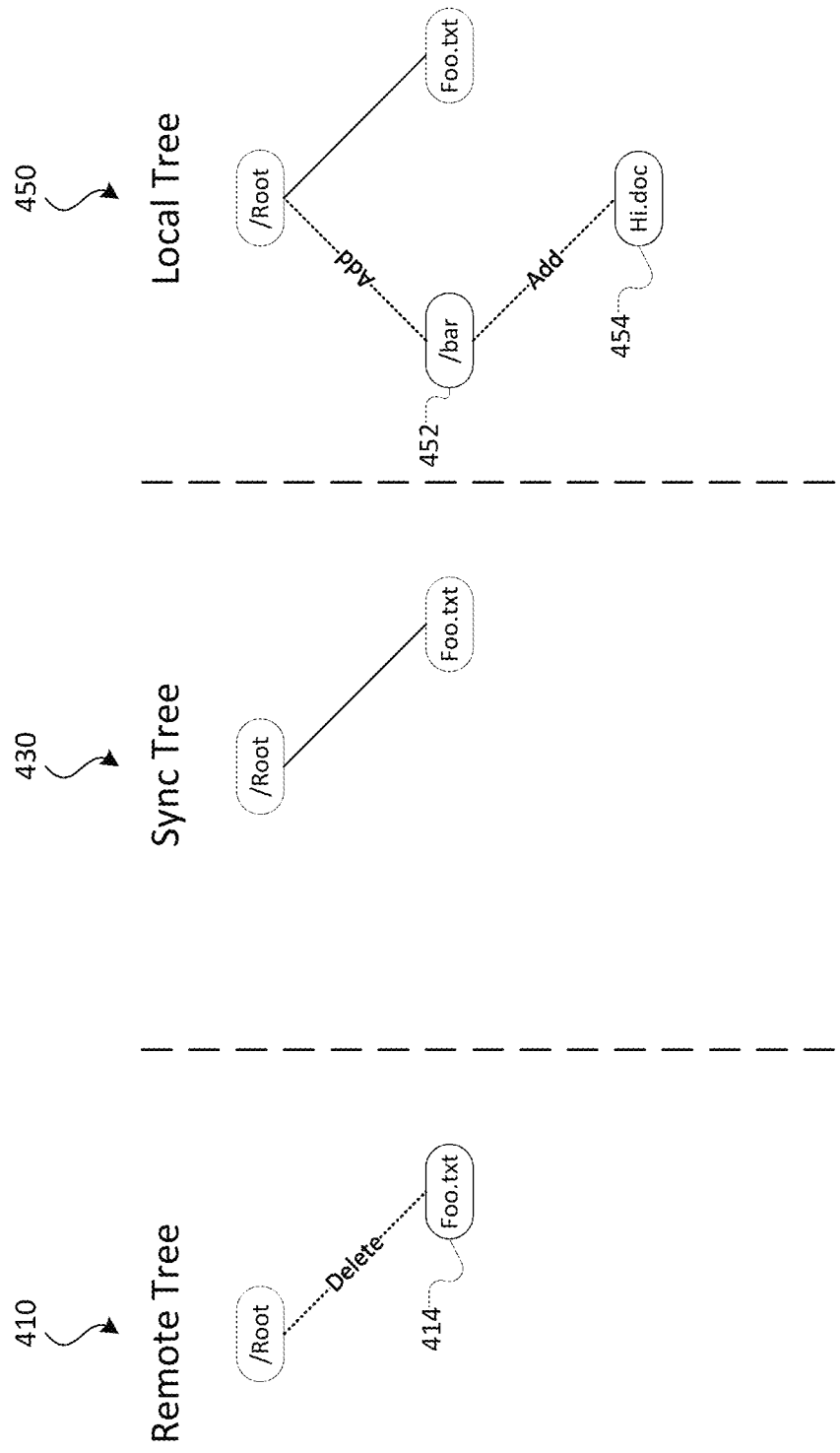
FIG. 4 shows an example of tree data structures, in accordance with various embodiments.

FIG. 4 shows an example of tree data structures, in accordance with various embodiments. As with the tree data structures shown in FIG. 3, the tree data structures shown in FIG. 4 (including remote tree 410, sync tree 430, and local tree 450) may be stored at the client device and managed by a client synchronization service such as client synchronization service 156 in FIG. 2. In FIG. 4, the tree data structures are shown.

FIG. 4 shows a scenario after a previously synchronized state, such as the scenario illustrated in FIG. 3, additional actions are performed on the content items represented in the trees to modify the content items such that the trees are no longer in sync. Sync tree 430 maintains a representation of the previously known synchronized state and may be used by the client synchronization service to identify the differences between the server state and the file system state as well as generate operations for the content management system and/or the client device to perform to converge so that the server state and the file system state are synchronized.

For example, a user (the same user as the user associated with the client device or a different user with access to the content item) may make modifications to the "foo.txt" content item stored by the content management system. This content item is represented by node 414 in remote tree 410. The modification shown in the remote tree 410 is a removal (e.g., a removal of the content item from a space managed by the content management system) or delete of the foo.txt content item. These modifications may be performed, for example, on another client device and then synchronized to the content management system or performed through a web browser connected to the content management system.

When the change is made on the content management system, the content management system generates modification data specifying the change made and transmits the modification data to the client synchronization service on the client device. For example, using a push model where the content management system may transmit or "push" changes to the client device unilaterally. In other implementations, a pull model where the server sends the changes in response to a request by the client device. Additionally, a hybrid model involving a long pull where the client device initiates the requests but keeps the connection open for a period of time so the content management system can push additional changes as needed while the connection is live. The client synchronization service updates the remote tree representing the server state for the content items stored by the content management system based on the modification data. For example, in remote tree 410, node 414 representing the foo.txt content item is shown as deleted.

The client synchronization service may identify a difference between remote tree 410 and sync tree 430 and, as a result, determine that a modification of the content items at the content management system has caused the server state and the file system state to no longer be in sync. The client synchronization service may further generate and execute a set or sequence of operations for the content items stored on the client device that are configured to converge the server state and the file system state so that they will be in sync.

Additionally or alternatively, a user (the same user as the user associated with modifications at the content management system or a different user with access to the content item) may make modifications to the content items stored locally on the client device that are associated with the content management system. For example, the user may add a folder "/bar" to the "/root" folder and add a "Hi.doc" document to the "/bar" folder.

When the change is made on the client device, the client device (e.g., client synchronization service 156 or client application 152 of FIG. 1) generates modification data specifying the change made. The client synchronization service updates the local tree representing the file system state for the content items stored on the client device based on the modification data. For example, in local tree 450, node 452 and node 454 are shown as added. Node 452 and node 454 represent the "/bar" folder and the "Hi.doc" document respectively.

The client synchronization service may identify a difference between local tree 450 and sync tree 430 and, as a result, determine that a modification of the content items at the client device has caused the server state and the file system state to no longer be in sync. The client synchronization service may further generate a set or sequence of operations for the content items stored by the content management system that are configured to converge the server state and the file system state so that they will be in sync. These operations may be transmitted to the content management system for execution.

As seen in FIG. 4, modifications to content items stored on the client device and content items stored by the content management system may occur at substantially the same time or within a particular time period. These modifications can be reflected in the tree data structures and used by the client synchronization service to generate operations for the client device and for the content management system in parallel. In other scenarios, however, modifications may not necessarily occur within the same time period and operations may be generated in an as-needed manner. Furthermore, although FIG. 4 illustrates scenarios for adding content items and deleting content items, other types of modifications such as, editing, renaming, copying, or moving content items are also supported.

According to various embodiments, identifying a difference between two tree data structures and generating operations may involve checking each node in both tree data structures and determining whether an action has been performed on the node. The actions may include, for example, the addition of the node, the deletion of the node, the editing of the node, or the moving of the node. These actions may then be used to generate the operations configured to converge the server state and the file system state.

For example, if the two tree data structures are a sync tree and a remote tree, the client synchronization service may identify each node in the sync tree by, for example, requesting the file identifiers of all nodes in the sync tree. For each node or file identifier for the node in the sync tree, the client synchronization service may determine if the node or file identifier is also in the remote tree. A node or file identifier in the sync tree that is not found in the remote tree may indicate that the node has been deleted from the server state that is represented by the remote tree. Accordingly, the client synchronization service may determine that a delete action has occurred on the remote tree. If the node or file identifier for the node is found in the remote tree, the client synchronization service may check whether the node in the remote tree has been edited or moved.

To determine whether the node in the remote tree has been edited with respect to the node in the sync tree, the client synchronization service may compare the metadata for the node in the sync tree with the metadata for the corresponding node (e.g., the node with the same file identifier) in the remote tree. The metadata may include information that may be used to determine whether the content item represented by the node has been edited. For example, the metadata may include one or more hash values that are generated based on the data in the content item or a portion thereof. The metadata may additionally or alternatively include a size value, a last modified value, or other value for the content item. The metadata for the node in the sync tree may be compared with the metadata for the node in the remote tree. If the metadata do not match, an edit of the content item may have been edited in the server state represented by the remote tree. Accordingly, the client synchronization service may determine that an edit action has occurred for the node on the remote tree. If the metadata matches, no edit may have occurred.

To determine whether the node in the remote tree has been moved, the client synchronization service may compare the location for the node in the sync tree with the location for the corresponding node (e.g., the node with the same file identifier) in the remote tree. The location may include, for example, a path where the node is located, a file name, and/or a directory file identifier ("DirFileID") specifying the file identifier of the node's parent. If the locations match, no move may have occurred. On the other hand, if the locations do not match, a move of the content item may have occurred in the server state represented by the remote tree. Accordingly, the client synchronization service may determine that a move action has occurred for the node on the remote tree.

To determine whether a node has been added to the remote tree, the client synchronization service may identify any nodes or file identifiers in the remote tree that are not found in the sync tree. If a node or file identifier is found in the remote tree and not found in the sync tree, the client synchronization service may determine that an add action of this node has occurred on the remote tree representing the server state.

Although the example above is described with respect to the sync tree and the remote tree, in other embodiments, a similar process may occur with the sync tree and a local tree in order to identify a difference between the sync tree and the local tree and determine which actions have occurred on the local tree representing the file system state.

Synchronization Using Tree Data Structures

Figure 5:
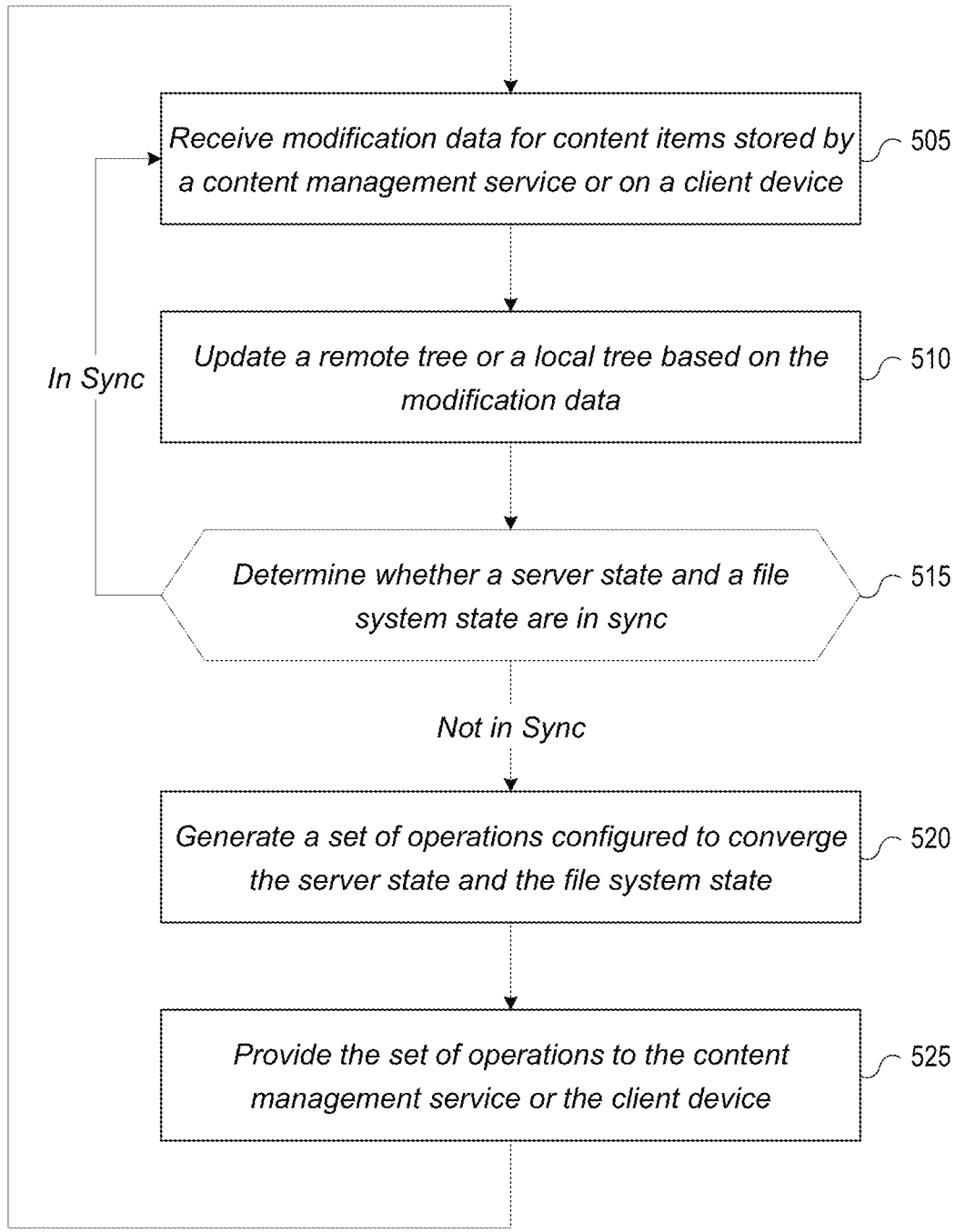
FIG. 5 shows an example method for synchronizing a server state and a file system state using tree data structures, in accordance with various embodiments of the subject technology.

FIG. 5 shows an example method for synchronizing a server state and a file system state using tree data structures, in accordance with various embodiments of the subject technology. Although the methods and processes described herein may be shown with certain steps and operations in a particular order, additional, fewer, or alternative steps and operations performed in similar or alternative orders, or in parallel, are within the scope of various embodiments unless otherwise stated. The method 500 may be implemented by a system such as, for example, client synchronization service 156 of FIG. 2, running on a client device.

The system is configured to identify a difference between a remote tree representing a server state for content items stored by the content management system, a local tree representing the file system state for the corresponding content items stored on the client device, and a sync tree representing a known synced state between the server state and the file system state. Based on these differences, a set of operations may be generated that, if executed, are configured to converge the server state and the file system state towards a synchronized state where the three tree data structures would be identical.

For example, at operation 505, the system may receive modification data for content items stored by a content management system or on a client device. The modification data may be used to update a remote tree or a local tree at operation 510.

The modification data specifies what changes occurred to one or more content items associated with a content management service. Accordingly, the modification data may be received from the content management system or from the client device (e.g., from client application 152 running on client device 150 in FIG. 1). Modification data received from the content management system may be referred to as server modification data. Server modification data specifies what changes are done to one or more content items by the content management system and may be used to update the remote tree at operation 510. Modification data received from the client device may be referred to as client modification data. Client modification data specifies what changes are done to one or more content items on the client device and may be used to update the local tree at operation 510.

At operation 515, the system may determine whether a server state for content items stored by the content management system and a file system state for the content items stored on the client device are in sync. Because the local tree and the remote tree are representative of the file system state and the server state and are continually being updated to track changes that occur at the content management system and the client device, determining whether the server state and the file system state are in sync may be done by comparing the local tree and/or the remote tree to the sync tree to find differences between the trees. This process of finding differences between the trees is sometimes referred to as "diffing" the trees.

According to some embodiments and scenarios, determining whether the server state and the file system state are in sync may include one or more of identifying differences between the remote tree and the sync tree and/or identifying differences between the local tree and the sync tree. Differences between the remote tree and sync tree may indicate the occurrence of changes to content items stored by the content management system that may not be reflected at the client device. Similarly, differences between the local tree and sync tree may indicate the occurrence of changes to content items stored at the client device that may not be reflected at the content management system.

If there are no differences between the trees, the server state and the file system state are in sync and no synchronization actions are needed. Accordingly, the method may return to operation 505 and await new modification data. On the other hand, if differences are detected, the system may generate a set of operations configured to converge the server state and the file system state at operation 520.

The set of operations generated depends on the one or more differences that are detected. For example, if the difference between two trees is an added content item, the generated set of operations may include retrieving the added content item and adding it. If the difference between two trees is a deletion of a content item, the generated set of operations may include deleting the content item. According to some embodiments, the set of operations may also include a number of checks to ensure tree constraints are maintained. As will be described further below, the set of operations may conflict with the current state of the server state, the file system state, or other operations that are pending execution. Accordingly, the system may also resolve these conflicts before proceeding.

As noted above, if there are differences between the remote tree and sync tree, changes to content items stored by the content management system may have occurred that may not be reflected at the client device. Accordingly, in this scenario, the system may generate a client set of operations configured to operate on the content items stored on the client device to converge the server state and the file system state and this client set of operations may be provided to the client device for execution at operation 525.

Similarly, if there are differences between the local tree and sync tree, changes to content items stored at the client device may have occurred that may not be reflected at the content management system. Accordingly, in this scenario, the system may generate a server set of operations configured to operate on the content items stored by the content management system to converge the server state and the file system state and this server set of operations may be provided to the content management system for execution at operation 525. In some cases, both cases may be true and a client set of operations and a server set of operations may be generated and provided to their intended recipients at operation 525.

Once the set(s) of operations are provided to the intended recipient(s), the method may return to operation 505 and await new modification data. The set(s) of operations may provide one or more steps towards the convergence of the server state and the file system state or provide all steps needed to sync the server state and the file system state. For example, the content management system may receive the server set of operations and execute the server set of operations on content items stored by the content management system. This execution of the server set of operations causes changes to the content items stored by the content management system, which are detected and specified in server modification data, which is transmitted back to the system. The system may then update the remote tree and determine whether the server state and the file system state are in sync.

The client device may receive the client set of operations and execute the client set of operations on content items stored on the client device. This execution of the client set of operations causes changes to the content items stored on the client device, which are detected and specified in client modification data, which is passed to the system. The system may then update the local tree and determine whether the server state and the file system state are in sync. These operations of method 500 may continue until the server state and the file system state are in sync.

The operations of method 500 are described with respect to a client side and a server side (e.g., a local tree and a remote tree, a file system state and a server state, a client set of operations and a server set of operations, client modification data and server modification data). In various embodiments the operations associated with the two sides may occur in parallel, in sequence, in isolation of the other side, or a combination.

As will be discussed in further detail, in accordance with some embodiments, before the operations are provided for execution, the system may check the operations to determine whether they comply with a set of rules or invariants. If an operation violates a rule, the system executes a resolution process associated with the violation of the rule.

Additionally, in accordance with some embodiments, the system (e.g., scheduler 230 of client synchronization service 156 in FIG. 2) may manage the execution of the set of operations. For example, each operation in the set of operations may be associated with a task, an execution thread, series of steps, or instructions. The system may be configured to execute the task, thread, step, or instructions and interface with the client device and/or the content management system to execute the set of operations and converge the server state and the file system state.

Conflict Handling

As described above with respect to FIG. 5, differences between a sync tree and a remote tree are identified and used to generate a client set of operations configured to converge the server state and the file system state. However, in some cases, the client set of operations may conflict with the current state of a local tree. Similarly, differences between the sync tree and the local tree are identified and used to generate a server set of operations configured to converge the server state and the file system state. However, the server set of operations may conflict with the current state of the remote tree. Additionally or alternatively, the client set of operations and the server set of operations may conflict with one another or violate another rule or invariant maintained by the system. Accordingly, various embodiments of the subject technology provide additional technical improvements by resolving these conflicts.

For example, planner 225 in client synchronization service 156 of FIG. 2 may identify an operation in a set of operations (e.g., the client set of operations or the server set of operations) that conflicts with a rule. Each rule used to identify a conflict may also be associated with a resolution for the conflict. The client synchronization service may update the set of operations based on the resolution for the conflict or resolve the conflict by performing operations associated with the resolutions for the conflict before providing the set of operations for execution.

Figure 6:
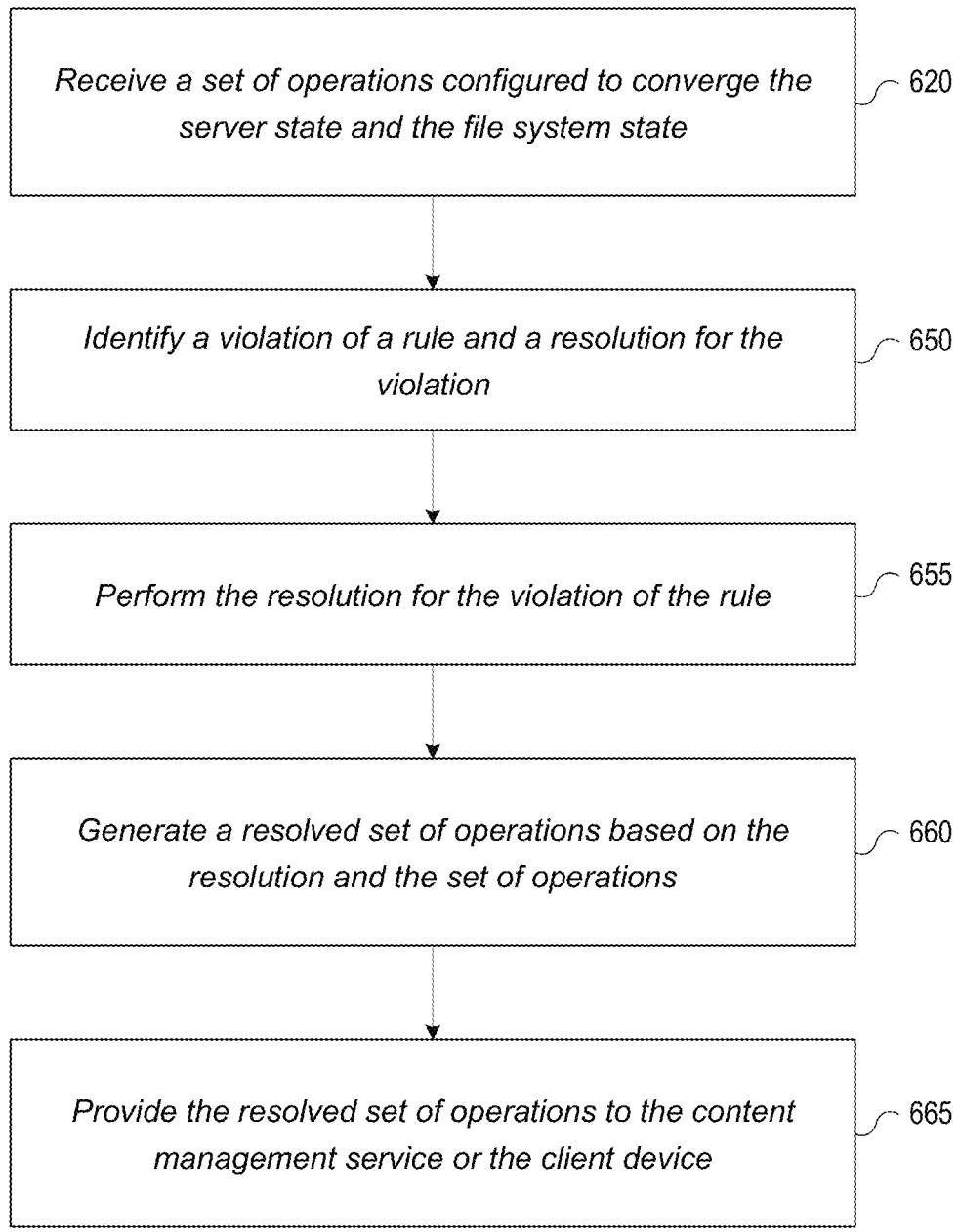
FIG. 6 shows an example method for resolving conflicts when synchronizing a server state and a file system state using tree data structures, in accordance with various embodiments of the subject technology.

FIG. 6 shows an example method 600 for resolving conflicts when synchronizing a server state and a file system state using tree data structures, in accordance with various embodiments of the subject technology. Although the methods and processes described herein may be shown with certain steps and operations in a particular order, additional, fewer, or alternative steps and operations performed in similar or alternative orders, or in parallel, are within the scope of various embodiments unless otherwise stated. The method 600 may be implemented by a system such as, for example, client synchronization service 156 of FIG. 2, running on a client device.

The system may receive a set of operations configured to converge a server state and a file system state at operation 620. The set of operations may be, for example, the client set of operations, the server set of operations, or a combined set of operations generated and described with respect to the method 500 of FIG. 5.

At operation 650, the system identifies one or more violations in the set of operations based on a set of rules. The set of rules may be stored by client synchronization service 156 in FIG. 2 and specify a number of constraints, invariants, or conflicts for operations that are to be resolved. The set of rules may be applied to the tree data structures and help control synchronization behavior. Each rule in the set of rules may also be associated or otherwise linked to a resolution to a violation of that rule. For example, the resolution may include an alteration of one or more operations in the set of operations, a removal off one or more operations, an addition of one or more operations, one or more additional actions to the server state or the file system state, or a combination of actions.

For each operation in a set of operations, the system may determine whether any rule in the set of rules is violated. If a rule is violated, the system identifies a resolution of the violation and, at operation 655, performs the resolution. The resolution may include actions such as modifying one or more operations in the set of operations, a removing or adding one or more operations, or additional actions on the server state or the file state.

Once the resolution actions are performed, the system may generate a resolved or rebased set of operations based on the resolution and the set of operations at operation 660 and, at operation 665, provide the resolved set of operations to the appropriate entity for execution. For example, the resolved set of operations may be provided to scheduler 230 of client synchronization service 156 in FIG. 2 for managed execution. Alternatively, if the set of operations is a client set of operations, the resolved set of operations may be provided to the client device. If the set of operations is a server set of operations, the resolved set of operations may be provided to the content management service. Additionally, the method 600 of FIG. 6 may be performed on client set of operations and server set of operations in sequence, in parallel, or in various different orders.

According to some embodiments, each type of operation may be associated with the same or a different set of rules. For example, operation types may include, for example, adding a content item, deleting a content item, editing a content item, moving a content item, renaming a content item, etc. The set of operations may consist of operations each belonging to one of the operation types above. Each operation type may be associated with a specific set of rules.

For illustrative purposes, a set of rules for an "Add" operation type may include rules such as file identifiers for content items must be unique in a tree (e.g., no two nodes in a tree may have the same file identifier), a directory file identifier ("DirFileID") specifying the file identifier of a parent node of the content item must exist in the opposite tree data structure, and a DirFileID and file name combination for a content item are not used in the opposite tree.

Opposite tree, as used here, refers to the tree data structure that represents the state of the opposing entity. For example, a client set of operations configured to operate on the client device and the resulting changes to the file system on the client device will be reflected in the local tree. Accordingly, the opposite tree for the client set of operations is the remote tree. Similarly, a server set of operations is configured to be transmitted to the content management system to be executed and the resulting changes to the server state will be reflected in the remote tree. Accordingly, the opposite tree for the server set of operations is the local tree.

Figure 7:
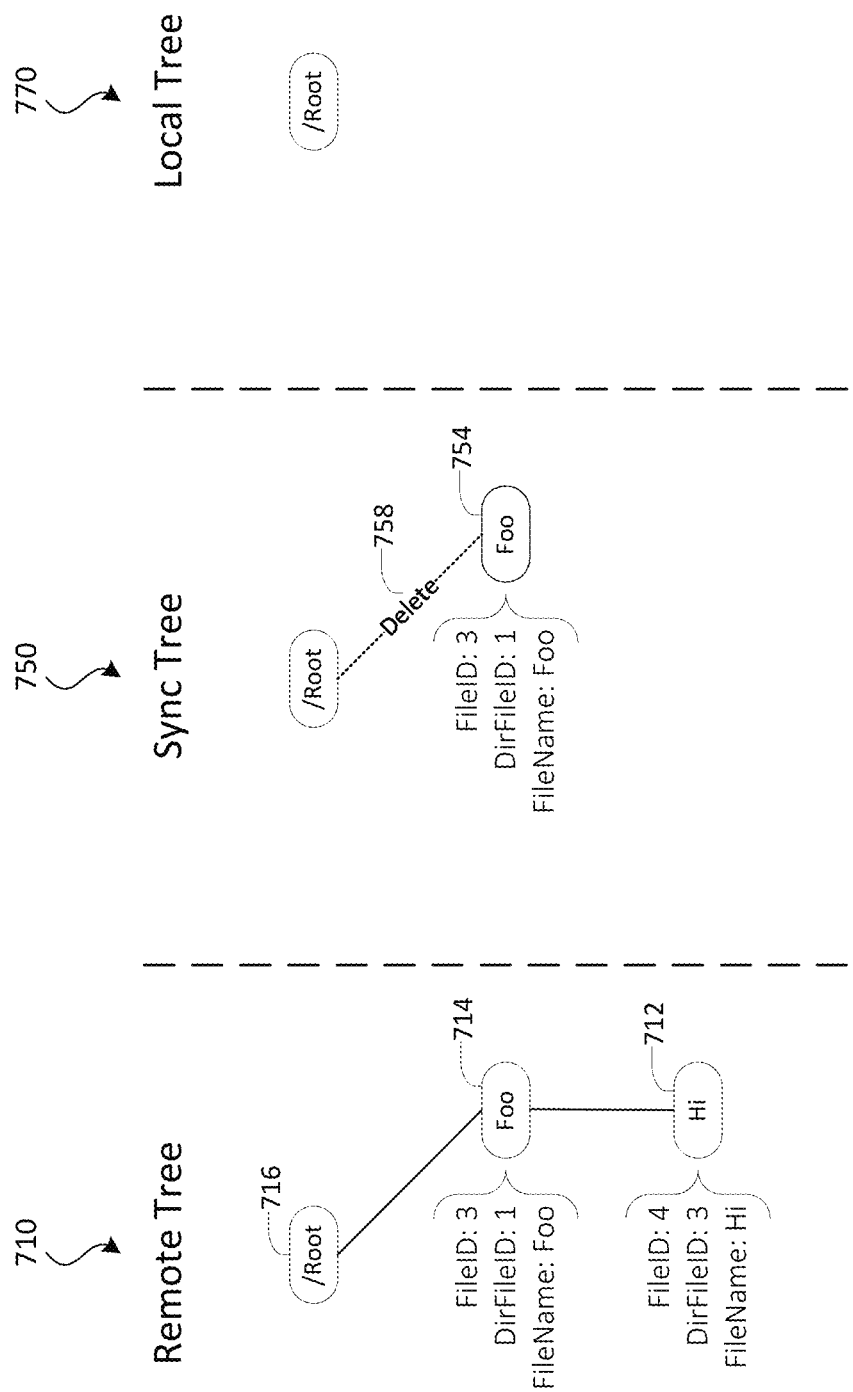
FIG. 7 shows an example of tree data structures illustrating a violation of a rule for an add operation, in accordance with various embodiments.

FIG. 7 shows an example of tree data structures illustrating a violation of a rule for an add operation, in accordance with various embodiments. The tree data structures include remote tree 710, sync tree 750, and local tree 770. When referencing the local tree 770, the remote tree 710 may be considered the opposite tree. On the other hand, when referencing the remote tree 710, the local tree 770 may be considered the opposite tree. FIG. 7 illustrates a set of operations adding the content item represented by node 712 in remote tree 710. For example, a client synchronization service may compare remote tree 710 with sync tree 750, identify the differences, and generate a set of operations that includes the addition of node 712. Node 712 is associated with a FileID of 4, a DirFileID of 3 (which references parent node 714, which is node 712's parent), and a file name of "Hi." Parent node 714 is associated with a FileID of 3, a DirFileID of 1 (which references root node 716, which is node 714's parent), and a file name of "Foo."

The client synchronization service may perform the method 600 of FIG. 6 and determine that the add operation for node 712 violates the "a directory file identifier ("DirFileID") of the content item must exist in the opposite tree data structure" rule for "add" operation types. This is illustrated in FIG. 7 by the local tree 770 not having a node with a file ID of 3, which references parent node 714 of node 712. This may occur when, for example, after differences between remote tree 710 and sync tree 750 are determined and a set of operations is generated, the "Foo" node corresponding to node 714 is removed from the opposite tree.

The resolution associated with this rule may include deleting the node missing from local tree 770 from sync tree 750 to synchronize sync tree 750 and local tree 770 and rediffing (e.g., finding the difference between) remote tree 710 and sync tree 750. In the scenario illustrated in FIG. 7, node 754 in sync tree 750 would be removed 758 and diffing operations would commence to identify differences between remote tree 710 and sync tree 750. This would result in the inclusion of an add operation of node 714 as well as an add operation for node 712 in the set of operations.

Similarly, a violation of the "file identifiers for content items must be unique in a tree" rule for "add" operation types may be resolved by operations including requesting, from the content management system, a new file ID for the node being added and using the new file ID when adding the node. A violation of the "DirFileID and file name combination for a content item are not used in the opposite tree" rule for "add" operation types may be resolved by operations including checking via the metadata associated with the two nodes whether the content items are the same. If the content items are the same, it is likely that the content item being added has already been added in other actions. If the content items are not the same, the file name for the content item being added can be renamed. For example, the file name for the content item being added can be appended with the text "(conflicted version)."

Incremental Planner

Although the various tree data structures shown in FIGS. 3, 4, and 7 contain a relatively small number of nodes and are relatively simple in structure, the tree data structures supported by the system may be much larger and complex with multiple levels and potentially large number of nodes at each level. Accordingly the memory usage required to store the tree data structures during operation may be quite large and the computing time and resources required to operate on the tree data structures may be quite large. For example, finding differences between a remote tree and a sync tree and/or a local tree and the sync tree and generating operations needed to converge the remote tree and the sync tree and/or the local tree and the sync tree may require a large amount of memory, time, and other computing resources.

Unfortunately, these computing resources are limited. For example, a client device may have a limited amount of available memory and the length of time needed to diff trees and generate operations may hinder the usability of the client device, the client application, or the content management services provided by the content management system. Furthermore, the more time needed to converge the server state and the file system state, the more likely that intervening changes to either state may render the set of operations being computed or executed and/or the target sync state out of date. Accordingly, various embodiments of the subject technology provide additional technical improvements by incrementally converging the server state and the file system state along with the tree data structures that represent them.

Figure 8:
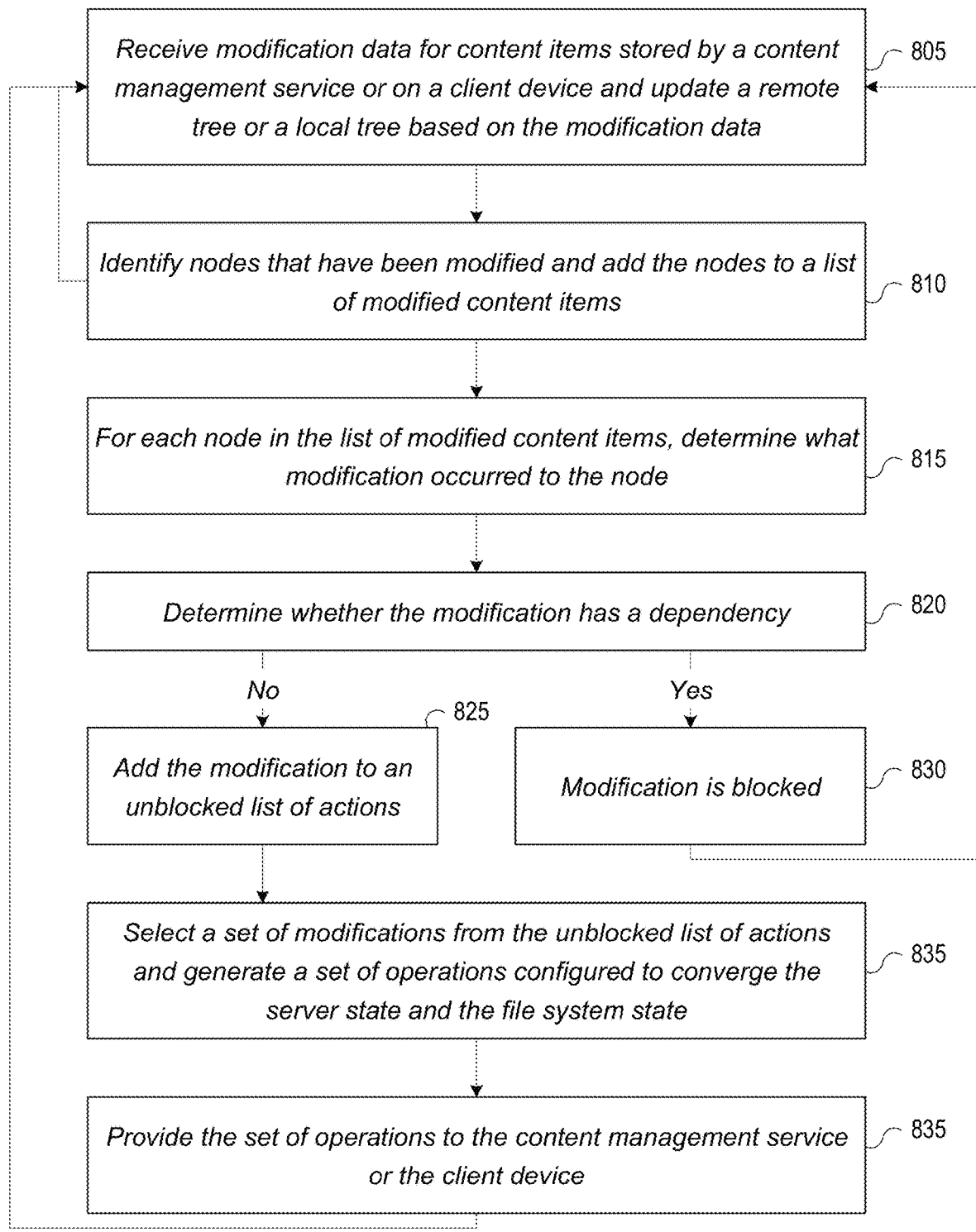
FIG. 8 shows an example method for incrementally converging a server state and a file system state, in accordance with various embodiments of the subject technology.

FIG. 8 shows an example method 800 for incrementally converging a server state and a file system state, in accordance with various embodiments of the subject technology. Although the methods and processes described herein may be shown with certain steps and operations in a particular order, additional, fewer, or alternative steps and operations performed in similar or alternative orders, or in parallel, are within the scope of various embodiments unless otherwise stated. The method 800 may be implemented by a system such as, for example, client synchronization service 156 of FIG. 2, running on a client device.

At operation 805, the system may receive modification data that may be used to update either a remote tree or a local tree. For example, server modification data may be received from a content management system that specifies modifications or other actions (e.g., an edit, add, delete, move, or rename) associated with one or more content items stored by the content management system. The server modification data may be used to update the remote tree, which represents the server state of content items stored by the content management system. Similarly, client modification data may be received from the client device (e.g., a client application) and specify modifications or other actions associated with one or more content items stored on the client device. The client modification data may be used to update the local tree, which represents the file system state of content items stored on the client device.

Based on the received modification data specifying modifications associated with content items, the system may identify nodes that correspond to the modified content items and add the nodes to a list of modified content items (e.g., add the file identifier associated with the nodes to the list of modified content items) at operation 810. Operations 805 and 810 may continuously occur for some time before the system proceeds to the next stage of the method 800. For example additional modification data may be received and used to update the trees managed by the system and add nodes to the list of modified content items.

In order to incrementally converge the server state and the file system state, the system takes each node in the list of modified content items and determines how the node was modified (e.g., which actions are associated with the node) at operation 815. In some embodiments, the modification data may specify the modification to the node. However, in other embodiments, the system may determine the modifications to the node based on a comparison of the remote tree with the sync tree and/or a comparison of the local tree with the sync tree. For example, the modifications may include the addition of the node, the deletion of the node, the editing of the node, or the moving of the node.

For each node or file identifier for the node in the list of modified content items, the system may perform a series of checks to determine what, if any, modifications were performed on the node. For example, the system may determine whether the file identifier is in the sync tree but not in the remote tree. A file identifier in the sync tree that is not found in the remote tree may indicate that the node has been deleted from the server state that is represented by the remote tree. Accordingly, the client synchronization service may determine that a delete modification on the node has occurred on the remote tree. Similarly, the system may also determine whether the file identifier is in the sync tree but not in the local tree. A file identifier in the sync tree that is not found in the local tree may indicate that the node has been deleted from the file system state that is represented by the local tree. Accordingly, the client synchronization service may determine that a delete modification on the node has occurred on the local tree.

To determine whether an edit modification has been performed on the node, the system may compare the metadata for the node in the sync tree with the metadata for the corresponding node (e.g., the node with the same file identifier) in the remote tree and/or the local tree. The metadata may include information that may be used to determine whether the content item represented by the node has been edited. For example, the metadata may include one or more hash values that are generated based on the data in the content item or a portion thereof. The metadata may additionally or alternatively include a size value, a last modified value, or other value for the content item. If the metadata do not match, an edit of the content item may have been edited in the server state represented by the remote tree and/or the file system state represented by the local tree. Accordingly, the system may determine that an edit action has occurred for the node on the remote tree and/or the local tree.

To determine whether the node in the remote tree has been moved, the system may compare the location for the node in the sync tree with the location for the corresponding node (e.g., the node with the same file identifier) in the remote tree and/or the local tree. The location may include, for example, a path where the node is located, a file name, and/or a directory file identifier ("DirFileID") specifying the file identifier of the node's parent. If the locations match, no move may have occurred. On the other hand, if the locations do not match, a move of the content item may have occurred in the remote tree or the local tree. Accordingly, the client synchronization service may determine that a move action has occurred for the node on the remote tree and/or the local tree.

To determine whether a node has been added to the remote tree, the system may determine if the file identifier in the list of modified content items is in the remote tree or in the local tree, but not in the sync tree. If the file identifier is found in the remote tree or the local tree and not found in the sync tree, the system may determine that an add modification for this node has occurred.

Once the one or more modifications to the nodes in the list of modified content items are determined, the system may determine whether any of those modifications have dependencies at operation 820. As will be illustrated further with respect to FIG. 9, a modification on a node has a dependency when, for example, the modification cannot execute without another modification occurring first.

If the modification does not have a dependency, the system adds the modification to an unblocked list of actions at operation 825. If the modification has a dependency, the modification is blocked for the time being at operation 830 and cannot be executed without another modification being processed first. Accordingly the process returns to operation 805 to await further modifications. After each of the modifications are processed, the system may clear the file identifiers associated with the modifications from the list of modified content items.

Figure 9:
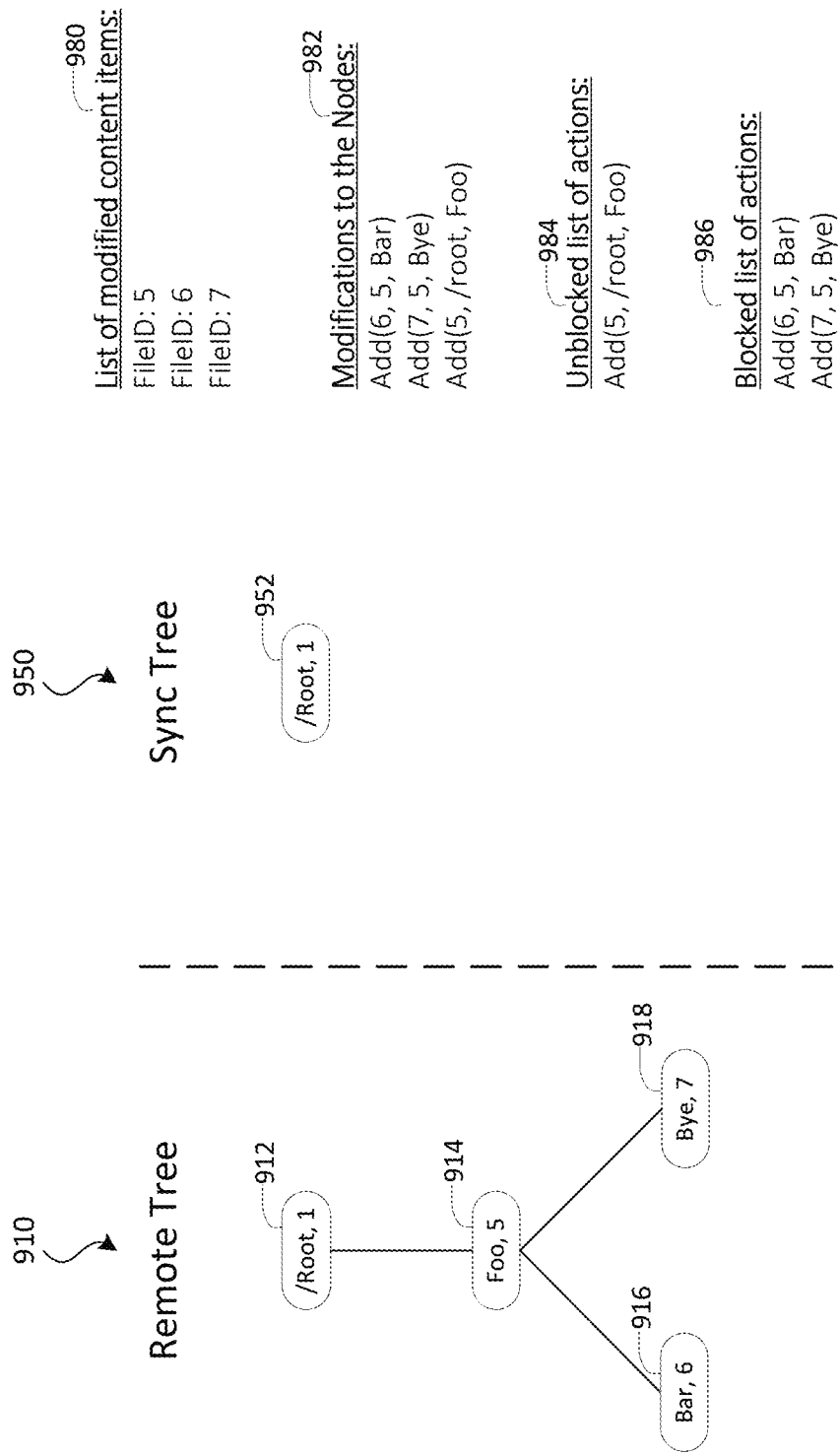
FIG. 9 shows an example of tree data structures, in accordance with various embodiments.

FIG. 9 shows an example of tree data structures, in accordance with various embodiments. The tree data structures shown in FIG. 9 may be stored at the client device and managed by a system such as client synchronization service 156 in FIG. 2. For the purpose of illustration, only remote tree 910 and sync tree 950 are shown in FIG. 9 and described. Similar operations and description may also be applied to a local tree as well.

Remote tree 910 includes root node 912 with a file identifier of 1, node 914 with a file identifier of 5 and file name of "Foo," node 916 with a file identifier of 6 and file name of "Bar," and node 918 with a file identifier of 7 and file name of "Bye." Sync tree includes root node 952 with a file identifier of 1.

Based on the tree data structures shown in FIG. 9, the system may have identified that nodes with file identifiers of 5, 6, and 7 have been modified at operation 810 and added the nodes to the list of modified content items, as illustrated by reference 980 in FIG. 9. At operation 815, the system determines the list of modifications to nodes in the list of modified content items. As is seen by the comparison of remote tree 910 and sync tree 950, nodes 914, 916, and 918 have been added to remote tree 910. More specifically, as illustrated by reference 982 in FIG. 9, node 916 with file identifier 6 and name "Bar" has been added as a child to node 914 with file identifier 5. This is represented by the "Add(6, 5, Bar)" entry in reference 982. Node 918 with file identifier 7 and name "Bye" has been added as a child to node 914 with file identifier 5. This is represented by the "Add(7, 5, Bye)" entry in reference 982. Node 914 with file identifier 5 and name "Foo" has been added as a child to root node 912 with file identifier 1. This is represented by the "Add(5, /root, Foo)" entry in reference 982.

At operation 820, the system determines that the add modification of node 914 does not have a dependency and, as a result, is unblocked. Accordingly, the system adds the modification associated with node 914 (e.g., the modification represented by the "Add(5, /root, Foo)" entry in reference 982) to an unblocked list of actions at operation 825. This is seen in references 984 in FIG. 9. On the other hand, the modifications for nodes 916 and 918 represented by the "Add(6, 5, Bar)" and the "Add(7, 5, Bye)" entries in reference 982 are dependent on the modification represented by the "Add(5, /root, Foo)" occurring first. In other words, node 916 and/or node 918 cannot be added until node 914 is added. Accordingly, these modifications are included in a blocked list of actions illustrated by reference 986 in FIG. 9.

Returning to the method 800 of FIG. 8, at operation 835, the system may select a set of modifications from the unblocked list of actions and generate a set of operations based on the selected set of modifications. The set of operations is configured to converge the server state and the file system state. The set of operations generated depends on the selected set of modifications from the unblocked list. For example, if the selected set of modifications includes the add modification associated with node 914 (e.g., the modification represented by the "Add(5, /root, Foo)") entry in reference 984) in FIG. 9, the generated set of operations may include retrieving the added content item from the content management system and adding it to the local file system of the client device.

According to some embodiments, the system may select all modifications from the unblocked list of actions to generate one or more sets of operations. However, in some scenarios, the number of modifications in the unblocked list may be quite high and the computing resources (e.g., memory and processing time) needed to process all of the modifications is substantial. In order to reduce these technological burdens, the system may select a smaller set of the modifications in the unblocked list of actions in order to process incrementally. For example, the system may select the first or top X number or percent of modifications to generate operations. In further iterations of the process, the remaining modifications in the unblocked lists may be processed.

In some embodiments, the modifications in the unblocked list may be ranked for processing. The modifications may be ranked based on, for example, a modification type (e.g., delete modifications are prioritized over add modifications), metadata associated with the modification (e.g., add modifications of content items of smaller size are prioritized over add modifications of content items of larger size, delete modifications of content items of larger size are prioritized over delete modifications of content items of smaller size, etc.).

These rank rules may be stored by the system and may be designed to achieve various performance goals for content synchronization. For example, delete modifications may be prioritized over add modifications in order to free as much of potentially limited storage space for a user before new content items may be added. Adding of smaller content items may be prioritized over larger content items in order to provide as much progress with respect to the number of content items added as soon as possible.

At operation 835, the system may provide the set of operations to the content management system and/or the client device. As noted above, modifications associated with actions performed by the content management system may not be reflected at the client device. Accordingly, in this scenario, the system may generate a client set of operations configured to operate on the content items stored on the client device to converge the server state and the file system state and this client set of operations may be provided to the client device for execution at operation 835.

On the other hand, modifications associated with actions performed by the client device may not be reflected at the content management system. Accordingly, in this scenario, the system may generate a server set of operations configured to operate on the content items stored by the content management system to converge the server state and the file system state and this server set of operations may be provided to the content management system for execution at operation 835.

In some cases, both cases may be true and a client set of operations and a server set of operations may be generated and provided to their intended recipients at operation 835. The set of operations may also include a number of checks to ensure tree constraints are maintained. For example, the set of operations may resolve various conflicts or constraints as discussed with respect to FIG. 6.

Once the set(s) of operations are provided to the intended recipient(s), the method may return to operation 805 and await new modification data. For example, with respect to the scenario illustrated in FIG. 9, the set of operations may include retrieving the content item associated with node 914 from the content management system and adding it to the local file system of the client device. This would result in the addition of a node corresponding to node 914 in the local tree (not shown in FIG. 9) and sync tree 950. On the next iteration of process 800 of FIG. 8, the add modifications of node 916 and node 918 represented by the "Add(6, 5, Bar)" and the "Add(7, 5, Bye)" entries in reference 982 are no longer blocked because their parent, node 914, has already been added to the sync tree. Accordingly, the add modifications of node 916 and node 918 represented by the "Add(6, 5, Bar)" and the "Add(7, 5, Bye)" entries in reference 982 may be added to the unblocked list of actions and used to generate one or more sets of operations configured to converge the server state and the file system state.

The set(s) of operations may provide one or more steps for the incremental convergence of the server state and the file system state. Although implementing an incremental process may be more complex at times, the incremental process may achieve a reduction in processing time and reduction in the memory required. These and other initial technological improvements naturally lead to additional technological improvements. For example, because processing time is reduced, the likelihood of additional changes from the client device or the content management system making certain modifications obsolete or out of data is reduced as well.

With respect to FIG. 9, various groupings of content items, modifications, actions, or file identifiers are described as lists for the purpose of illustration. Other types of data structures are also compatible. For example, the unblocked list of actions may be implemented as a B-tree data structure in order to keep data sorted and allow searches, sequential access, insertions, and deletions in logarithmic time.

Scheduler

In some embodiments, a client synchronization service may generate a set or sequence of operations configured to converge the server state and the file system state and provide the operations to the content management system or client device for execution. However, in some scenarios, changes on the file system of the client device or on the content management system may cause the generated set of operations to become out of date or obsolete while the set of operations is in the process of executing. Various embodiments are directed to providing a technical solution to these and other technical problems. For example, the client synchronization service may be configured to monitor changes on the file system of the client device or on the content management system and update the client device and/or content management system as needed. Furthermore, the client synchronization service may be configured to improve performance and reduce processing times by allowing for concurrent execution of operations.

According to some embodiments, planner 225 of client synchronization service 156 shown in FIG. 2 may generate a plan or plan of operations that consists of an unordered set of operations. All operations within a plan have no dependencies and, as a result, are able to be executed concurrently in separate threads or in any order. The operations in the plan, according to some embodiments, are abstract instructions that may be taken by the content management system and/or the client device in order to converge the states and tree data structures. Example instructions may include a remote or local add of a content item, a remote or local delete of a content item, a remote or local edit of a content item, or a remote or local move of a content item.

Scheduler 230 of client synchronization service 156 shown in FIG. 2 may be configured to receive the plan of operations from planner 225, manage the execution of the operations in the plan, determine if the plan has been updated or changed, and manage the execution of the updated or changed plan. For example, scheduler 230 may coordinate with file system interface 205 and server interface 210 to execute the tasks and steps needed to implement operations in the plan. This may include receiving confirmations from the file system or content management system or error handling activities such as handling retries when there is no network connectivity or when a content item is locked by some other application.

Each operation may be implemented by a script or thread referred to as a task. The task coordinates the application of an associated operation and may include one or more steps needed to implement the operation. For example, a "local add operation" may indicate that a content item has been added to the local file system of the client device and, as a result, the content item should be added at the content management system in order to synchronize the server state and the file system state. Accordingly, the local add operation may be associated with a "local add task" that includes one or more steps needed to implement the local add operation. The steps may include one or more of notifying the content management system of the new content item, uploading the content item to the content management system in one or more blocks of data, confirming that all blocks of data have been received by the content management system, making sure the content item is not corrupted, uploading metadata for the content item to the content management system, and committing the adding of the content item to the appropriate location at the content management system.

A task may begin execution, suspend at well-defined points while waiting on the completion of other events, resume when the events have occurred, and eventually terminate. According to some embodiments, scheduler 230 is configured to cancel, regenerate, or replace tasks. For example, based on changes to the server state or the file system state, a task may become stale before it is executed and scheduler 230 may cancel the stale task before it is executed.

As described above, planner 225 may generate a plan of operations based on a set of tree data structures (e.g., a remote tree, a sync tree, and a local tree). Over time, planner 225 continues to generate plans of operations based on the status of the tree data structures. If the tree data structures change to reflect the state of the server state and the file system state, planner 225 may also generate a new updated plan that differs from a previous plan. Scheduler 230 executes each plan of operations generated by the planner 225.

Figure 10:
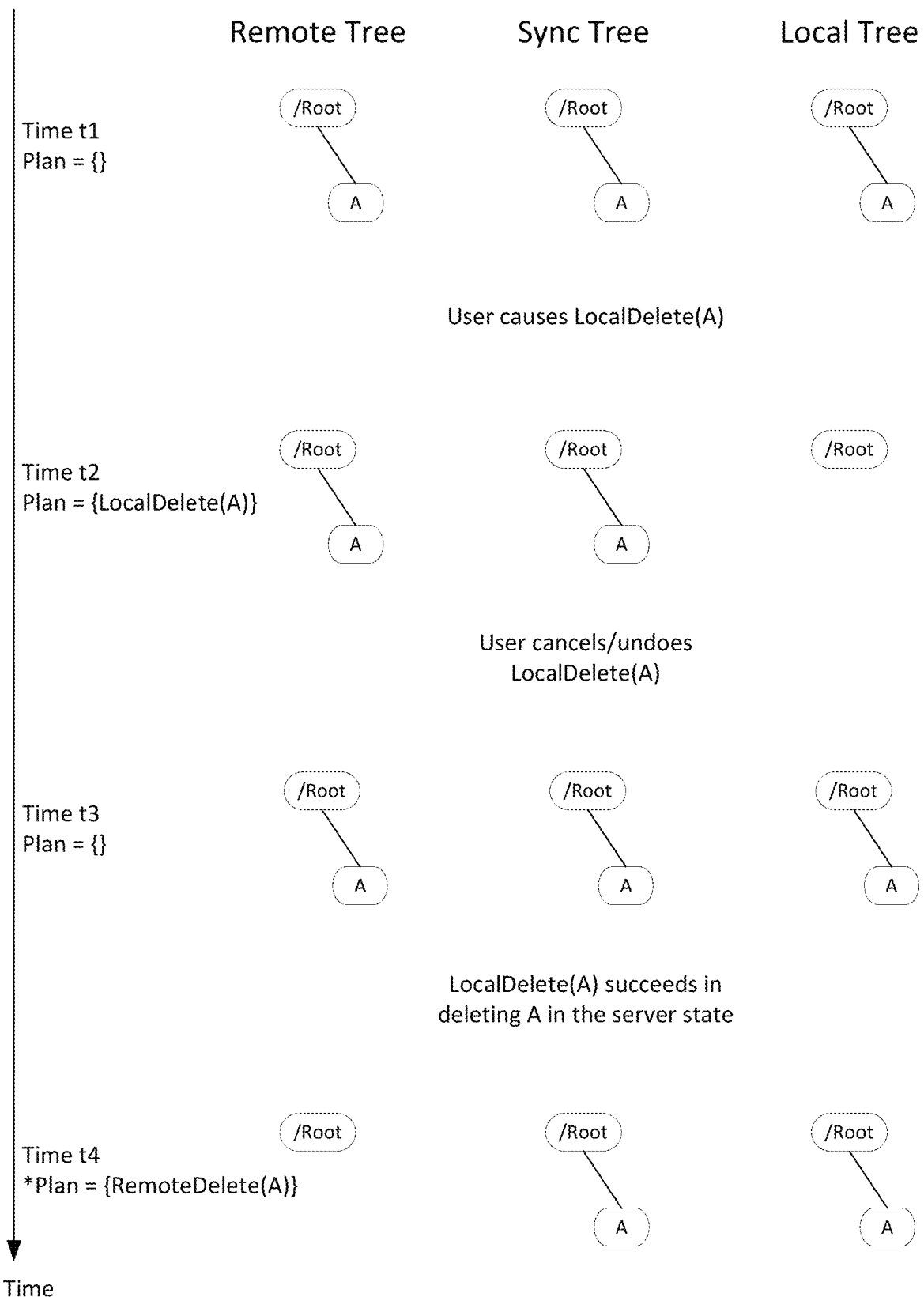
FIG. 10 shows an example scenario.

In some scenarios, changes in the operations of a subsequent plan may cause unintended synchronization behaviors conflicts with an operation in the previous plan that is in the process of execution. For example, as operations in a first plan are being executed, one or more of the operations are canceled (or are not present) in the second plan. To illustrate, FIG. 10 shows an example scenario in which, at time t1, the server state represented by the remote tree and the file system state represented by the local tree are synchronized as shown by the remote tree, the sync tree, and the local tree all matching. Based on this synchronized state, planner 225 may generate a plan with no operations (e.g., an empty plan) at t1 or not generate a plan of operations.

A user on the client device may delete content item A from the local file system or move content item A out of a folder managed by client synchronization service 156, which is reflected by the removal of node A from the local tree at time t2. Planner 225 may generate a plan that includes operation LocalDelete(A) based on the state of the tree data structures at time t2. Scheduler 230 may initiate the task or steps required to implement the LocalDelete(A) operation. These steps may include transmitting instructions to the content management system to delete content item A.

After instructions to delete content item A are transmitted to the content management system, the user on the client device may undo the delete of content item A or move content item A back to the previous location. The local tree is updated based on this new action at time t3 and planner may generate a new plan that is empty with no operations. Once again, the tree data structures match and the system is in a synchronized state at time t3.

However, because instructions to delete content item A were transmitted to the content management system, the content management system deletes content item A from the server state. Although scheduler 230 may attempt to cancel the deletion of content item A, the instructions may have already been transmitted and completed by the content management system. This change in the server is communicated to client synchronization server 156, which updates the remote tree by deleting node A at time t4. Planner 225 could notice the change in the remote tree and the difference between the remote tree and the sync tree and determine that content item A was removed at the server state. Accordingly, planner 225 would create a plan with a RemoteDelete(A) operation at time t4. In an effort to synchronize the server state and the file system state, content item A would eventually be deleted from the client device and the local tree.

Problematically, the removal of content item A from the server state, the generation of the RemoteDelete(A) operation, and the eventual removal of content item A from the file system state are all not intended and may cause further problems down the line for the user. Furthermore, in some cases, applications or processes may also access content items and unintentional synchronization behavior may cause a cascade of additional technical issues. Various embodiments are directed to preventing unintended consequences in synchronization of content items between a server state and a file system state.

According to some embodiments, when canceling a task for a stale operation that is no longer in a plan of operations, scheduler 230 may wait for the cancellation to be completed before proceeding to initiate the execution of other tasks. For example, scheduler 230 may wait to receive confirmation of the cancellation from the client device or the content management system before proceeding with other tasks. Scheduler 230 may determine whether the task has been initiated and if the task has not been initiated, scheduler may cancel the task and confirm that the task is no longer awaiting execution. If the task has been initiated, the confirmation may come from the client device or the content management system and notify the scheduler that all of the steps associated with the canceled task have been undone. According to some implementations, scheduler 230 does not allow for cancellation of a task once it has been initiated. This may be the case for all tasks or a certain subset of tasks or task types (e.g., a commit task that sends an update on the file system state to the content management system for synchronization with the server state).

Figure 11:
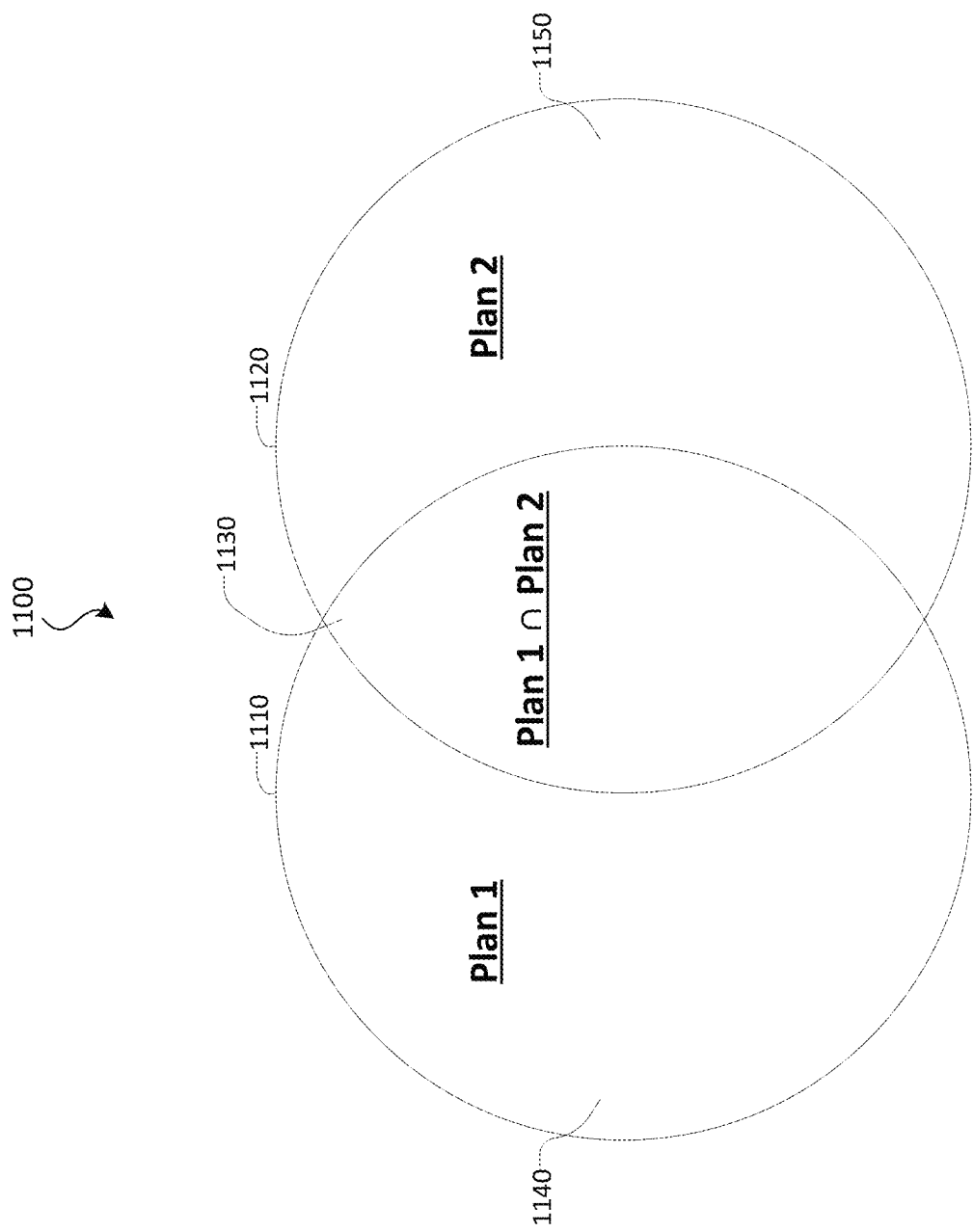
FIG. 11 shows an example Venn diagram representation of two plans of operations, in accordance with various embodiments of the subject technology.

In order to improve performance and allow for concurrent execution of tasks as well as the cancellation of tasks, scheduler 230 may also be configured to manage the execution and cancellation of tasks based on differences between a first plan of operations and an updated second plan of operations. FIG. 11 shows an example Venn diagram 1100 representation of two plans of operations, in accordance with various embodiments of the subject technology. Planner 225 may generate a plan 1 1110 with a first set of operations, receive an update to the tree data structures, and generate an updated plan 2 1120 with a second set of operations.

Plan 1 1110 and plan 2 1120 may share a number of common operations, which is represented by portion 1130 of the Venn diagram 1100. Plan 1 1110 and plan 2 1120 may also share a number of operations that are not in common. For example, operations in plan 1 1110 that are not in plan 2 1120 are stale and no longer current based on the update to the tree structures detected by planner 225. These stale operations of plan 1 1110 are represented by portion 1140 of Venn diagram 1100. New operations in plan 2 1120 that are not in plan 1 1110 are represented by portion 1150. Each of portions 1130, 1140, and 1150 which represent the differences and commonalities between plan 1 1110 and plan 2 1120 may include no operations or many operations depending on the updates to the server state and the file system state that are reflected in the tree data structures.

Because the operations in portion 1140 are no longer in the most recent plan, scheduler 230 may cancel tasks associated with these operations. In order to prevent unintended synchronization behavior, tasks associated with operations in plan 2 that are not in plan 1 (e.g., in portion 1150) are postponed until the cancellation of tasks associated with operation in portion 1140 is completed. However, because operations in each plan are configured to be able to be executed concurrently, tasks associated with operations in the intersection of plan 1 and plan 2 represented by portion 1130 may be executed concurrently with the cancellation of tasks associated with operation in portion 1140 without having to wait for their completion. By allowing for the concurrent cancellation of tasks associated with portion 1140 and the execution of tasks associated with portion 1130, more efficient use of available computing resources may be achieved as well as a reduction in processing time.

Figure 12:
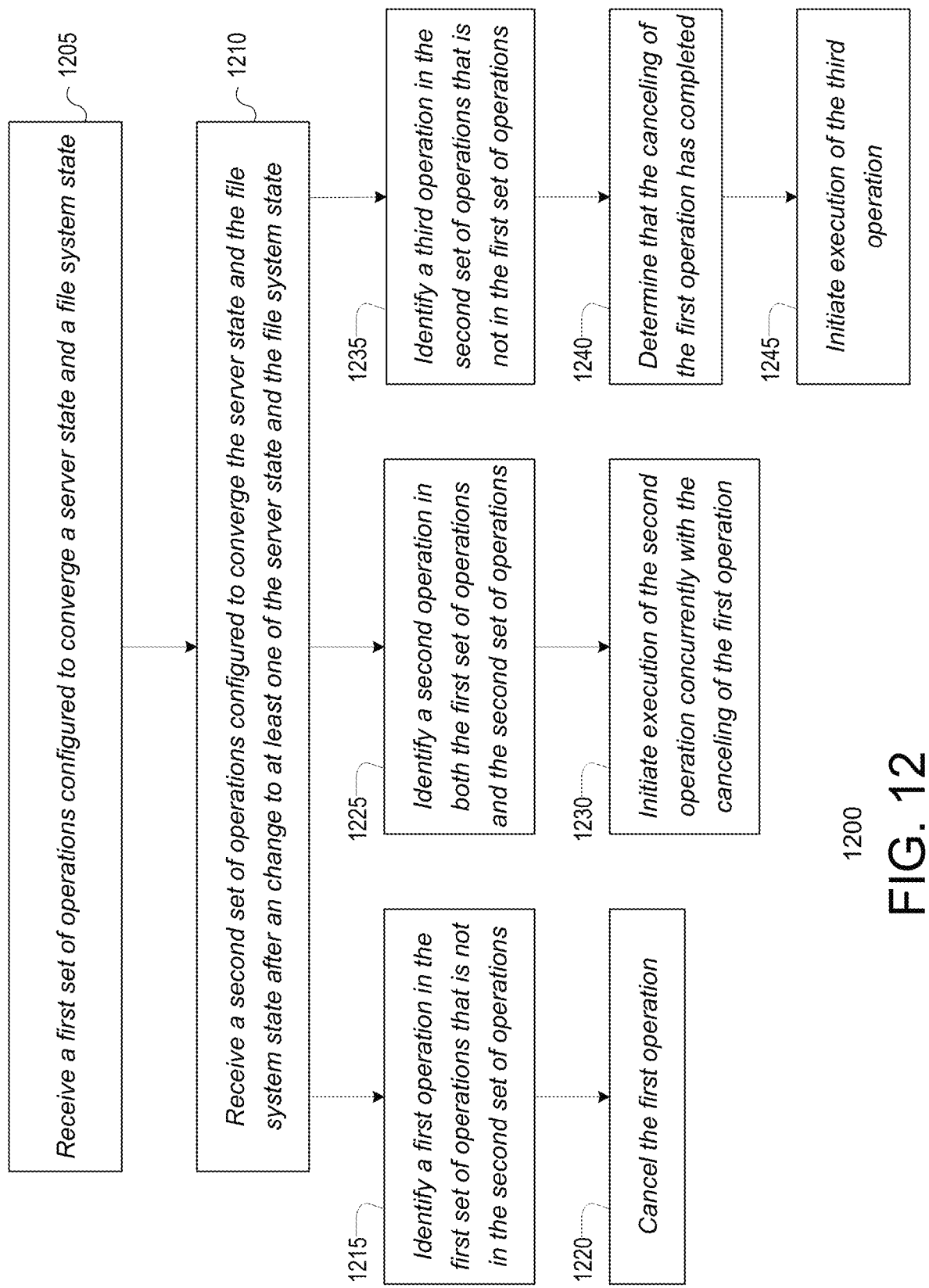
FIG. 12 shows an example method for managing changes in plans of operations, in accordance with various embodiments of the subject technology.

FIG. 12 shows an example method for managing changes in plans of operations, in accordance with various embodiments of the subject technology. Although the methods and processes described herein may be shown with certain steps and operations in a particular order, additional, fewer, or alternative steps and operations performed in similar or alternative orders, or in parallel, are within the scope of various embodiments unless otherwise stated. The method 1200 may be implemented by a system such as, for example, client synchronization service 156 of FIG. 2, running on a client device.

The system may be configured to receive updates from a content management system and/or the client device with regards to content items associated with a content management service. For example the system may receive server modification data for content items stored by a content management service and update, based on the server modification data, a remote tree. The remote tree represents the server state for content items stored by the content management system. The system may also receive client modification data for content items stored on the client device and update, based on the client modification data, a local tree. The local tree represents the file system state for content items stored on the client device.

At operation 1205, the system may receive a first set of operations configured to converge a server state associated with the content management system and a file system state associated with the client device. For example, the system may identify differences between a sync tree and a remote tree or the sync tree and a local tree and generate the first set of operations based on any differences between the trees. The sync tree represents a known synced state between the server state and the file system state.

The system may begin to implement the first set of operations. For example, in some cases, the operations are in a format ready to be transmitted to the content management system and/or the client device for execution. In other cases, the operations may be translated into one or more tasks, scripts, or execution threads that may be managed by the system. The system may interface with the content management system and/or the client device according to the tasks, scripts, or execution threads in order to converge the server state and the file system state.

During this time, the system may continue to receive modification data from a content management system and/or the client device with regards to content items associated with the content management service. Based on the modification data, the system may update the remote tree or local tree and generate a second set of operations based on the updates to the tree data structures. At operation 1210, the system may receive the second set of operations.

At operation 1215, the system identifies a first operation in the first set of operations that is not in the second set of operations, if any. If the system finds an operation in the first set of operations that is not in the second set of operations, this operation may be stale and out of date as a result of changes specified in the modification data. Accordingly, the system will initiate the cancellation of the first operation at operation 1220. The cancellation of the first operation may include a number of steps, a number of confirmation receipts for the steps, and a non-trivial amount of processing time.

At operation 1225, the system identifies a second operation that is included in both the first set of operations and the second set of operations, if any. If the system finds an operation in both the first set of operations and the second set of operations, this operation may be still be valid notwithstanding changes specified in the modification data. Furthermore, since the operations in both sets of operations are configured to be able to be executed concurrently or in any order with respect to other operations in the set, the second operation can continue execution while the first operation is canceled. Accordingly, the system will initiate the execution of the second operation at operation 1230 without waiting for the first operation to complete cancellation.

At operation 1235, the system identifies a third operation that is in the second set of operations, but not in the first set of operations, if any. If the system finds an operation in the second set of operations that is not in the first set of operations, this operation may be a new operation as a result of changes specified in the modification data. In order to prevent unintended consequences, the system will initiate a wait for the completion of the cancellation of the first operation. At operation 1240, the system may determine that the first operation has completed cancellation and, as a result, initiate the execution of the third operation at operation 1245.

Tree Data Structure Storage—Reduction of Filename Storage Space

Client Synchronization Service 156 may store the tree data structures (e.g., the remote tree, the sync tree, and the local tree) on a persistent storage device such as, for example, a hard disk, solid state memory, or other types of computer readable media. In order to improve performance, reduce processing time, and reduce out-of-date operations, client synchronization service 156 may load the tree data structures into memory (e.g., random access memory or a cache of high-speed memory) on startup and perform synchronization functions on the tree data structures in memory. Data capacity is limited on persistent storage devices and conservation of these data resources is important. Data capacity is even more limited and expensive for memory and conservation of these data resources is critical.

Depending on the operating system or client application, filenames for content items can be around 1024 bytes in size and may be the largest data component in a node. For example, with a million nodes, the size of just the filenames for the nodes may reach upwards of 1 gigabyte. As noted above, client synchronization service 156 is configured to aid in the synchronization of the server state and the file system state and the local tree, the sync tree, and the remote tree reflect a synchronized state when all three trees are equivalent. Accordingly, there is likely some redundancy in storing the filenames of content items in the nodes.

Various embodiments of the subject technology aim to decrease the amount of memory needed to store filenames for the tree data structures and reduce the side of nodes by reducing the duplication of filenames. Instead of storing the filename in the node, client synchronization service 156 is configured to store filenames for nodes in the tree data structures in a filename array and a reference to the filename in the node. As a result, the filename is stored once in the filename array and any node with a content item having that filename may access the filename using the reference stored in the node. In some implementations the reference to the filename stored in the node may be an integer value that represents the offset, location, or position of the filename in the filename array.

Figure 13:
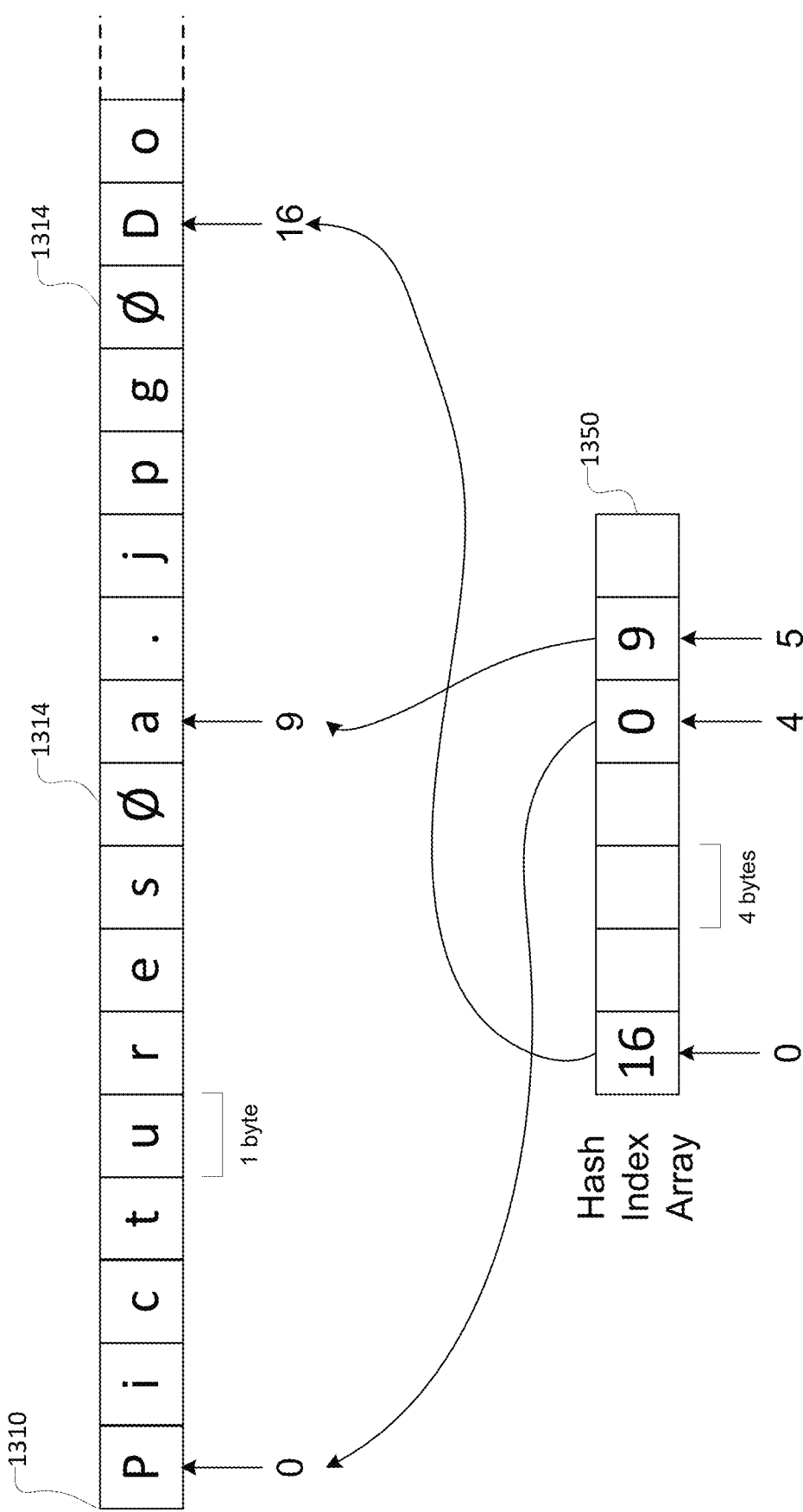
FIG. 13 shows an illustration of a filename array and a hash index array, in accordance with various embodiments of the subject technology.

FIG. 13 shows an illustration of a filename array 1310, in accordance with various embodiments of the subject technology. Filename array 1310 is shown storing filenames "Pictures," "a.jpg," and "Documents" (not shown entirely). The "Pictures" filename is shown at location 0, the "a.jpg" filename is shown at location 9, and the "Documents" filename is shown at location 16 in filename array 1310. In filename array 1310, a separator 1314 (e.g., a null character) separates each filename.

Accordingly, to lookup the filename for a node, client synchronization service 156 may simply access the reference to the filename stored in the node, which represents the location of the filename for the node in filename array 1310. Client synchronization service 156 may retrieve the filename of the content item at the location in the filename array 1310 specified by the reference. For example, client synchronization service 156 may begin reading the filename at the location specified in the reference and stop when a separator 1314 is reached.

In some cases, client synchronization service 156 may also need to lookup reference based on a filename. For example, when adding a new node or renaming a node client synchronization service 156 may wish to determine whether the filename of the node already exists in filename array 1310. If the reference is found, the filename exists and may be located based on the reference. Accordingly, client synchronization service 156 may use the reference to the filename and store the reference in the new or renamed node. If the reference is not found, the filename does not exist in filename array 130 and client synchronization service 156 may add the filename to filename array 1310.

The lookup of the reference based on the filename is enabled by the use of a hash index array. FIG. 13 shows an illustration of a hash index array 1350, in accordance with various embodiments of the subject technology. Hash index array 1350 is configured to store references to filenames at various locations. In particular, the reference to a filename is stored at the position in hash index array 1350 based on the hash of the filename. In one example illustrated in FIG. 13, based on a hash function being used, the hash of filename "Pictures" may equal 4. Accordingly the reference to the filename "Pictures" is stored at position 4 in hash index array 1350. This reference value is 0 which, as noted above, specifies the location in the filename array 1310 of the filename "Pictures." Similarly, the hash of filename "Documents" may equal 0. Accordingly the reference to the filename "Documents" is stored at position 0 in hash index array 1350. This reference value is 16 which, as noted above, specifies the location in the filename array 1310 of the filename "Documents."

In some scenarios, a collision may occur where the hash of two filenames yields the same hash value. In the example illustrated in FIG. 13, the hash value of "a.jpg" may also be 4. If a collision occurs, client synchronization service 156 may use the next available position in hash index array 1350. For example, since the reference to the filename "Pictures" is stored at position 4 in hash index array 1350, client synchronization service 156 may look for the next available position in hash index array 1350 and store the reference (e.g., 9) to the filename "a.jpg"

Figure 14:
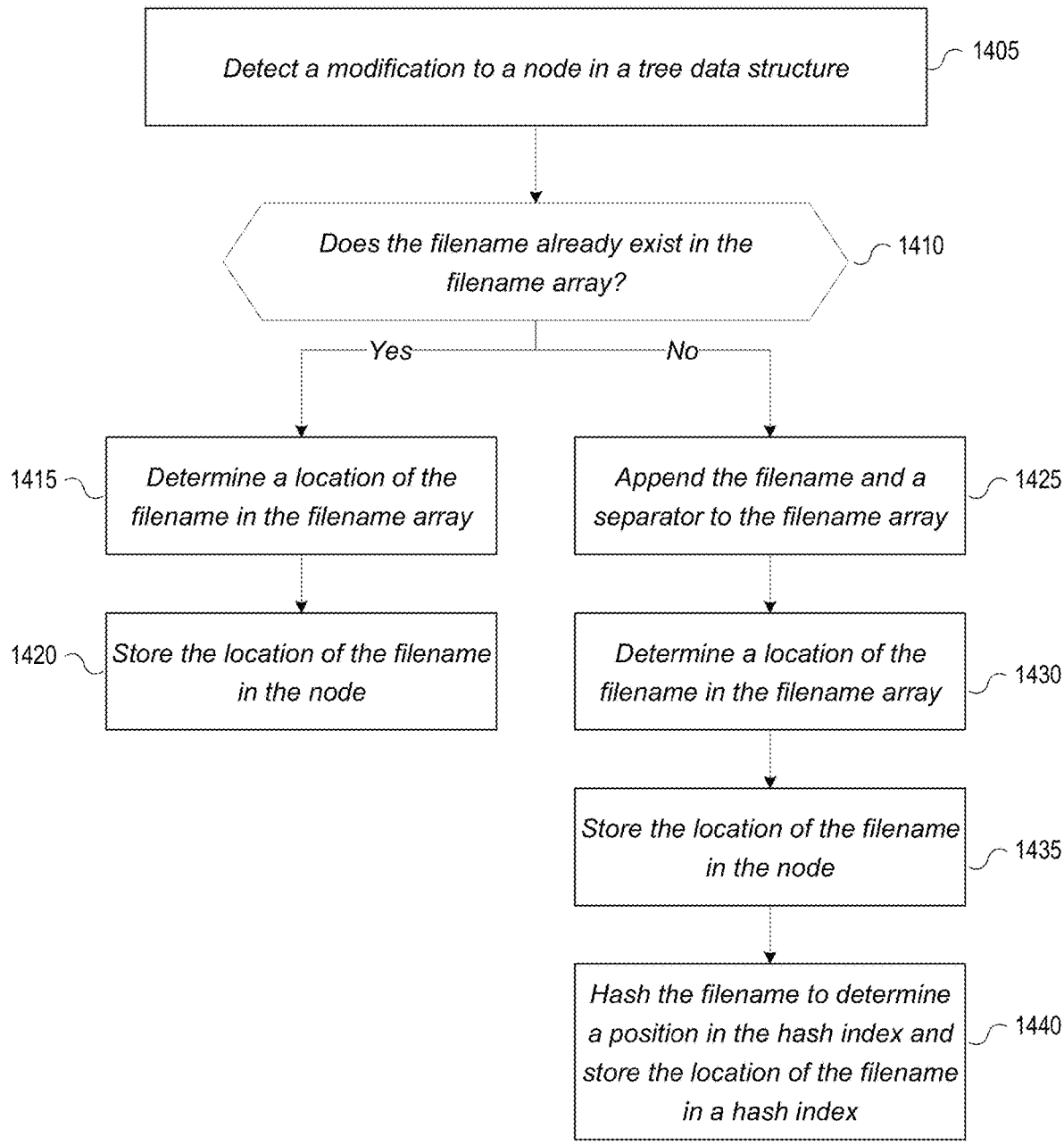
FIG. 14 shows an example method for storing a filename, in accordance with various embodiments of the subject technology.

FIG. 14 shows an example method for storing a filename, in accordance with various embodiments of the subject technology. Although the methods and processes described herein may be shown with certain steps and operations in a particular order, additional, fewer, or alternative steps and operations performed in similar or alternative orders, or in parallel, are within the scope of various embodiments unless otherwise stated. The method 1400 may be implemented by a system such as, for example, client synchronization service 156 of FIG. 2, running on a client device.

At operation 1405, the system may detect a modification to a node in a tree data structure. The modification may be, for example, an add of the node to the tree data structure or an edit of the filename of the node. The system may then determine whether or not the filename already exists in the filename array at operation 1410. The system may check to see whether the filename is already in the filename array by querying, using the filename associated with the node, for a reference location of the filename in the filename array. If a reference location is found, there is no need to add the filename to the filename array and at operation 1415, the system may determine the location for the filename in the filename array, which should be the reference returned by the query, and store the location of the filename in the node at operation 1420.

If the query does not return a reference for the filename in the filename array or if the filename is not otherwise in the filename array, the system may append the filename and a separator to the filename array at operation 1425, determine the location of the filename in the filename array at operation 1430, and store the location of the filename in the node at operation 1435.

In order enable the subsequent querying of the reference location based on the filename, the system may further store the location of the filename in a hash index. To determine which position in the hash index to store the location of the filename, the system may compute a hash value of the file name. This hash value may be used to find the position in the hash index to store the location of the filename.

Once the location of the filename is stored in a node, retrieving the filename may simply involve accessing the location of the filename in the node and using the location to lookup the filename in the filename array. The system may start from the location specified in the node and stop when a separator is reached.

Figure 15:
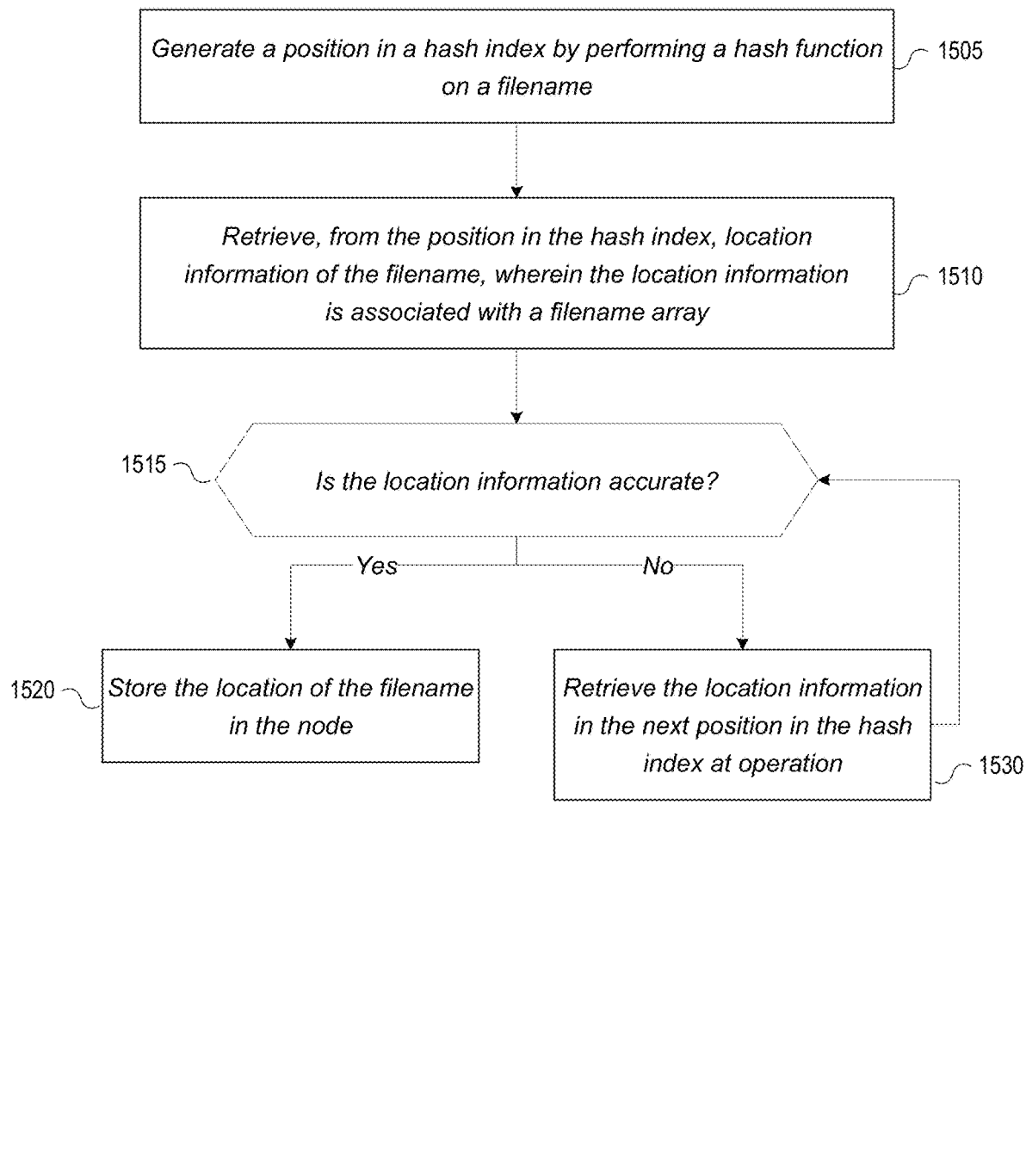
FIG. 15 shows an example method for retrieving a location of a filename given the filename, in accordance with various embodiments of the subject technology.

FIG. 15 shows an example method for retrieving a location of a filename given the filename, in accordance with various embodiments of the subject technology. Although the methods and processes described herein may be shown with certain steps and operations in a particular order, additional, fewer, or alternative steps and operations performed in similar or alternative orders, or in parallel, are within the scope of various embodiments unless otherwise stated. The method 1500 may be implemented by a system such as, for example, client synchronization service 156 of FIG. 2, running on a client device. As described above, the method may be used to determine whether a filename has already been stored in the filename array.

The locations of the filenames are stored in a hash index or hash index array. Accordingly, at operation 1505, the system may generate a position in the hash index by performing a hash function on the filename. This may be, for example, the name of a new node or the new name for a node being renamed. At operation 1510, the system retrieves, from the position in the hash index, location information of the filename. This location information is for a location in the filename array where the filename is stored.

In some implementations, the system may check to make sure the correct filename is stored in the location at operation 1515. For example, the system may retrieve, based on the location information, a string from the filename array and compare the string with the filename. If the string and the filename match, the location of the filename is confirmed and, at operation 1520, the location of the filename is stored in the node.

If the string and the filename do not match, the retrieves the location information in the next position in the hash index at operation 1530 and the system may return to operation 1515 to check whether the location information in the next position is accurate. The system may continue until the correct location information is found and, at operation 1520, stored in the node.

Efficiently Identifying Differences Between Trees

As noted above, client synchronization service 156 is configured to identify differences between nodes in a remote tree representing a server state for content items stored by the content management system, a local tree representing the file system state for the corresponding content items stored on the client device, and a sync tree representing a known synced state between the server state and the file system state. Based on these differences, a set of operations may be generated that, if executed, are configured to converge the server state and the file system state towards a synchronized state where the three tree data structures would be identical.

When there are a large number of nodes, it is important to be able to identify differences between the trees efficiently. For example, there may be millions upon millions of nodes in a tree and comparing each node individually can be prohibitive in terms of processing time and resource usage.

Various embodiments of the subject technology relate to providing a more efficient means to identify difference between trees. In particular, client synchronization service 156 is configured to assign values to each node that can be used to compare with nodes in other trees to determine whether the nodes are different. These values may be referred to as diff values. In order to improve the efficiency of identifying differences between trees, each leaf node may be assigned a diff value and diff values for parent nodes may be calculated based on the diff values of their child nodes. Diff values for every level of the tree data structure may be calculated in this way including the root node.

Figure 16A:
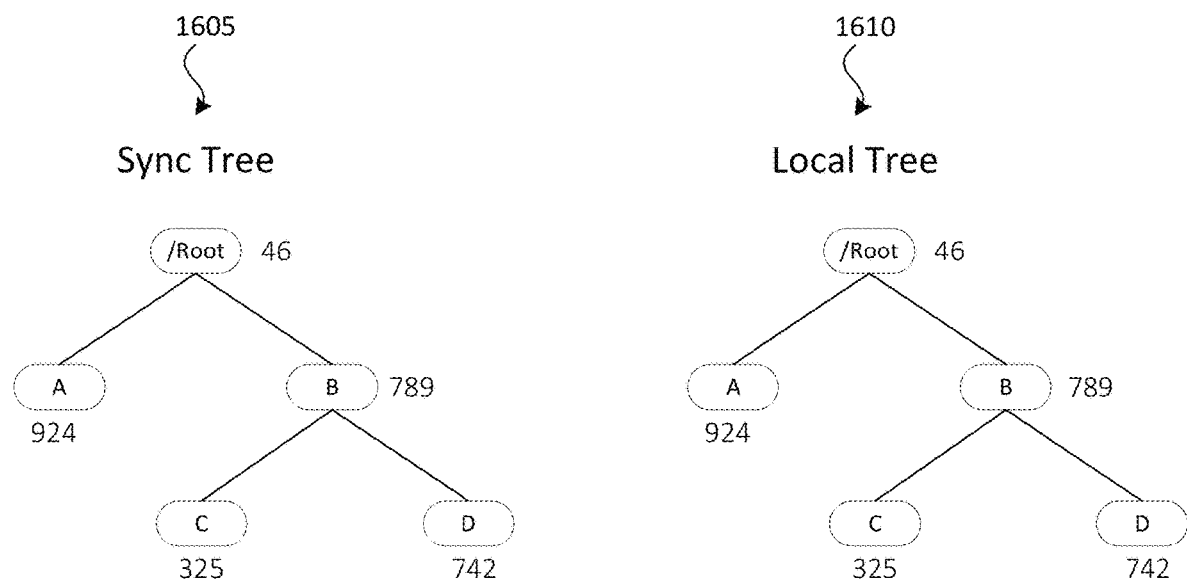
FIGS. 16A and 16B show examples of tree data structures, in accordance with various embodiments.
Figure 16B:
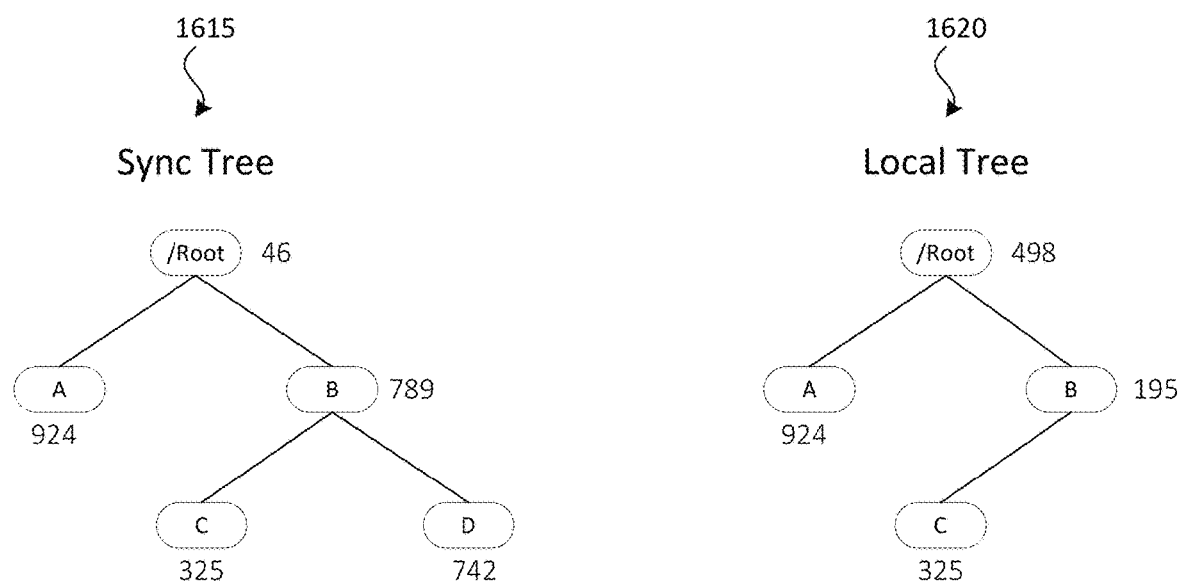

FIGS. 16A and 16B show examples of tree data structures, in accordance with various embodiments. For illustrative purposes, FIGS. 16A and 16B show a sync tree and a local tree. However, the remote tree may perform similarly. In FIGS. 16A and 16B, diff values for the leaf nodes for the sync tree and the local tree are computed using hash functions on the nodes. Each parent node (or node with children) has a diff value computed based on the diff values of their child nodes.

For example, in sync tree 1605 of FIG. 16A, the diff value for node C is 325, the diff value for node D is 742, and the diff value for B, the parent of nodes C and D, is calculated as a function of the diff values of C and D. In other words, the DiffValue(B)=f(DiffValue(C), DiffValue(D))=f(325, 742). Similarly, the diff value of the root node is a function of the diff values of its child nodes, node A and node B. Put another way, DiffValue(/root)=f(DiffValue(A), DiffValue(B))=f(924, 789).

In order to identify differences between trees, client synchronization service 156 may compare diff values of corresponding nodes to see whether they are different. If the diff values are the same, there is no difference between trees. If the diff values are different, there is a change in the node or down a path associated with the node. As a result, client synchronization service 156 can look at the child nodes and compare the corresponding nodes in the opposite tree to determine whether they are different and whether there is a difference down a path associated with the child node.

For example, in FIG. 16A, client synchronization service 156 may compare diff values of the root node of sync tree 1605 and the root node of local tree 1610 and determine that the diff values match. Accordingly there is no difference in the children of the root nodes. As a result, client synchronization service 156 may determine that sync tree 1605 and local tree 1610 match and are synchronized without needing to compare each and every node in the trees with the corresponding node in the opposite tree.

In the example illustrated in FIG. 16B, client synchronization service 156 may similarly compare diff values of the root node of sync tree 1605 and the root node of local tree 1610. However, client synchronization service 156 may determine that the diff values of the root node of sync tree 1605 and the root node of local tree 1610 are different, which indicates that there may be a difference in the descendants of the root nodes.

Accordingly, client synchronization service 156 may move to the next level of the children of the root nodes to compare their diff values. For node A, the diff value of node A in sync tree 1615 and the diff value of node A in local tree 1620 match. Accordingly, there is no difference between the two and the difference detected at the root level is not caused by node A or any path down node A.

Moving to node B, client synchronization service 156 compare their diff values of node B in both trees and discover that the diff value of node A in sync tree 1615 and the diff value of node A in local tree 1620 are different. Accordingly, the difference detected at the root level is caused by node B or a path down node B. Client synchronization service 156 may move to the next level of the children of node B to compare their diff values and discover that the difference detected at the root level was caused by a deletion of node D. As a result, client synchronization service 156 may identify a difference between sync tree 1615 and local tree 1620 without needing to compare each and every node in the trees with the corresponding node in the opposite tree. For example node A may have had many descendant nodes that did not need to be analyzed because the diff values of node A in both trees matched.

A Merkle tree or hash tree mechanism may work in some cases. For example, the diff value for each leaf node may be calculated based on the hash of the leaf node and the diff value of non-leaf nodes may be computed based on a hash of the sum of the child diff values. However, with the Merkle tree or hash tree mechanism has unfavorable performance metrics in certain circumstances. When you add or delete a leaf node, the diff values of all of the ancestor nodes of the leaf node need to have their diff values recomputed and recomputing each of the ancestor nodes requires a listing of all of the children nodes for each ancestor node. This is computationally expensive, especially when the tree data structures are stored in a way where each node is not stored in memory next or near to a sibling node.

Various embodiments of the subject technology address these and other technical shortcomings by, among other things, computing the diff values of the parent nodes differently. The diff value of each leaf node may be determined by calculating a hash of the leaf node. The diff value of each parent node may be calculated by performing an exclusive-or operation or XOR operation of the hashes of all of its children.

Figure 17:
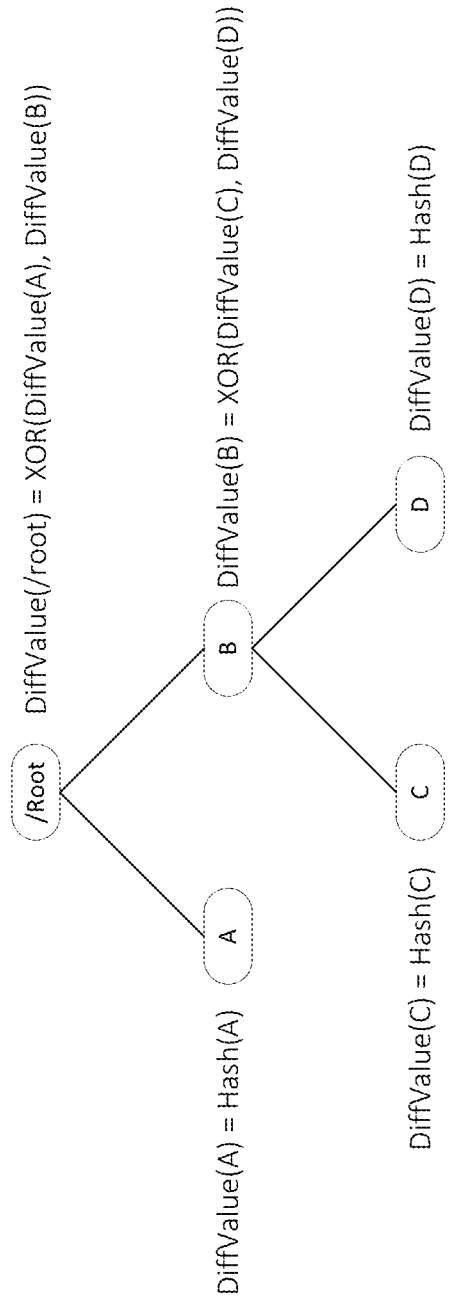
FIG. 17 shows an example of tree data structures, in accordance with various embodiments.

FIG. 17 shows an example of tree data structure, in accordance with various embodiments. In the tree data structure of FIG. 17, the diff values of leaf nodes A, C, and D are calculated by hashing the nodes. The diff value of node B is a XOR function of the hash of its child nodes, node C and node D. The diff value of the root node is a XOR function of the hash of its child nodes, node A and node B. Important qualities of the XOR function include that the XOR function is not order sensitive, meaning that m XOR n would equal n XOR m. Also m XOR m equals 0.

When you add or delete a leaf node, the diff values of all of the ancestor nodes of the leaf node need to have their diff values recomputed. However, computing the diff values of the ancestor nodes can be done without requiring a listing of all. For example, when a child node is deleted, the new diff value of the parent may be calculated by performing an XOR operation on the old diff value of the parent and the diff value of the deleted child node. When a child node is added, the new diff value of the parent may be calculated by performing an XOR operation on the old diff value of the parent and the diff value of the new child node.

Figure 18:
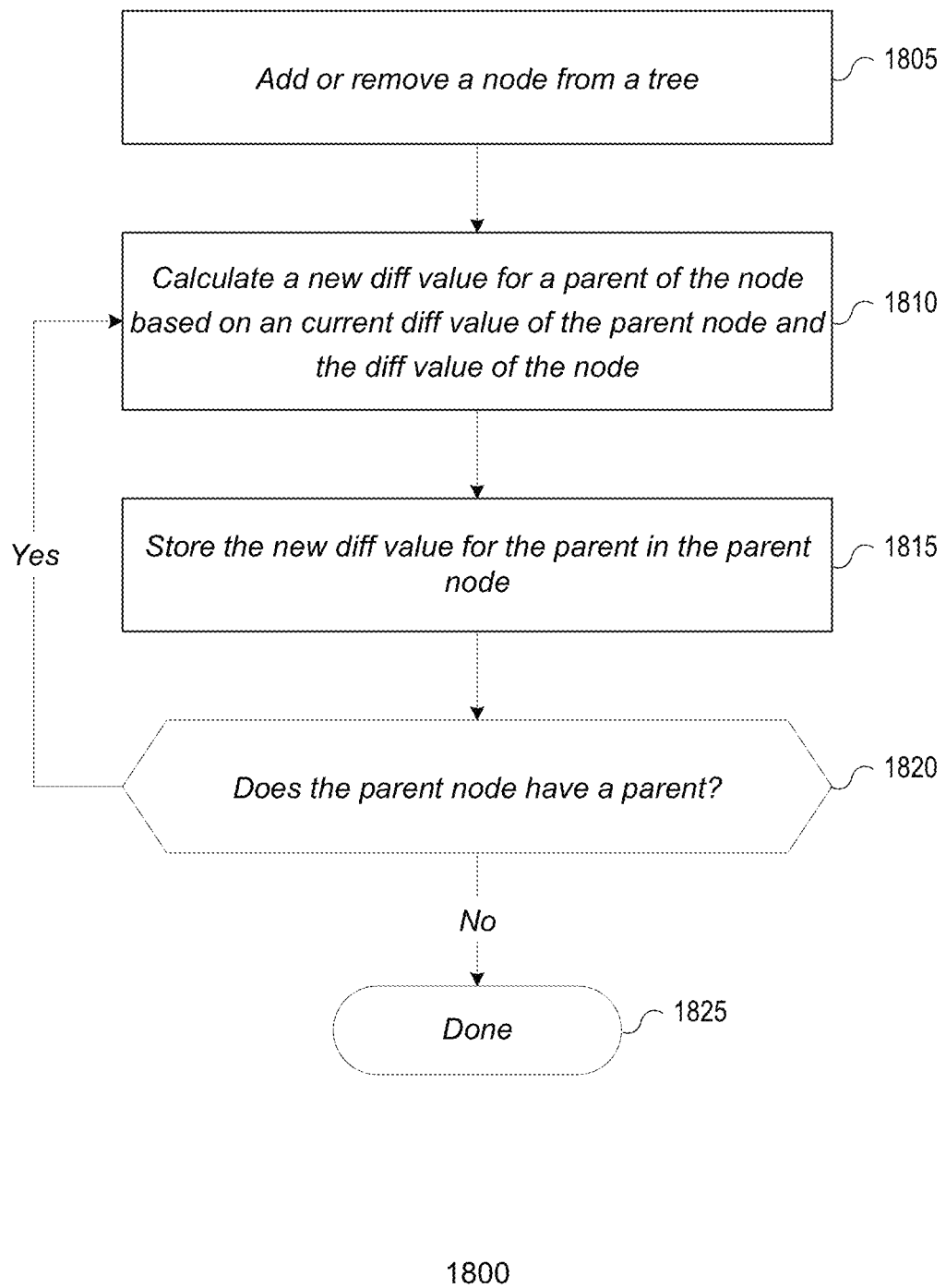
FIG. 18 shows an example method for retrieving a location of a filename given the filename, in accordance with various embodiments of the subject technology.

FIG. 18 shows an example method for retrieving a location of a filename given the filename, in accordance with various embodiments of the subject technology. Although the methods and processes described herein may be shown with certain steps and operations in a particular order, additional, fewer, or alternative steps and operations performed in similar or alternative orders, or in parallel, are within the scope of various embodiments unless otherwise stated. The method 1800 may be implemented by a system such as, for example, client synchronization service 156 of FIG. 2, running on a client device. As described above, the method may be used to determine whether a filename has already been stored in the filename array.

At operation 1805, client synchronization service 156 may add or remove a node from a tree data structure such as the remote tree, the sync tree, or the local tree. If the node is deleted, the node should have a previously calculated diff value associated with it. If the node is added, client synchronization service 156 may calculate a diff value for the new node by, for example, hashing the node. Because there is a change to the tree, the diff values for the ancestors of the node must be updated.

At operations 1810, client synchronization service 156 may calculate a new diff value for the parent of the node based on the current diff value of the parent node and the diff value of the node. At operation 1815, the new diff value for the parent is stored in the parent node.

At operation 1820, client synchronization service 156 determines whether the parent node itself has a parent. In other words, where the parent node a root node or whether there additional ancestors to compute diff values for. If there is an additional parent, the process may return to operation 1810 where the parent of the parent node will have a new diff value calculated and stored. If there is not an additional parent and the parent node is a root node, the process may stop at operation 1825.

Once the root node is reached the tree data structure is ready to be compared with other tree data structures in order to identify differences. As noted above, client synchronization service 156 may generate a set of operations based on these differences that if executed, are configured to converge the server state and the file system state towards a synchronized state where the three tree data structures would be identical.

Figure 19:
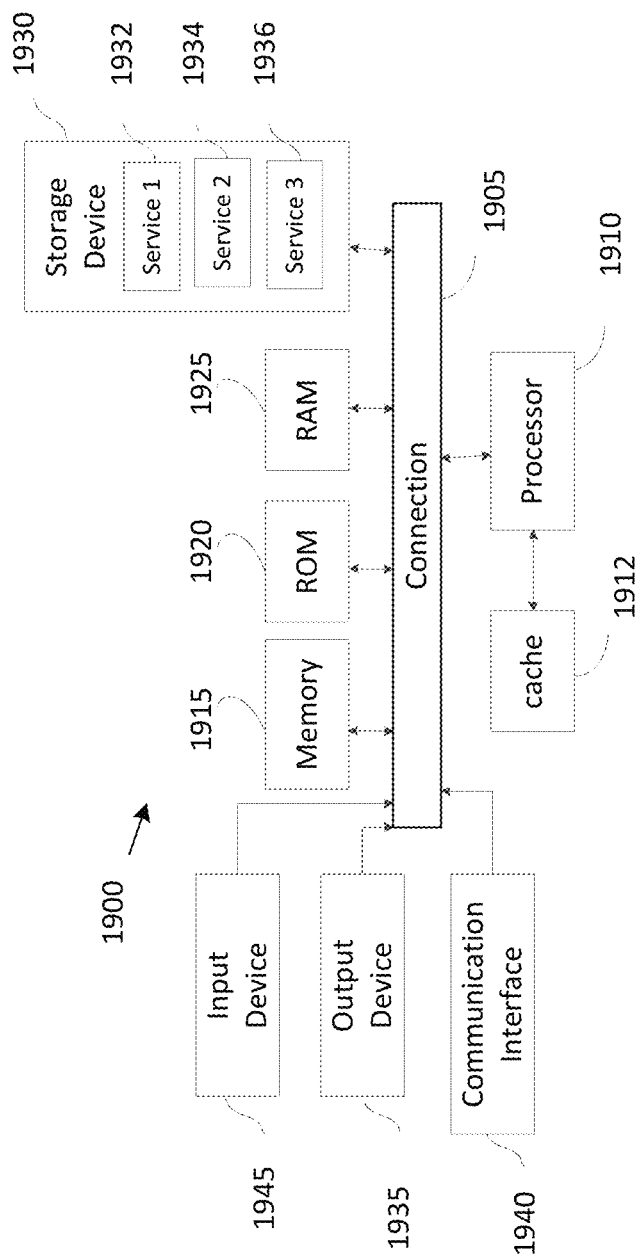
FIG. 19 shows an example of a system for implementing certain aspects of the present technology.

FIG. 19 shows an example of computing system 1900, which can be for example any computing device making up client device 150, content management system 110 or any component thereof in which the components of the system are in communication with each other using connection 1905. Connection 1905 can be a physical connection via a bus, or a direct connection into processor 1910, such as in a chipset architecture. Connection 1905 can also be a virtual connection, networked connection, or logical connection.

In some embodiments computing system 1900 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 1900 includes at least one processing unit (CPU or processor) 1910 and connection 1905 that couples various system components including system memory 1915, such as read only memory (ROM) 1920 and random access memory (RAM) 1925 to processor 1910. Computing system 1900 can include a cache of high-speed memory 1912 connected directly with, in close proximity to, or integrated as part of processor 1910.

Processor 1910 can include any general purpose processor and a hardware service or software service, such as services 1932, 1934, and 1936 stored in storage device 1930, configured to control processor 1910 as well as a special-purpose processor where software instructions are incorporated into the actual processor design. Processor 1910 may essentially be a completely self-contained computing system, containing multiple cores or processors, a bus, memory controller, cache, etc. A multi-core processor may be symmetric or asymmetric.

To enable user interaction, computing system 1900 includes an input device 1945, which can represent any number of input mechanisms, such as a microphone for speech, a touch-sensitive screen for gesture or graphical input, keyboard, mouse, motion input, speech, etc. Computing system 1900 can also include output device 1935, which can be one or more of a number of output mechanisms known to those of skill in the art. In some instances, multimodal systems can enable a user to provide multiple types of input/output to communicate with computing system 1900. Computing system 1900 can include communications interface 1940, which can generally govern and manage the user input and system output. There is no restriction on operating on any particular hardware arrangement and therefore the basic features here may easily be substituted for improved hardware or firmware arrangements as they are developed.

Storage device 1930 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 1930 can include software services, servers, services, etc., that when the code that defines such software is executed by the processor 1910, it causes the system to perform a function. In some embodiments, a hardware service that performs a particular function can include the software component stored in a computer-readable medium in connection with the necessary hardware components, such as processor 1910, connection 1905, output device 1935, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method comprising:
    identifying a set of modifications based on at least one difference between a sync tree and at least one of a remote tree and a local tree, wherein the sync tree represents a known synced state between a server state and a file system state, the remote tree represents the server state on a remote memory location, and the local tree represents the file system state on a client device, wherein a portion of the file system state has been synchronized with a portion of the server state when a portion of the remote tree, a portion of the sync tree, and a portion of the local tree are identical;
    selecting a set of unblocked modifications from the set of modifications based on whether each modification has a dependency;
    generating, based on the set of unblocked modifications, a set of operations configured to converge the server state and the file system state;
    ranking the set of unblocked modifications, wherein a first subset of the unblocked modifications are ranked higher than a second subset of modifications based on a different modification type associated with each subset;
    selecting the first subset of the set of unblocked modifications based on the ranking, wherein the set of operations is generated based on the subset; and
    providing the set of operations for execution, wherein executing the set of operations updates at least one of the remote tree or the local tree.

2. The computer-implemented method of claim 1, wherein each unblocked modification in the set of unblocked modifications does not have a dependency on any other modification.

3. The computer-implemented method of claim 1, further comprising:
    receiving server modification data for content items stored by a content management system; and
    updating, based on the server modification data, the remote tree.

4. The computer-implemented method of claim 1, further comprising:
    receiving client modification data for content items stored by the client device; and
    updating, based on the client modification data, the local tree.

5. The computer-implemented method of claim 1, further comprising:
    receiving modification data for content items stored by a content management system or on the client device; and
    identifying a list of modified content items based on the modification data, wherein the set of modifications is further identified based on the list of modified content items.

6. The computer-implemented method of claim 1, wherein the remote tree, the local tree, and the sync tree are stored on the client device, the sync tree includes at least a common node between the remote tree and the local tree.

7. The computer-implemented method of claim 1, wherein the set of operations comprises a server set of operations configured for execution by a content management system, the method further comprising transmitting the server set of operations to the content management system.

8. The computer-implemented method of claim 1, wherein the set of operations comprises a client set of operations configured for execution by the client device.

9. The computer-implemented method of claim 1, further comprising:
    detecting a violation of a rule by an operation in the set of operations;
    identifying resolution actions for the violation of the rule; and
    applying the resolution actions to the set of operations.

10. The computer-implemented method of claim 9, wherein detecting the violation of the rule by the operation includes:
    identifying an operation type for the operation in the set of operations; selecting
    a set of rules associated with the operation type; and
    determining that the rule in the set of rules is violated by the operation.

11. A non-transitory computer-readable medium comprising instructions, the instructions, when executed by a computing system, cause the computing system to:
receive modification data for content items associated with a content management system;
update, based on the modification data, a set of tree data structures including a sync tree, a remote tree, and a local tree, wherein the sync tree represents a known synced state between a server state and a file system state, the remote tree represents the server state on a remote memory location, and the local tree represents the file system state on a client device, wherein a portion of the file system state has been synchronized with a portion of the server state when a portion of the remote tree, a portion of the sync tree, and a portion of the local tree are identical;
identify a set of modifications based on the set of tree data structures;
select a set of unblocked modifications from the set of modifications based on whether each modification has a dependency;
generate, based on the set of unblocked modifications, a set of operations configured to converge the server state and the file system state;
rank the set of unblocked modifications, wherein a first subset of the unblocked modifications are ranked higher than a second subset of modifications based on a different modification type associated with each subset;
select the first subset of the set of unblocked modifications based on the ranking, wherein the set of operations is generated based on the subset; and
provide the set of operations for execution, wherein executing the set of operations updates the remote tree or the local tree.

12. The non-transitory computer-readable medium of claim 11, wherein each unblocked modification in the set of unblocked modifications does not have a dependency on any other modification.

13. A system comprising:
one or more processors; and
a non-transitory computer-readable medium storing instructions that, when executed by the one or more processors, cause the one or more processors to:
identify a set of modifications based on a set of tree data structures including a sync tree, a remote tree, and a local tree, wherein the sync tree represents a known synced state between a server state and a file system state, the remote tree represents the server state on a remote memory location, and the local tree represents the file system state on a client device, wherein a portion of the file system state has been synchronized with a portion of the server state when a portion of the remote tree, a portion of the sync tree, and a portion of the local tree are identical;
select a set of unblocked modifications from the set of modifications based on whether each modification has a dependency;
rank the set of unblocked modifications, wherein a first subset of the unblocked modifications are ranked higher than a second subset of modifications based on a different modification type associated with each subset;
select a subset of the set of unblocked modifications based on the ranking, wherein a set of operations is generated based on the subset; and
execute, based on the subset of the set of unblocked modifications, a set of tasks configured to converge the server state and the file system state, wherein executing the set of tasks updates the remote tree or the local tree.

14. The system of claim 13, wherein each unblocked modification in the set of unblocked modifications does not have a dependency on any other modification.

15. The system of claim 13, wherein the instructions, when executed by the one or more processors, further cause the one or more processors to:
receive modification data for content items associated with a content management system; and
update, based on the modification data, the set of tree data structures.

16. The system of claim 15, wherein the instructions, when executed by the one or more processors, further cause the one or more processors to:
identify a list of modified content items based on the modification data, wherein the set of modifications is further identified based on the list of modified content items.

17. The system of claim 13, wherein the instructions, when executed by the one or more processors, further cause the one or more processors to update, in response to execution of the set of operations, the set of unblocked modifications based on changes to dependencies.

* * * * *